US012737270B2

(12) United States Patent
Michael et al.

(10) Patent No.: US 12,737,270 B2
(45) Date of Patent: Sep. 15, 2026

(54) SYSTEM AND METHODS FOR TESTING MICROSERVICES

(71) Applicant: Skyramp Inc., San Francisco, CA (US)

(72) Inventors: Nithin Michael, San Francisco, CA (US); Ki Suh Lee, San Francisco, CA (US); Sacheth Hegde, San Francisco, CA (US); Per Pettersson, San Francisco, CA (US); Mia Casey, San Francisco, CA (US); Shiny Chimra, San Francisco, CA (US); Roshini Michael, San Francisco, CA (US); Jacob Poye, San Francisco, CA (US); Seema Kamath, San Francisco, CA (US); Sachin Katti, San Francisco, CA (US)

( * ) Notice: Subject to any disclaimer, the term of this patent is extended or adjusted under 35 U.S.C. 154(b) by 109 days.

(21) Appl. No.: 18/500,736

(22) Filed: Nov. 2, 2023

(65) Prior Publication Data

US 2024/0143493 A1 May 2, 2024

Related U.S. Application Data

(60) Provisional application No. 63/421,840, filed on Nov. 2, 2022.

(51) Int. Cl.
*G06F 11/28* (2006.01)
*G06F 8/656* (2018.01)
(Continued)

(52) U.S. Cl.
CPC .............. *G06F 11/28* (2013.01); *G06F 8/656* (2018.02); *G06F 9/44505* (2013.01);
(Continued)

(58) Field of Classification Search
CPC ....... G06F 11/28; G06F 8/656; G06F 9/44505
(Continued)

(56) References Cited

U.S. PATENT DOCUMENTS 10,289,538 B1 * 5/2019 Dwivedi ............ G06F 11/0718
11,245,591 B1 * 2/2022 Bar Oz .............. H04L 41/0213
(Continued)

OTHER PUBLICATIONS

Jindal, Anshul, Vladimir Podolskiy, and Michael Gerndt. "Performance modeling for cloud microservice applications." Proceedings of the 2019 ACM/SPEC International Conference on Performance Engineering. 2019. pp. 25-32. (Year: 2019).*
(Continued)

*Primary Examiner* — Satish Rampuria
(74) *Attorney, Agent, or Firm* — Baker, Donelson, Bearman, Caldwell & Berkowitz, PC

(57) ABSTRACT

Skyramp reduces or eliminates challenges encountered in testing of cloud native applications by providing an interactive testing product by which users can probe a set of microservices in insolation by mocking dependencies. Skyramp is configured for local integration, performance, and load testing, and works with any language. Skyramp reduces the burden of testing by making it easy to deploy (locally or remotely) any subset of the application or target by automatically mocking in the cluster the necessary dependencies, enabling interaction with targets by triggering any endpoints needed during the testing, and storing functional and performance tests for quick future access/use.

63 Claims, 46 Drawing Sheets

(51) Int. Cl.
*G06F 9/445* (2018.01)
*G06F 9/54* (2006.01)
*G06F 11/3668* (2025.01)
*G06F 11/3698* (2025.01)

(52) U.S. Cl.
CPC .............. *G06F 9/541* (2013.01); *G06F 9/547* (2013.01); *G06F 11/3684* (2013.01); *G06F 11/3688* (2013.01); *G06F 11/3692* (2013.01); *G06F 11/3698* (2025.01)

(58) Field of Classification Search
USPC .......................................................... 717/124
See application file for complete search history.

(56) References Cited

U.S. PATENT DOCUMENTS

| | | | |
|---|---|---|---|
| 12,056,042 B2 * | 8/2024 | Shrikant Patwardhan | G06F 11/368 |
| 12,333,280 B2 * | 6/2025 | McGrath | G06F 11/36 |
| 12,393,509 B2 * | 8/2025 | Bruce | G06F 8/71 |
| 12,541,384 B2 * | 2/2026 | Desai | G06F 8/61 |
| 2020/0004668 A1 * | 1/2020 | Dwivedi | G06F 11/0718 |
| 2020/0366573 A1 * | 11/2020 | White | G06F 9/45558 |
| 2021/0019194 A1 | 1/2021 | Bahl et al. | |
| 2021/0117242 A1 | 4/2021 | Van De Groenendaal et al. | |
| 2024/0028323 A1 * | 1/2024 | Gopireddy | G06F 8/65 |

OTHER PUBLICATIONS

Wu, Na, Decheng Zuo, and Zhan Zhang. "An extensible fault tolerance testing framework for microservice-based cloud applications." Proceedings of the 4th international conference on communication and information processing. 2018. pp. 38-42. (Year: 2018).*

Waseem, Muhammad, et al. "Testing microservices architecture-based applications: A systematic mapping study." 2020 27th Asia-Pacific Software Engineering Conference (APSEC). IEEE, 2020. pp. 119-128. (Year: 2020).*

Dähling, Stefan, Lukas Razik, and Antonello Monti. "Enabling scalable and fault-tolerant multi-agent systems by utilizing cloud-native computing." Autonomous Agents and Multi-Agent Systems 35.1 (2021): pp. 1-10. (Year: 2021).*

Harsh, Piyush, et al. "Cloud enablers for testing large-scale distributed applications." Proceedings of the 12th IEEE/ACM International Conference on Utility and Cloud Computing Companion. 2019. pp. 35-42. (Year: 2019).*

Gan, Yu, et al. "An open-source benchmark suite for microservices and their hardware-software implications for cloud & edge systems." Proceedings of the twenty-fourth international conference on architectural support for programming languages and operating systems. 2019. pp. 1-18. (Year: 2019).*

GitHub. Helm, usage. Internet publication, last accessed via https://letsramp.github.io/helm/ on Aug. 15, 2025, 1 page.

GitHub. Letsramp, internet publication last accessed via https://github.com/letsramp/sample-microservices.git on Aug. 15, 2025, 8 pages.

International Search Report for PCT/US23/078530 mailed Feb. 14, 2024, 2 pages.

Skyramp. Publicly accessible installer, last accessed via https://skyramp.dev/installer.sh on Aug. 15, 2025, 10 pages.

Vocke, H. The Practical Test Pyramid, blog publication accessed via https://martinfowler.com/articles/practical-test-pyramid.html, published on Feb. 28, 2018, 44 pages.

Written Opinion for PCT/US23/078530 mailed Feb. 14, 2024, 11 pages.

* cited by examiner

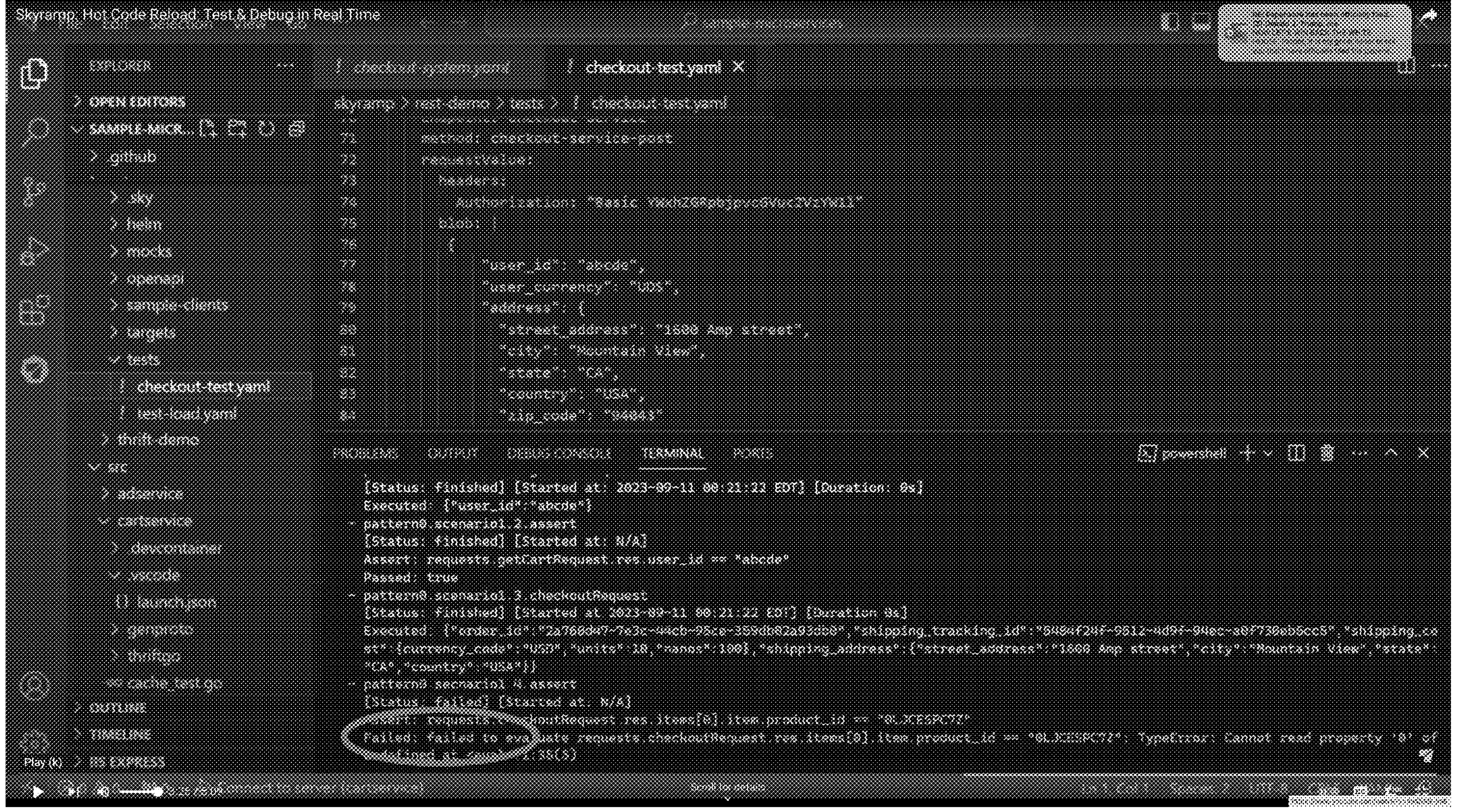
Skyramp: Hot Code Reload: Test & Debug in Real Time
EXPLORER
OPEN EDITORS
SAMPLE-MICR...
.github
.sky
helm
mocks
openapi
sample-clients
targets
tests
checkout-test.yaml
test-load.yaml
thrift-demo
src
adservice
cartservice
.devcontainer
.vscode
launch.json
genproto
thriftgo
cache_test.go
OUTLINE
TIMELINE
checkout-test.yaml
skyramp > rest-demo > tests > checkout-test.yaml
method: checkout-service-post
requestValue:
headers:
blob: |
"user_id": "abcde",
"street_address": "1600 Amp street",
"city": "Mountain View",
"state": "CA",
"country": "USA",
PROBLEMS
OUTPUT
DEBUG CONSOLE
TERMINAL
PORTS
powershell
[Status: finished] [Started at: 2023-09-11 00:21:22 EDT] [Duration: 0s]
Executed: {"user_id":"abcde"}
- pattern0.scenario1.2.assert
[Status: finished] [Started at: N/A]
Assert: requests.getCartRequest.res.user_id == "abcde"
Passed: true
- pattern0.scenario1.3.checkoutRequest
- pattern0.scenario1.4.assert
[Status: failed] [Started at: N/A]
FIGURE 4G

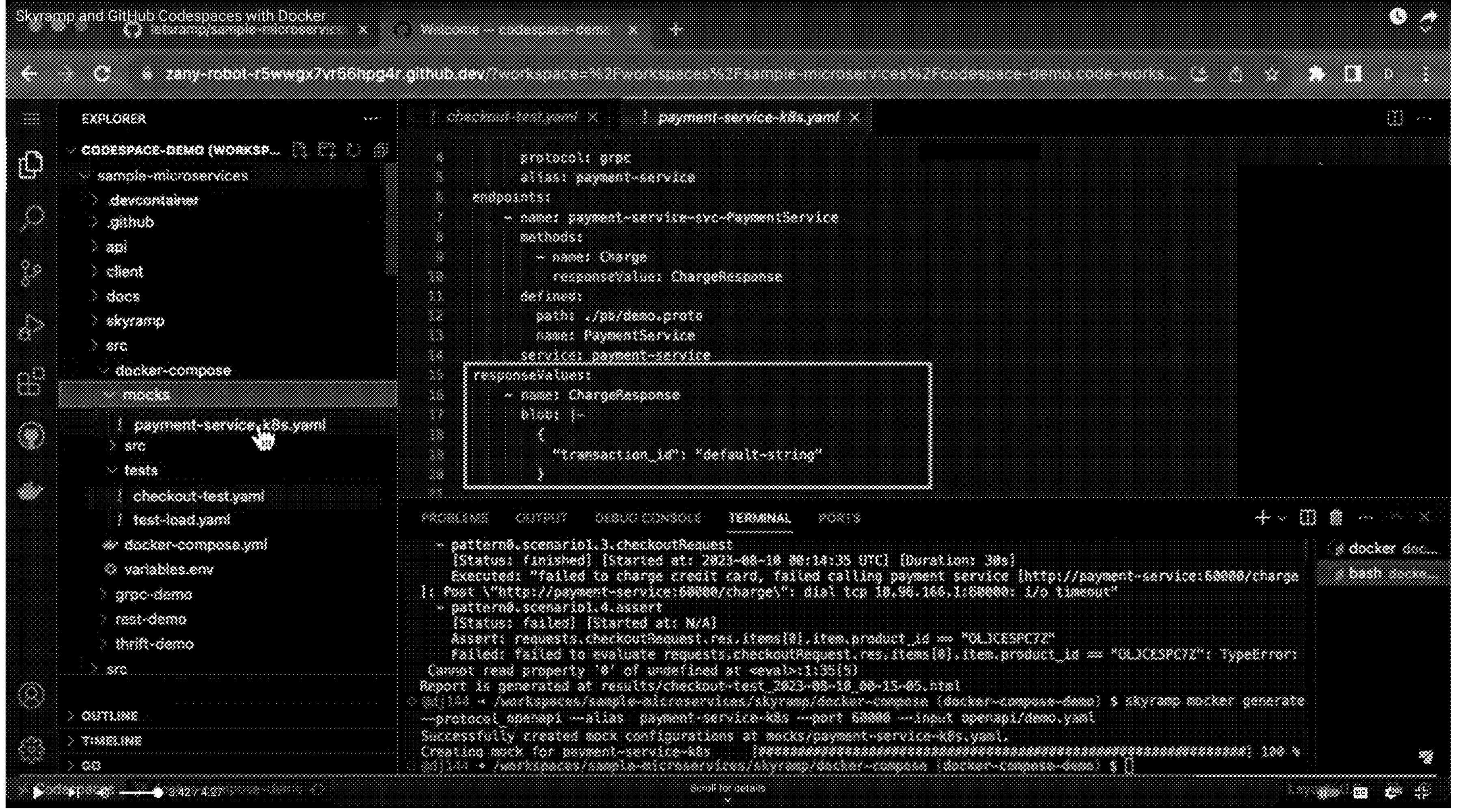
Skyramp and GitHub Codespaces with Docker
zany-robot-r5wwgx7vr56hpg4r.github.dev
EXPLORER
CODESPACE-DEMO (WORKSP...
sample-microservices
.devcontainer
.github
api
client
docs
skyramp
src
docker-compose
mocks
payment-service-k8s.yaml
src
tests
checkout-test.yaml
test-load.yaml
docker-compose.yml
variables.env
grpc-demo
rest-demo
thrift-demo
src
OUTLINE
TIMELINE
checkout-test.yaml
payment-service-k8s.yaml
protocol: grpc
alias: payment-service
endpoints:
- name: payment-service-svc-PaymentService
methods:
- name: Charge
responseValue: ChargeResponse
defines:
path: ./pb/demo.proto
name: PaymentService
service: payment-service
responseValues:
- name: ChargeResponse
blob: |-
{
"transaction_id": "default-string"
}
PROBLEMS
OUTPUT
DEBUG CONSOLE
TERMINAL
PORTS
docker
bash
Successfully created mock configurations at mocks/payment-service-k8s.yaml.
FIGURE 5I

SYSTEM AND METHODS FOR TESTING MICROSERVICES

RELATED APPLICATION

This application claims the benefit of U.S. Patent Application No. 63/421,840, filed Nov. 2, 2022.

TECHNICAL FIELD

Embodiments are generally directed to integration, performance, and testing of cloud native applications and, more particularly, to systems and methods for interactive isolation and testing of cloud native microservices.

BACKGROUND

Testing of cloud native applications under development is difficult and time consuming and can significantly slow the development process. The complexity involved in setting up test frameworks often introduces significant delays in software development, and for this reason is often pushed back to a later point in the development cycle. However, issues uncovered late in the development cycle are frequently much more complicated and time consuming to resolve. The flexibility of distributed software development brings with it the challenge of rapidly identifying and resolving problems, whether they be functional of performance, that can lurk among the various microservices making up an application. Consequently, there is a need for a testing solution that automates the setup of a testing framework and enables incremental testing of microservices in a simple and extensible manner.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE FIGURES

FIGS. 4A-4M show a screenshot sequence when using the hot code reload feature of Skyramp to enable real-time iterative testing and debugging of code, under an embodiment.

FIGS. 5A-5K show a screenshot sequence for Skyramp when testing and mocking microservices in a Docker cluster in any dev environment using GitHub code spaces, under an embodiment.

DETAILED DESCRIPTION

Figure 1:
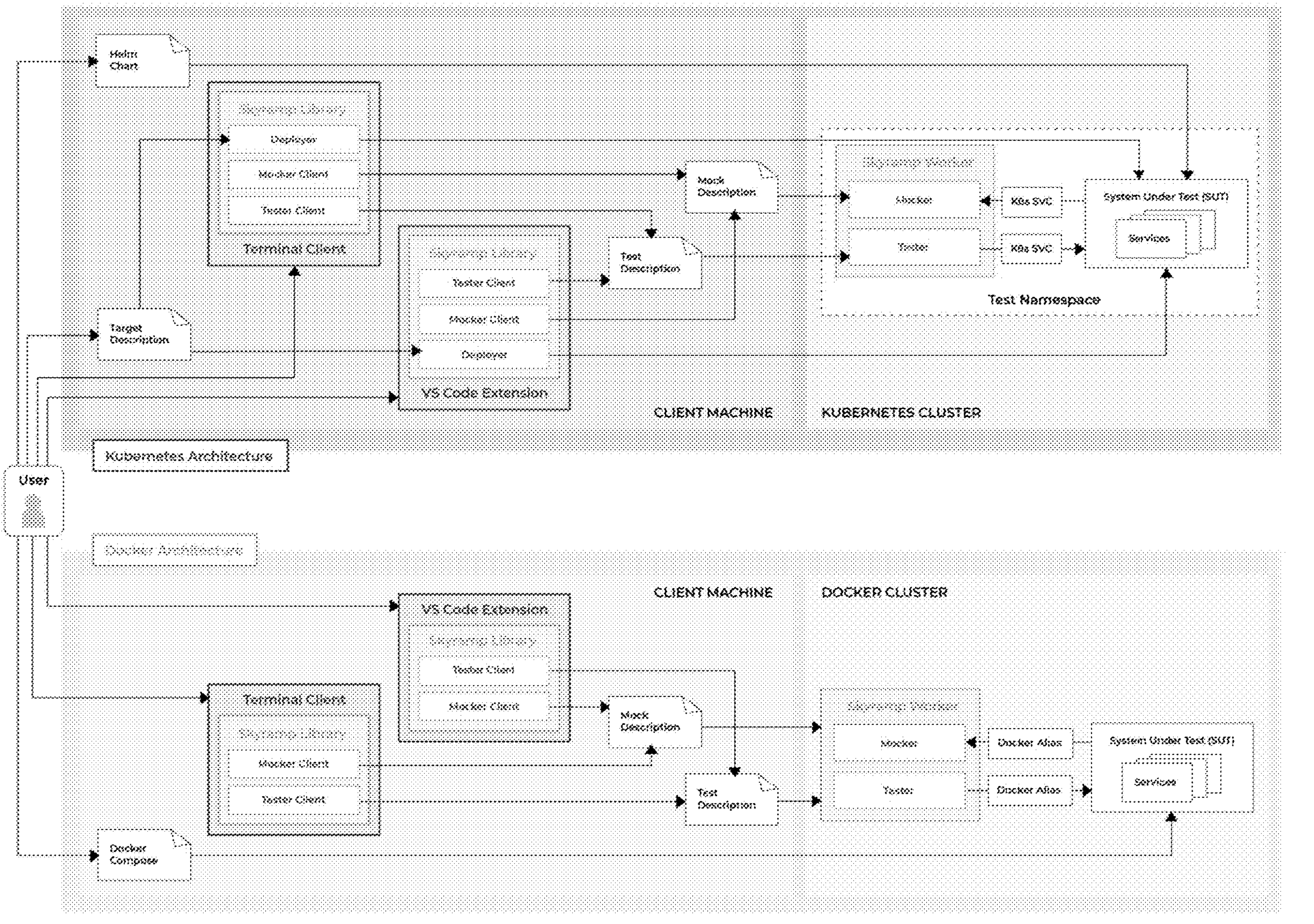
FIG. 1 is a block diagram of the Skyramp architecture, under an embodiment.

Embodiments described herein, and referred to herein as "Skyramp", significantly reduce or eliminate the challenges encountered in the testing of cloud native applications by providing an interactive testing product where users can "probe" a microservice in insolation by mocking dependencies. Skyramp is configured for local integration, performance, and load testing, and works with any language. Skyramp reduces the burdens of testing by making it easy to deploy (locally or remotely) any subset of the application or "target" by automatically mocking in the cluster the necessary dependencies, enabling interaction with targets by triggering any application programming interface (API) endpoints needed during the testing, and storing functional and performance tests for quick future access/use.

The following terms as they may be used herein are intended to have the general meaning described below. The terms are not however limited to the meanings stated herein as the meanings of any term can include other meanings as understood in the art or as applied by one skilled in the art.

"API Signature" as used herein includes the parameters comprising the API request and/or response along with their data types, ranges, and any additional constraints.

"Binary" or "Skyramp binary" as used herein includes the executable which a developer can download to interact with Skyramp. This executable is used on the local terminal to run various commands to trigger Skyramp workflows.

"Container" as used herein includes an atomic unit of describing the microservice-under-test, or an ingredient list so to speak.

"Container Description" as used herein includes everything needed to bring up the container in question, including links to binaries, listening ports, API signatures, and other services with which the container communicates.

"Microservice-under-test" as used herein includes any service that the user wishes to evaluate for functionality or performance. Microservice-under-test will have one or more containers that are implemented. The service under test might have multiple APIs working together in conjunction for gathering the necessary parameters to exercise the service. These may come from mocks that are user defined or from direct inputs that are user defined.

"Mocker" as used herein includes a feature of the Worker directed to Mocking. Using a provisioned Kubernetes cluster, the Worker is Helm-installed into the cluster. The Skyramp binary can then be used to run "mocker create" to create default configurations for mock values and to run "mocker deploy" to configure the running worker with the mock values. Note the Mocker feature does not require the cluster, application, etc. of the user to be deployed via Skyramp, rather, it will work in a pre-provisioned cluster where the arbitrary software is already running.

"Project directory" as used herein includes the root of the directory where Skyramp-related configurations for mocks, targets, tests, etc. reside. It can comprise folders for the aforementioned configurations (such as mocks/, targets/, tests/). This directory is intended to live in a source-controlled repository so a developer can save and modify the Skyramp configurations over time. Note that this is different from Skyramp system level configurations (such as resources for remote VMs, licensing information, panic logs, etc.) which reside in "~/.skyramp".

"Skyramp Input" as used herein includes the set of inputs required for a test-container description, test description, traces etc.

"Target" as used herein includes a subset of an application to deploy. The targets/folder in a Skyramp project include all defined targets. These comprise information about which containers to bring up, which ones are mocked, and other configurations relevant to the bring up.

"Test" as used herein includes an attempt at evaluating functional or performance metrics for a particular target. A test can include one or more APIs for the target.

"Test Inputs" as used herein includes inputs to the target (microservice-under-test).

"Trace" as used herein includes a way for the user to provide sample input/s corresponding to the API signatures that the test relies on to run successfully. This is useful when the APIs called rely on non-primitive data types for inputs.

"Worker" or as used herein includes a container which runs in a Kubernetes cluster and includes functionality such as mocking and testing.

All example code blocks and descriptions described herein are presented as examples only and actual code necessary to implement the corresponding functionality is not limited by these examples.

For teams with modular application architectures, there is a sense that testing is inadequate. Specifically, sufficient functional integration and performance tests (also called services tests) are missing both in the inner dev loop and in the pipeline. The current reality is that it is very difficult to effectively model the system under test, execute good tests and avoid costly production outages.

In the inner dev loop, with the proliferation of microservices architectures, it has become very difficult for engineers to test beyond unit tests while developing and debugging. The problems stem from there being a lack of easy tooling either to isolate the subsystem under development reliably or to evaluate any scenario more complicated than point API tests. This forces engineers to rely on pipeline tests with costly feedback delays. Since existing pipeline tests do not usually cover new functionality, this state of affairs almost guarantees that problems are caught very late or worse, in production.

For pipeline tests, the test pyramid is the well accepted organizing principle (see e.g., martinfowler.com/articles/practical-test-pyramid.html). However, most teams have a test hourglass with many unit tests and end-to-end tests but very few services tests. Unfortunately, unit tests do not verify application functionality and given the combinatorial complexity of testing modern microservices applications, end-to-end tests are insufficient. On the flipside, this is indicative of a willingness among engineers to write more tests when an easy test writing pattern is available. The problem is that for services tests, each team typically has a poorly maintained DIY framework which presents a barrier to their own engineers to easily create these tests as critical as they are.

Modern modular applications typically communicate via APIs. It logically follows that services tests for these applications are chains of requests and responses. To make services testing easier, then it is necessary to have an "easy" API client and server. Here "easy" refers to user experience (UX) that is context dependent, but in all cases Skyramp described herein lets the engineer focus on the test payload instead of the attendant boilerplate code and networking required to make a test work.

Skyramp is configured for use by developers in writing and running services tests for modern modular applications as part of their workflow (e.g., quality assurance (QA), test automation engineers and developers, etc.) and, as such, is configured for use in functional integration and performance testing in situations including inner dev loop and pipeline as described in detail herein.

For the inner dev loop, Skyramp can be configured on the fly from the integrated development environment (IDE) or terminal to easily and dynamically execute complex requests and mock responses to test code while it is being written. Therefore, when a user is building and fixing their microservices. Skyramp is configured to help them test things as they go, so problems are detected early.

For writing pipeline tests. Skyramp is packaged as a library that saves on lines of code while dramatically improving readability and modularity by exposing primitives to isolate the system under test, trigger functional and performance test requests, configure mocks etc. In the pipeline phase, when the code is ready to push, Skyramp is configured for use in the automated testing pipeline to ensure everything still works correctly.

Skyramp generally includes a system comprising a library component executing on a client computer. The library component comprises a deployer configured to deploy in a cluster a microservice of an application. Skyramp further comprises a worker component executing in the cluster and coupled to the library component. The worker component comprises a tester and a mocker. The tester is configured to execute a test to test operation of the microservice. The mocker is configured to execute a mock to mimic the endpoints of the microservice during the test.

More specifically, FIG. 1 is a block diagram of the Skyramp architecture, under an embodiment. The Skyramp architecture includes a Skyramp Library (also referred to herein as the "library"), a Skyramp Worker (also referred to herein as the "worker"), and Skyramp Clients including a terminal client, a mocker client, and a tester client. The library includes the mocker client and tester client. The worker includes a mocker component (also referred to herein as the "mocker") and a tester component (also referred to herein as the "tester"). Skyramp is configured to support both Kubernetes and Docker Compose cluster orchestration as shown in the architecture diagram and described in detail herein.

Skyramp exposes all key abstractions used for distributed testing via the library on the client side. For inner development ("dev") loop testing the functionality of the library is configured to be accessed through the terminal client, the mocker client and the tester client. Alternatively, a user can directly use the libraries in their continuous integration (CI) pipelines to create custom testing solutions. Additionally. Skyramp includes a deployer configured as a client-side abstraction exposed by the library and configured to deploy a subset of an application given a Helm Chart.

The library in the client environment is configured to interact with the worker deployed in-cluster to implement service mocking and testing via the mocker and the tester of the worker, respectively. The worker is deployed into the cluster via Helm or Docker Compose and is configured to implement the core functionality of mocker and tester. Communication with the worker happens either directly via the library or by using one or more of the mocker and tester clients. The worker provides management features that are useful for testing and development including running and managing mocks, generating load for tests, and managing and visualizing tests but are not so limited.

Generally, when a developer wants to get a system under test up and running, the deployer is used to bring up just the services targeted for testing. Deployer is also configured to increase the speed of test iterations through features like hot code reload described herein. Mocker can be thought of as a master of disguise for target services because it is configured to mimic or pretend to be other endpoint services so a developer can easily isolate the services under test. Tester runs desired tests and neatly organizes the results while making it easy to reach hard-to-get-to endpoints in a cluster.

Skyramp further includes a terminal client and a VS Code extension for inner dev loop testing. The terminal client includes a comprehensive list of command line interface (CLI) commands configured for use in ad-hoc testing. The VS Code extension provides a visual way to interact with Skyramp from the development environment.

With distributed applications a developer cannot solely rely on unit tests and end-to-end tests because the combinatorial complexity is just too high. Consequently, distributed integration and performance testing of key parts of applications is needed. Skyramp provides a flexible way to enable distributed testing of modular applications by being configured to enable a developer to bring up just a portion of an application, isolate the microservices for testing, and easily trigger tests and get meaningful results that are easy to parse.

Figure 2:
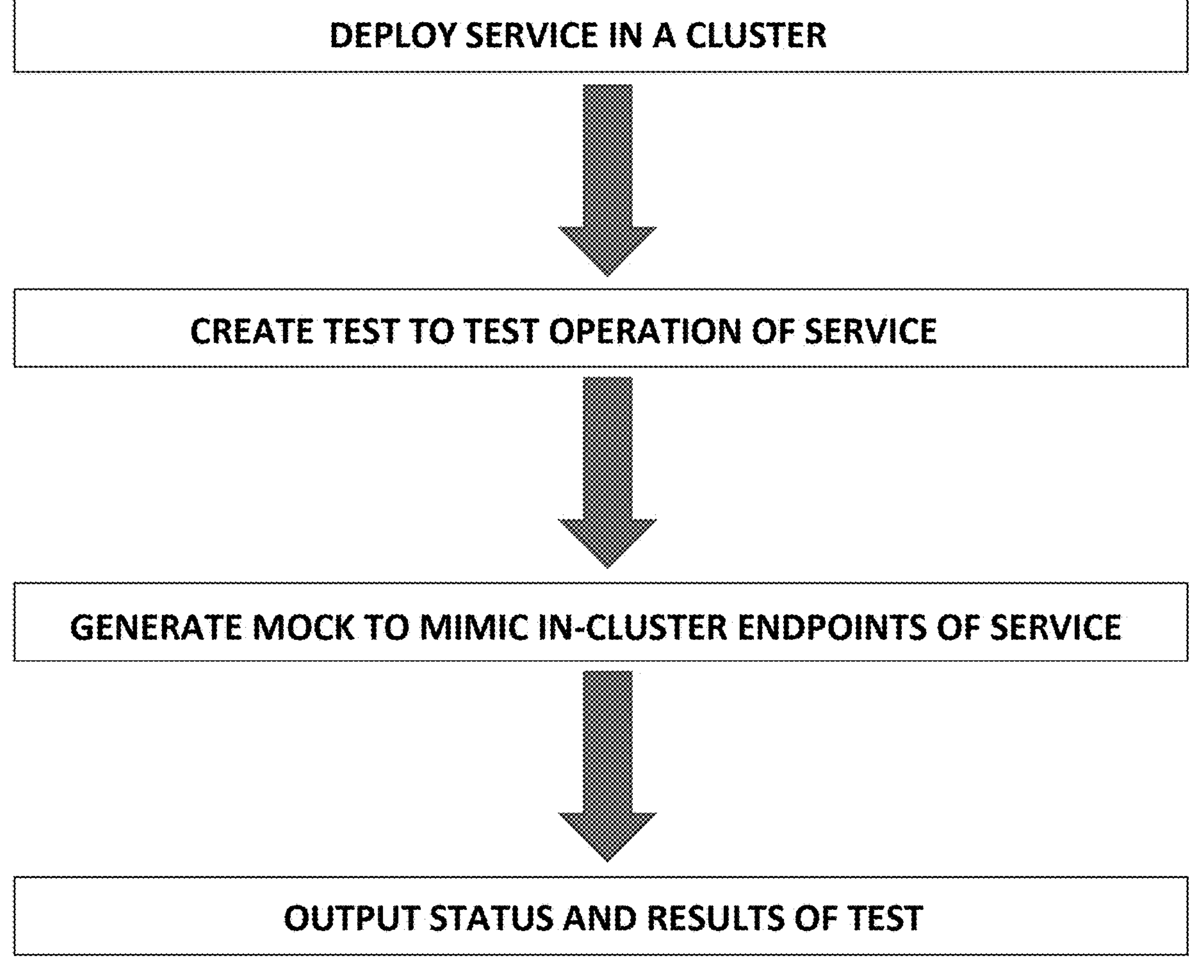
FIG. 2 is a flow diagram of a Skyramp method for testing an application, under an embodiment.

FIG. 2 is a flow diagram of a Skyramp method for testing an application, under an embodiment. The method is configured to deploy within a cluster at least one microservice of the application 202. The method is further configured to generate a test configured to test operation of the microservice 204 and generate a mock configured to mimic in the cluster endpoints of the microservice when the test is executing 206. Additionally, the method comprises providing status and results of the test when executed on the microservice 208.

Detailed descriptions follow of the components and methods of Skyramp.

Skyramp Used Through VS Code

For testing in the inner dev loop, Skyramp is configured for use through either the VS Code Extension or the Terminal Client as described herein. The following describes the use of Skyramp through VS Code Extension. Skyramp is configured to enable developers to easily isolate services under test from surrounding dependencies and write and run integration and performance tests as you develop and debug, directly in VS Code.

The "Set Up Cluster" command is run to configure a Kubernetes cluster to use with Mocker and Tester. A new Worker container is then deployed or installed in the cluster by running the "Deploy New Worker Container" command.

Mocker is an in-cluster solution configured to create API mock servers. To use mocker in the VS code extension to mock a service, run the "Generate Mock" command to generate a mock configuration in the form of a ".yaml" file in the mocks folder of the working directory. An API schema file is selected to mock against and configuration details are added to this file including the Kubernetes service name, port number, and proto service name (if applicable). Mocker generates default values for responses based on the API signature. The default values can be edited by editing the generated mock in the mocks folder.

The mock configuration is pushed to mocker by running the "Apply Mocks" command. All calls to the mocked service/s are now routed to mocker and it responds with the default values in the configuration. Mocker does not automatically update the mocks when the responses are updated in the mock configuration file but embodiments are not so limited. The "Apply Mocks" command can be run again when the mock values change.

Tester is a solution configured to simplify the process of both writing and running tests for complicated distributed apps. To use tester in the VS code extension to test a service, the "Generate Test" command is run to generate a test configuration in the form of a ".yaml" file in the tests folder of the working directory. An API schema file is selected to test against and configuration details are added to this file including the test name, Kubernetes service name, port number, and proto service name (if applicable).

Tester generates default values for requests based on the API signature. The default values can be edited to add request steps by editing the generated test in the tests folder. The test configurations are started by running the "Start Test" and, in response, tester will execute the test and output on the test results in the "results" output directory.

Skyramp Used Through Terminal Client

Using internet connectivity, Skyramp and its terminal client are installed on the client computer with a prespecified install command (e.g., "bash -c "$(curl -fsSL skyramp.dev/installer.sh)") and instructions presented in the terminal. Installation of Skyramp is then checked using a prespecified command (e.g., "skyramp version").

Install Worker

Skyramp worker acts as the essential foundation for both mocker, enabling service mocking capabilities, and tester, facilitating the execution of in-cluster tests. Skyramp provides the flexibility to deploy the worker in either a Kubernetes cluster or via Docker Compose. Following are instructions for both deployment approaches.

The Kubernetes deployment of worker uses Helm but is not so limited. The developer adds the Skyramp Helm repository ("repo") using a prespecified command (e.g., "helm repo add skyramp letsramp.github.io/helm/"), and this repo is configured to access Skyramp charts. To ensure the latest chart versions are available, the repositories are updated using a prespecified command (e.g., "helm repo update").

The Skyramp Worker application is then deployed to the Kubernetes cluster using a prespecified command (e.g., "KUBECONFIG=/path/to/kubeconfig helm install -n <namespace> <release-name> skyramp/worker"). Then "/path/to/kubeconfig" is replaced with the path to the Kubernetes configuration file (kubeconfig). The Kubernetes namespace where deployment of the Skyramp Worker chart is desired is used to replace "<namespace>".

A namespace in Skyramp is a logical grouping of resources within a cluster, and a user is free to choose an existing namespace or create a new one. A name for this Helm release is then used to replace "<release-name>". A release is a unique instance of a Helm chart installation so a meaningful name should be used for this release.

To interact with the worker, the cluster is registered with the Skyramp terminal client (e.g., "skyramp cluster register <path to kubeconfig file>") If services are deployed using Skyramp deployer, worker is automatically installed, and no Helm install of worker or separate cluster registration is necessary.

When deploying worker via Docker Compose, add the following to an existing docker-compose.yaml or create a new one with the following services and volumes necessary for updating the Docker network:

```
services:
  skyramp:
    image: public.ecr.aws/j1n2c2p2/rampup/worker:latest
    volumes:
      - skyramp:/etc/skyramp
      - /var/run/docker.sock:/var/run/docker.sock
    ports:
      - 35142:35142
    restart: always
volumes:
  skyramp:
```

Deploy the Skyramp worker by running a prespecified command (e.g., "docker compose up -d -wait").

Set Up a Cloud-Native Application for Trying Out Skyramp

A description demonstrating testing and mocking microservices in a Kubernetes cluster with Skyramp follows. This example makes use of a cloud-native microservices demo app, Online Boutique, which is a web-based e-commerce app with sample functionality including product catalog, shopping cart, recommendations, and payment that uses gRPC Remote Procedure Call (gRPC) APIs. Skyramp has also added support for Representational State Transfer (REST) and Thrift APIs in its fork of the repo.

This example demonstration tests whether the checkout subsystem of Online Boutique is functioning correctly. Typically, the API endpoints of the services needing to be tested can only be accessed from within the Kubernetes cluster, so a developer either has to set up a very permissive gateway or proxy, or manually package tests into a container that can run in the cluster. However, Skyramp tester is configured to skip the manual work, save time, and focus on the test payload.

To begin the example, developer clones the sample project (e.g., "git clone github.com/letsramp/sample-microservices.git"). From the 'sample-microservices' project directory, developer changes to the 'skyramp/grpc-demo' directory (e.g., "cd skyramp/grpc-demo"). A local Kubernetes cluster is created for testing the microservices (e.g., "skyramp cluster create-local"), and the microservices are deployed to the cluster (e.g., "skyramp deployer up checkout-system"). The status of the services is then checked (e.g., "skyramp deployer status").

Two tests available are available which were originally generated using Skyramp (e.g., "ls tests"). A test is run for the checkout service in order to test whether the checkout subsystem of the app is functioning correctly (e.g., "skyramp tester start checkout-test -n test-grpc-demo"). It is assumed for purposes of this example the test failed because the payment service is missing. Skyramp makes it easy to mock internal or external dependencies, like the payment service, and avoid the complexity of deploying the missing dependency.

A pre-built mock is available (e.g., "cat mocks/payment-service-k8s.yaml"), but mocks can also be automatically generated using Skyramp as described in detail herein. The developer sends the mock description to the worker so that it can stand in for the payment service (e.g., "skyramp mocker apply -n test-grpc-demo"), and the test run is repeated with the mock in place (e.g., "skyramp tester start checkout-test -n test-grpc-demo"). The test now passes. This example demonstrates that with Skyramp, missing dependencies will no longer derail the testing process. A load test can also be run (e.g., "skyramp tester start test-load -n test-grpc-demo"). The test cluster can now be removed (e.g., "skyramp cluster remove --local").

Detailed descriptions now follow for embodiments of each component of the Skyramp system or platform. Skyramp, however, is not limited to the embodiments described but is to be accorded the widest scope consistent with the description including various modifications that may be apparent to those skilled in the art.

Deployer

Skyramp Deployer is configured to render and deploy Helm charts through simple target descriptions, thereby enabling deployment of selected subsets of services within the inner development loop, including enabling the optional Hot Code Reload feature. Deployer is configured to streamline Kubernetes resource deployment for developers by providing a toolset configured to enable developers to deploy specific subsets of services seamlessly within the inner development loop. Deployer enables swift deployment of Helm Charts in Kubernetes environments, precise control over Kubernetes resource deployment, and flexible management of Helm sub-charts during deployment. Deployer thus optimizes the inner development loop, resulting in quicker and more efficient deployment of Kubernetes resources.

Deployer provides a toolset for use in deploying Kubernetes resources. Using Skyramp, a developer creates a deployment target description (optionally, enables debugging with hot code reload), brings up a target, and manages the deployment. Each of these methods is described in detail herein.

Creation of a deployment description includes creating a folder called "targets" at the root of the target microservice repository. This folder is used to store the target description files. Inside the "targets" folder, the developer creates a target description file (e.g. "helm-demo.yaml") to describe the target they want to deploy. The target description file is then customized to match the deployment needs. An example deployment target description follows.

```
namespace: helm-namespace
containers:
  - type: helm
    releaseName: my-release
    path: charts/test1
    valuesPath: files/values.yaml
    values:
      server:
        enabled: true
        service:
          port: 10000
      service:
        port: 5000
        type: ClusterIP
    includes:
      - Deployment/my-release-test1
      - Job/* # include all jobs
      - server/* # include subchart server with all subresources
```

The values of the deployment target description can be modified according to requirements of a specific deployment. The target description file includes the "namespace" field, which defines the target Kubernetes namespace. The target description file further includes a "containers" section, where the deployment settings are configured, including the release name ("releaseName"), the path to the Helm charts ("path"), an optional values file path ("valuesPath"), and additional values to override ("values").

Also included in the target description file is an "includes" field (alternatively. "excludes"), which specifies the resources to include in the deployment. Specific resources can be specified or the * wildcard can be used to include matching resources.

Deployer optionally supports a powerful debugging feature referred to herein as Hot Code Reload. This feature allows developers to debug their services in real-time while a test is running without the need for re-deployments by attaching their debugger, step through code, and making changes while their service is running.

To enable Hot Code Reload, a "debug" section is included in the target description file under "containers". An example debugging code section is as follows.

```
debug:
  - containerName: Deployment/my-service
    runtimeType: go
    command: myservice
    debugPort: 33333
    mountPaths:
      - /workspaces/myproject/src/myservice
```

This debug section is configured to enable Hot Code Reload for debugging purposes. The parameters that can be configured in the debug section include "containerName" which includes the name of the container to use in debug mode. The parameters "runtimeType", which is the runtime type of the service ("e.g., "go", "node", or "python"), and "command", which is the application entry point that will run in a loop relative to the first path specified in "mountPaths", are also configurable in the debug section. Additionally, parameters which can be configured in the debug section include "debugPort" defining the local port of the running service to debug, and "mountPaths" defining path(s) mounted to the remote container.

With Hot Code Reload, any code changes made will immediately take effect, thereby streamlining the debugging process. An example involving the Hot Code Reload feature is described herein.

Following creation of a deployment target description, the target is brought up by running the "up" command to deploy the target, replacing "helm-demo" with the target name (e.g., "skyramp deployer up helm-demo"). Deployer is configured to read the target description file and launch the deployment process. Deployer also handles deployment of Helm charts using the configurations from the target description. Deployer creates or updates the necessary Kubernetes resources, removing the need for manual management. The mocker should be used to deploy mocks for excluded service dependencies.

Following running of "deployer up" on a target, deployer is configured to enable viewing of the status of the deployment by running the "status" command (e.g., skyramp deployer status") which outputs the status of the deployment in a digestible table format.

After testing or when finished with the deployment, the target is brought down using the "down" command (e.g., "skyramp deployer down helm-demo). Deployer is configured to clean up all resources deployed using the "skyramp deployer up" command.

Target Description

The target description file used with deployer is a component of the deployer and includes the configuration parameters used to deploy the system-under-test efficiently. This file is placed under the "targets" folder at the root of the microservice repository. The target description file, which can be named with a ".yaml" extension (e.g., "my-deployment.yaml"), is used to define and control how services are deployed and configured within the Kubernetes cluster.

A target description file of an embodiment includes a "namespace" parameter representing the Kubernetes namespace for the cluster. Additionally, it includes a "containers" section that defines the specific deployment settings. All the parameters described herein are specified under the "containers" section. An example target description file including the "namespace" parameter and the "containers" section is as follows.

```
namespace: helm-namespace
containers:
  - type: helm
    releaseName: my-release
    path: charts/test1
```

To define Helm values, a developer provides a path to the "values.yaml" file for their Helm chart using "valuesPath" Additional values to override or extend the configuration from the "values.yaml" file can be added to the "values" section. Both "valuesPath" and "values" are placed under "containers". A code example defining Helm values is as follows.

```
valuesPath: files/values.yaml
values:
  server:
    enabled: true
    service:
      port: 10000
  service:
    port: 5000
    type: ClusterIP
```

Skyramp provides the option to explicitly include or exclude specific services in a deployment by specifying them in the "includes" or "excludes" section under "containers". A code example for including or excluding services is as follows.

```
includes:
  - Deployment/my-service
  - Service/my-service
  - Job/* # include all jobs
  - server/* # include subchart server with all subresources
  - /* # include all resources in root chart
excludes:
  - Deployment/excluded-service
```

Mocker

Mocker is configured to provide fine-grained control over dependencies to be mocked. Mocker is configured to include the ability to mock gRPC, REST, JavaScript Object Notation-Remote Procedure Call (JSON-RPC) Web Socket, and JSON-RPC HTTP endpoints but is not so limited. Mock is also configured to perform automatic creation of mock configurations from API files, and to dynamically route calls from live to mocked services. Mocker comprises powerful gRPC mocking including the ability to proxy gRPC calls, and support for client streaming, server streaming, and bidirectional streaming. Mocker also includes support for mock values generated via generative artificial intelligence and is configured to include the ability to configure response latencies to test and debug real-world scenarios. Mocker is further configured to include support for returning error codes to test error cases.

The mock includes a mock description configured to enable developers to create lightweight static and dynamic mocks to simulate service dependencies. The mocker comprises a container that is deployed inside the Kubernetes cluster or in Docker and contains core logic for implementing mocks and handling networking for the mocks.

Mocker further comprises a mock configuration file, response configuration file, and endpoint configuration files. The mock configuration file, residing in the “mocks” folder, defines the overall behavior of the mock and as such enables configuring of proxying, delays, errors, and more, facilitating comprehensive testing of an application. The mock configuration file is configured to capture the signatures for the endpoints to be mocked and corresponding static mock responses. It is automatically generated from one of an OpenAPI API spec (either by file path or URL reference), a protocol buffer API spec, or a JSON-RPC response file. Mock values can be easily edited as needed.

The response configuration files, located in the “responses” folder, define response behavior for specific endpoint methods or methods, thereby enabling developers to configure payloads and dynamic responses. The endpoint configuration files, found in the “endpoints” folder, specify details related to the service networking aspects, supporting gRPC, REST, JSON-RPC WebSocket, and JSON-RPC HTTP endpoints.

Following is an example of how to dynamically generate a mock description by providing service-level information. Alternatively, a mock definition can be created from scratchby creating “.yaml” files in the “mocks”. “responses”, and “endpoints” directories of the project (e.g., my-mock.yaml, my-response.yaml, and my-endpoint.yaml) and configure the necessary information by following the guidelines below.

Generate a Mock

To generate a mock configuration, use the “generate” command provided by mocker. This command creates three files, including an endpoint, a response, and a mock configuration. Mocks can be generated for different types of services such as gRPC, OpenAPI, JSON-RPC HTTP, JSON-RPC WebSocket, and JSON-RPC REST using a prespecified set of commands corresponding to each service. An example mock follows for a gRPC service.

```
skyramp mocker generate \
  --protocol protobuf \
  --api-schema <path to .proto file> \
  --alias <name of Kubernetes service or Docker alias to mock> \
  --port <port number for the service> \
  --proto-service <service name>
```

An embodiment runs the “generate” command in the source code repository so mocks are versioned and shareable.

In response to running the “skyramp mocker generate” command, a mock configuration file is created in the “mocks” folder for the specified service or alias. Additionally, a response configuration file is created in the “responses” folder for each method defined in the service. If the endpoint definition does not already exist then an endpoint configuration file is created in the “endpoints” folder.

Configure the Mock

The mock description automatically generated using the “mocker generate” command is preconfigured with default values for responses based on the API signature. However, default values or configuration details can be added or changed to customize mocks by editing the generated mock in the mocks folder. Examples follow of mock, response, and endpoint configurations.

The mock configuration serves as the central component of the mock definition and defines the overall mock behavior. To configure the overall mock behavior, edit the mock configuration file in the “mocks” folder. An example follows of a mock configuration for a gRPC service.

```
version: v1
mock:
  description: routeguide
  responses:
    - responseName: ListFeatures
    - responseName: RecordRoute
    - responseName: RouteChat
      lossPercentage: 50
      delayConfig:
        minDelay: 1000
        maxDelay: 2000
  proxies:
    - endpointName: routeguide-sve-RouteGuide
      methodName: GetFeature
```

In this example, the top-level mock behavior is configured, including setting a description and specifying the responses to mock as defined in the response configuration. The “description” provides a description of the mock configuration, “responses” allows a developer to specify responses for various gRPC methods, and “proxies” enables gRPC proxying for specific endpoints and methods. This example also includes advanced mock capabilities, including gRPC proxying (routing mock data to specific endpoints and methods), and delays and errors (simulating network conditions by introducing delays and error percentages).

Skyramp provides the capability to act as a proxy for gRPC services, selectively mocking certain methods while forwarding the rest to the live service. To enable this feature, the endpoint and methods to be proxied can be specified in the “proxies” section of the mock configuration.

An example mock configuration is as follows:

```
version: v1
mock:
  description: routeguide
  responses:
    - responseName: ListFeatures
    - responseName: RecordRoute
    - responseName: RouteChat
  proxies:
    - endpointName: routeguide-svc-RouteGuide
      methodName: GetFeature
```

In this gRPC configuration example, requests to the “GetFeature” method are directed to the live service, while all other requests to the “routeguide” service are mocked. If a gRPC method is defined in the ‘.proto’ file but not listed in the mock description. Skyramp is configured to implicitly forward the corresponding request(s) to the live service. This flexibility allows developers to control the behavior of specific gRPC methods in their mock configurations.

In a mock configuration, developers can introduce delays and error configurations using corresponding properties. The “lossPercentage” property specifies the percentage of requests that will result in an error response, and the “delayConfig” property defines the delay configuration for the mock response, including the minimum (minDelay) and maximum (maxDelay) delay in milliseconds. When “minDelay” and “maxDelay” share the same value, the delay is static. However, if these values differ, Skyramp is configured to apply a random delay within a specified range, with a maximum delay of 10,000 milliseconds (10 seconds) but embodiments are not so limited.

Another mock configuration example is as follows:

```
version: v1
mock:
  description: routeguide
  responses:
    - responseName: GetFeature
    - responseName: ListFeatures
    - responseName: RecordRoute
    - responseName: RouteChat
      lossPercentage: 50
      delayConfig:
        minDelay: 1000 # in ms
        maxDelay: 2000 # in ms
```

In this example, the “RouteChat” mock response will experience a random delay between 1,000 and 2,000 milliseconds before being returned. Additionally, around 50% of requests will result in an error response.

A user has the flexibility to specify delays and errors for a specific method or for the entire endpoint. This example demonstrates how to configure delays and errors for a specific response. To apply the same delay and error settings to all responses, the “lossPercentage” and “delayConfig” are defined in the mock section such that, in this example, all responses will encounter a delay between 1,000 and 2,000 milliseconds, and approximately 50% of requests will result in an error response.

Response Configuration

The response configuration file defines the response behavior for a specific method of the service. To configure responses, the response configuration files are edited in the “responses” folder. Following is an example of a response configuration showing support for mocking various gRPC methods, including Unary RPC. Server Streaming RPC, Client Streaming RPC, and Bidirectional Streaming RPC. This example also demonstrates the use of dynamic responses for more complex testing scenarios.

```
version: v1
responses:
  # Unary RPC
  - name: GetFeature
    blob: |-
      {
        “name”: “fake”,
        “location”: {
          “latitude”: 400,
          “longitude”: 600
        }
      }
    endpointName: routeguide-svc-RouteGuide
    methodName: GetFeature
  # Server Streaming RPC
  - name: ListFeatures
    javascript: |
      function handler(req) {
        const values = [ ];
        for (let i = 0; i < 5; i) {
          values[i] = {
            name: “random” + i,
            location: {
              longitude: i * 100,
              latitude: i * 100
            }
          };
        }
        return {
          values: values
        };
      }
```

-continued

```
    endpointName: routeguide-svc-RouteGuide
    methodName: ListFeatures
  # Client Streaming RPC
  - name: RecordRoute
    javascript: |
      function handler(req) {
        var 1 = req.values.length;
        return {
          value: {
            pointCount: 1,
            featureCount: 1,
            distance: 1 * 100,
            elapsedTime: 0
          }
        };
      }
    endpointName: routeguide-svc-RouteGuide
    methodName: RecordRoute
  # Bidirectional Streaming RPC
  - name: RouteChat
    javascript: |-
      const msgs = [ ];
      function handler(req) {
        msgs.push(req.value);
        return {
          values: msgs
        };
      }
    endpointName: routeguide-svc-RouteGuide
    methodName: RouteChat
```

In this example, response behavior is defined for a specific method of the service, specifying the endpoint and method name as defined in the endpoint configuration. The response payload can be customized using a static JSON blob.

Dynamic Responses

Dynamic responses offer flexibility in customizing response generation logic and simulating complex response configurations. Different attributes can be used to specify dynamic response behavior, such as “javascript”, “javascriptPath”, “python”, or “pythonPath”. Each attribute enables defining custom response handling logic and return a JSON representation of the response value.

To create JavaScript-based dynamic responses, the “javascript” attribute is used for a response in the response configuration. A function is defined called “handler” that takes any necessary parameters. The custom JavaScript logic is implemented within the “handler” function and a JSON object is returned representing the response value. An example follows of this response configuration.

```
version: v1
responses:
  - name: RecordRoute
    javascript: |
      function handler(req) {
        var1 = req.values.length;
        return {
          value: {
            pointCount: 1,
            featureCount: 1,
            distance: 1 * 100,
            elapsedTime: 0
          }
        },
      }
    endpointName: routeguide-svc-RouteGuide
    methodName: RecordRoute
```

Alternatively, the “javascriptPath” attribute can be used to specify the path to an external JavaScript script file containing custom response handling logic. The external JavaScript script file “recordRoute.js” defines a “handler” function to process incoming requests and generate appropriate responses. An example follows of a response configuration using the "javascriptPath" attribute.

```
version: v1
responses:
  - name: RecordRoute
    javascriptPath: scripts/recordRoute.js
    endpointName: routeguide-svc-RouteGuide
    methodName: RecordRoute
```

Endpoint Configuration

The endpoint configuration file defines networking-level service details for an endpoint. Endpoint configuration files can be found in the "endpoints" folder. The generated endpoint configuration comprises networking-level service details, including its name, port, alias, and protocol. Additionally, it includes metadata related to various endpoints that a service can have, including the methods it supports and the associated proto file. Typically, no additional user configuration is required for endpoints.

An example follows of an endpoint configuration for a gRPC service.

```
version: v1
services:
  - name: routeguide
    port: 50051
    alias: routeguide
    protocol: grpc
endpoints:
  - name: routeguide-svc-RouteGuide
    methods:
      - name: GetFeature
      - name: ListFeatures
      - name: RecordRoute
      - name: RouteChat
    defined:
      path: ./pb/route_guide.proto
      name: RouteGuide
    serviceName: routeguide
```

Configuration of the endpoint file includes a number of key attributes. A "services" section lists the services available in the project. In this example, there is one service named "routeguide". The "endpoints" section defines individual endpoints, specifying the available methods, the service definition path, and the service name. In the example above, an endpoint named "routeguide-svc-RouteGuide" is used for the RouteGuide service.

Within each endpoint, available "methods" are listed. This example includes methods like "GetFeature". "ListFeatures", "RecordRoute", and "RouteChat". The methods assist with specifying the details of each method and how it should behave. A "defined" attribute specifies the service definition file path and the service name. The service definition file ("route_guide.proto") outlines the structure of the service and its methods.

By configuring endpoints, the available services and methods within a project are defined, facilitating mocking services in their distributed application. Further, it is recommended to dynamically generate a mock by providing service-level information.

Apply the Mock to the Work Container

The mock configuration is pushed to mocker in cluster by running the "apply" command which applies the mock configurations included in the "mocks" folder to the worker. All calls to any mocked service are now routed to mocker, which responds with the default values specified in the mock description. Mocker does not automatically update the mocks when the responses are updated in the mock configuration file but embodiments are not so limited. The "Apply Mocks" command can be rerun when the mock values change. When mocking a gRPC service the container is redeployed if the proto definition of the mock changes.

Tester

Tester is a configured to simplify the process of both writing and running tests for complicated distributed apps. Tester is available for use via the VSCode Extension, the Skyramp CLI, or the various supported language libraries. Tester features include the simplicity of specifying API requests in a test, which can be static or dynamically generated via a script, overriding mock configurations (such as the responses configured for a mock), and validation for responses received from the system under test. Tester features further include the ability to chain request and response values throughout the life of a test, load testing, report generation based on the results of a test, and metrics collection from the system under test (CPU and memory). In conjunction with Skyramp deployer and mocker, tester is configured to run powerful integration and load tests on a subset of an application under development, thereby increasing confidence and saving developers from flaky end-to-end tests.

Skyramp worker comprises tester which includes the core logic for running tests. Tester can be deployed in a variety of ways, such as a container in a Kubernetes cluster. Tester includes a test description that captures the instructions for running the test (what is called, where the call is made to, how the response should look, etc.). Further, Tester includes Javascript support for specifying pre-execution steps, post-execution steps, or for creating inputs for load tests.

Once the Skyramp worker is running, the VSCode extension, the Skyramp CLI, or a language library can be used to generate and manage distributed functional integration and performance tests. When ready to test a microservice, one of the methods described herein is used to send tests to the worker which controls the start of the tests. Once tests are completed the corresponding test results are presented.

Tester is configured to simplify the process of both writing and running tests for complicated distributed apps by enabling users to write and run functional and load tests using a simple declarative description. The Terminal Client is installed before using Tester, and the Skyramp worker is installed in the environment (e.g., in-cluster) where the tests will be run. The following steps of an embodiment to use Tester in the VS code extension include generating a test, editing the test, and starting the test.

Generate the Test

Skyramp is configured to provide a simple way to generate some default tests that work out of the box and can be a starting point for more complicated testing logic in different applications. Generally, when ready to test a service, the "Generate Test" command is run to generate a test configuration in the form of a ".yaml" file in the tests folder of the working directory. A prompt is provided to select an API schema file to test against and input some necessary configuration details including the test name, Kubernetes service name, port number, and proto service name (if applicable). More specifically, the "skyramp tester generate" command is used to generate tests for gRPC and OpenAPI services.

The "Generate Test" command creates a test configuration file in the "tests" folder for the specified service or alias, creates a scenario configuration file in the "scenarios" folder for each method defined in the microservice to be tested, and if the endpoint definition does not already exist, creates an endpoint configuration file in the "endpoints" folder. The generated test configuration ".yaml" files can be edited as described herein.

Configure the Test

The test description generated using the "tester generate" command is configured to run using default values for requests based on the API signature. Embodiments are configured to enable developers to edit the default values and add request steps by editing the generated test in the tests folder, thereby adding or changing configuration details to customize your tests. Examples follow of test, scenario, and endpoint configurations.

To configure the overall test behavior, a developer edits the test configuration file in the "tests" folder. An example of a test configuration for a gRPC service follows.

```
version: v1
test:
  name: routeguide
  testPattern:
    - requestName: SRouteguideERouteGuideMGetFeature
      startAt: 1
    - requestName: SRouteguideERouteGuideMListFeatures
      startAt: 1
    - requestName: SRouteguideERouteGuideMRecordRoute
      startAt: 1
    - requestName: SRouteguideERouteGuideMRouteChat
      startAt: 1
```

In this example, top-level test behavior is configured, including setting a name for the test and specifying the test pattern by referencing requests and scenarios as defined in the scenario configuration. Advanced capabilities like configuring load testing are available in the Test Description page as described in detail herein.

Scenarios are likewise configurable by editing the scenario configuration file in the "scenarios" folder. An example of a scenario configuration for a gRPC service is as follows.

```
version: v1
requests:
  - name: SRouteguideERouteGuideMGetFeature
    blob: |-
      {
        "latitude": 0,
        "longitude": 0
      }
    endpointName: s-routeguide-e-RouteGuide
    methodName: GetFeature
  - name: SRouteguideERouteGuideMListFeatures
    blob: |-
      {
        "hi": {
          "latitude": 0,
          "longitude": 0
        },
        "lo": {
          "latitude": 0,
          "longitude": 0
        }
      }
    endpointName: s-routeguide-e-RouteGuide
    methodName: ListFeatures
```

In this example, request behavior is defined for a specific method of the service and the endpoint and method name are specified as defined in the endpoint configuration. The request payload is customized using a static JSON blob. More complex requests can be created through the addition of advanced capabilities such as defining dynamic requests and adding overrides and parameters.

The scenario file generated using "tester generate" by default lists or includes the aforementioned requests. Advanced capabilities like assertions and chaining can be added through creation of additional scenario files in the scenarios folder. These files can reference the generated requests and provide more complex test scenarios.

Endpoint configuration files are located in the "endpoints" folder. An example of an endpoint configuration for a gRPC service follows.

```
version: v1
services:
  - name: routeguide
    port: 50051
    alias: routeguide
    protocol: grpc
endpoints:
  - name: routeguide-svc-RouteGuide
    methods:
      - name: GetFeature
      - name: ListFeatures
      - name: RecordRoute
      - name: RouteChat
    defined:
      path: ./pb/route_guide.proto
      name: RouteGuide
    serviceName: routeguide
```

The generated endpoint configuration comprises networking-level service details, including name, port, alias, and protocol. Additionally, it includes metadata related to various endpoints that a service can have, including the methods it supports and the associated proto file. Generally, no additional user configuration is required for endpoints.

Run the Test

Once the test description is in place then the test is ready to be run. To run the test, the specific test file to be used is referenced. To do this, refer to the "tests" directory. The name of the test will be the name of the respective file including the test, without the file extension. For example, if the file is located at "tests/checkout-test.yaml", the test file name will be "checkout-test".

After running the "Start Test" command to start the test, tester is configured to execute the test and output the test results in the "results" output directory. Output on the progress/status of the test is provided until completion of the test. If the command is interrupted (such as by sending a "SIGINT") the test will continue to run in the background in the worker. For an ongoing test, status can be checked by running "skyramp tester status <test file name>" and providing either the "address" or "namespace", as described herein.

In order to stop an ongoing test, the command "skyramp tester stop <test file name>" is run with either the "address" or "namespace" arguments.

Test Description

The Skyramp test description simplifies the process of writing and running tests for complex distributed applications. The test description comprises a test configuration file, scenario configuration files, and endpoint configuration files but is not so limited. The test configuration file, residing in the "tests" folder, defines the overall behavior of the test and enables the user to configure test patterns and load testing.

The scenario configuration files are located in the "scenarios" folder. These files define request behavior for specific methods or chains of requests and asserts in scenarios.

The scenario configuration files also allow developers to configure payloads, dynamic requests, and set overrides and parameters.

Endpoint configuration files are located in the "endpoints" folder. These files specify details related to the service's networking aspects, supporting gRPC, REST, JSON-RPC WebSocket, and JSON-RPC HTTP endpoints.

Skyramp is configured to dynamically generate a test description using service-level information. Alternatively, if it is preferred to create a test definition from scratch, developers can create ".yaml" files in the tests, scenarios, and endpoints directories of their project (e.g., my-test.yaml, my-scenario.yaml, and my-endpoint.yaml) and configure the necessary information as described in detail herein.

Test Configuration

The test configuration is the central component of the test definition and defines the overall test behavior. An example test configuration follows.

```
version: v1
test:
  name: routeguide
  testPattern:
    - startAt: 1
      scenarioName: scenario1
      atOnce: 2
      targetRPS: 3000
      duration: 10
      rampUp:
        duration: 3
        interval: 1
  override:
    mock:
      - endpointName: helloworld
        methodName: SayHello
        blob: |
          {
            "message": "myTest"
          }
```

In this example, "name" specifies the name of the test, "testPattern" enables the definition of various test scenarios, and "override" is configured to enable overriding of mock behavior. This example showcases advanced test capabilities including overrides and load testing. Overrides customize endpoint behaviors by specifying mocks. Load testing simulates heavy user traffic with features like target RPS and ramp-up controls.

Overrides

The "override" attribute in the test configuration is configured to enable customization of specific endpoints within tests, providing flexibility in testing scenarios. By setting the "override" attribute, a mock can be specified to modify an "endpoint" defined elsewhere in the project folder. This customization is configured to enable simulation of various scenarios for effective testing of application robustness. An example test configuration follows using the "override" attribute.

```
version: v1
test:
  name: routeguide
  testPattern:
    - startAt: 1
      scenarioName: scenario1
  override:
    mock:
      - endpointName: routeguide-svc-RouteGuide
        methodName: GetFeature
```

-continued

```
        blob: |-
          {
            "name": "fake",
            "location": {
              "latitude": 400,
              "longitude": 600
            }
          }
```

The "override" attribute is configured to customize endpoints. The "mock" section in this example specifies the details of the override using "endpointName", "methodName", and "blob" fields. The "endpointName" field identifies the endpoint to override, in this case, "routeguide-svc-Route(Guide". The "methodName" field specifies the specific method of the endpoint to modify, here, "GetFeature". The "blob" field includes the customized data or response to replace the original response from the endpoint. Leveraging the override attribute enables seamless adaptation of endpoint behaviors within tests, allowing for creation of various testing scenarios and evaluation of application performance under different conditions.

Load Testing

Load testing is configured to enable simulation of heavy user traffic on a microservice under test by transforming functional tests into load tests. This is achieved by incorporating specific load profile keywords into tests. An example test configuration follows including load testing parameters.

```
version: v1
test:
  name: routeguide
  testPattern:
    - startAt: 1
      scenarioName: scenario1
      atOnce: 2
      targetRPS: 3000
      duration: 10
      rampUp:
        duration: 3
        interval: 1
```

The "atOnce" attribute in the "testPattern" of this example signifies the concurrency of the "scenario1". For example, with "atOnce" set to 2, everything defined in "scenario1" runs with a concurrency of two (2), happening in parallel.

Embodiments include parameters configured to control the load. The "targetRPS" parameter specifies the target Requests Per Second (RPS) the application should handle. The "duration" parameter indicates the total duration of the load test in seconds. The "rampUp" parameter enables a gradual increase in the load on an endpoint. The "duration" parameter specifies how long it takes for the traffic ramp-up to occur, and the "interval" parameter signifies the rate at which traffic increases.

In the example above, the load increases over three (3) seconds, with increments every second until it reaches the target RPS of 3000. Modification of these values enables the modelling of traffic behavior for an application to test how the application responds to varying levels of load. If "targetRPS" is not specified, tester will attempt to send as many requests as possible within the system's context.

Scenario Configuration

The scenario configuration file of embodiments defines request behaviors for specific methods and creates scenarios as chains of defined requests and asserts. An example scenario configuration file follows.

```
version: v1
scenarios:
  - name: scenario1
    steps:
      - requestName: SRouteguideERouteGuideMGetFeature
      - asserts: requests.SRouteguideERouteGuideMGetFeature.res.name == "fake"
requests:
  - name: SRouteguideERouteGuideMGetFeature
    javascript: |-
      function handler(req) {
        // Your JavaScript logic here
        return {
          value: {
            latitude: x,
            longitude: y
          }
        };
      }
  - name: SRouteguideERouteGuideMListFeatures
    blob: |-
      {
        "hi": {
          "latitude": 0,
          "longitude": 0
        },
        "lo": {
          "
latitude": 0,
          "longitude": 0
        }
      }
    endpointName: s-routeguide-e-RouteGuide
    methodName: ListFeatures
```

In this example, the "scenarios" parameter enables different test scenarios to be defined, and this example includes a scenario named "scenario1". The "requests" parameter includes configurations for individual requests (to be referenced in scenarios by name).

Advanced capabilities of the scenario configuration of embodiments includes scenarios and asserts for creating end-user use cases and validating responses, dynamic requests configured to customize request handling logic, and chaining and overrides configured to chain values between sequential requests and override them as needed.

Scenarios and Asserts

Scenarios are representations of end-user use cases that require testing, allowing developers to define a sequence of actions to be performed, typically involving requests to specific endpoints. Each named scenario includes a "steps" attribute, listing these actions, which can be executed sequentially or concurrently, simulating various usage patterns, including load tests. In "scenarios", the associated steps are executed sequentially. To execute items in parallel, refer to the "testPattern" defined in the test configuration. An example scenario configuration follows.

```
version: v1
scenarios:
  - name: scenario1
    steps:
      - requestName: SRouteguideERouteGuideMGetFeature
      - asserts: requests.SRouteguideERouteGuideMGetFeature.res.name == "fake"
requests:
  - name: SRouteguideERouteGuideMGetFeature
    endpointName: s-routeguide-e-RouteGuide
    methodName: GetFeature
    javascript: |-
      function handler(req) {
        // Your JavaScript logic here
        return {
          value: {
            latitude: x,
            longitude: y
          }
        };
      }
```

In this example, "scenario1" is defined to include two steps executed sequentially. The first step utilizes the "requestName" attribute, referencing a "request" object previously defined in the configuration. The second step is an "assert" ~ statement, used to verify that the response from the request matches the expected value.

To use an assert, the "asserts" parameter is defined within the step, with a value in the format "requests.<name of request>.res.message=="<expected value>"" for example, where "<name of request>" refers to the name of the previously defined "request", and "<expected value," is a string representing the expected return value from the request. Values returned by services are interpreted as JavaScript for evaluating "assert" statements. The type may not always be a "string" but could be a "Boolean" or a "number", among other types. When working with a "Boolean", the "<expected value>" should be "true" or "false" and not "true" or "false" in the "assert" statement.

Dynamic Requests

Dynamic requests provide the flexibility to customize request handling logic in scenario configurations. Different attributes can be used to specify dynamic request behavior, such as "python", "pythonPath", "javascript", or "javascriptPath". Each attribute enables the defining of custom request handling logic and returns a JSON representation of the response value.

The creation of JavaScript-based dynamic requests of an embodiment includes use of the "javascript" attribute within the "requestValue" section of a request definition. A function is defined called handler that takes the req parameter. Developers can implement their custom JavaScript logic within the "handler" function and return a JSON object representing the response value. An example scenario configuration follows.

```
version: v1
requests:
  - name: SRouteguideERouteGuideMGetFeature
    javascript: |-
      function handler(req) {
        // Your JavaScript logic here
        return {
          value: {
            latitude: x,
            longitude: y
          }
        };
      }
    endpointName: s-routeguide-e-RouteGuide
    methodName: GetFeature
```

Alternatively, creation of JavaScript-based dynamic requests of an embodiment includes use of the javascriptPath attribute to specify the path to an external JavaScript script file that includes the custom request handling logic. An example scenario configuration follows.

```
version: v1
requests:
  - name: SRouteguideERouteGuideMGetFeature
    javascriptPath: scripts/getFeature.js
    endpointName: s-routeguide-e-RouteGuide
    methodName: GetFeature
```

The external JavaScript script file "getfeature.js" defines a "handler" function to process incoming requests and generate appropriate responses.

Installing NPM-Based Packages

If JavaScript-based dynamic requests use NPM-based packages, Skyramp is configured to enable specification of the packages in the "npmPackages" section of a test definition. The testing framework automatically installs these packages before running the test. An example test configuration follows.

```
version: v1
test:
  name: routeguide
  testPattern:
    - requestName: SRouteguideERouteGuideMGetFeature
      startAt: 1
    - requestName: SRouteguideERouteGuideMListFeatures
      startAt: 1
    - requestName: SRouteguideERouteGuideMRecordRoute
      startAt: 1
    - requestName: SRouteguideERouteGuideMRouteChat
      startAt: 1
  npmPackages:
    - mathjs
    - chart
```

Python Dynamic Requests

The creation of Python dynamic requests of an embodiment includes use of the "python" attribute within the "requestValue" section of a request definition. This attribute enables developers to define a function referred to herein as "handler" that takes the "req" parameter, representing the incoming request. Within the "handler" function, the custom Python logic is implemented. Finally, return a JSON representation of the response value using "SkyrampValue". An example scenario configuration follows.

```
version: v1
requests:
  - name: SRouteguideERouteGuideMGetFeature
    python: |-
      def handler(req):
        // Your Python logic here
        return Skyramp Value(
          value={
            "latitude": x,
            "longitude": y
          }
        )
    endpointName: s-routeguide-e-RouteGuide
    methodName: GetFeature
```

Alternatively, the creation of Python dynamic requests of an embodiment includes use of the pythonPath attribute to specify the path to an external Python script file containing custom request handling logic. An example scenario configuration follows.

```
version: v1
requests:
  - name: SRouteguideERouteGuideMGetFeature
    pythonPath: scripts/get__feature.py
    endpointName: s-routeguide-e-RouteGuide
    methodName: GetFeature
```

The external Python script file "get_feature.py" defines a "handler" function to process the request and generate the response.

Chaining and Overrides

Tester is configured to chain values between sequential requests and override them. Using this feature, dynamic test scenarios can be created for which the output of one request influences the behavior of subsequent requests, making the testing more versatile and powerful. An example test configuration follows.

```
version: v1
test:
  name: routeguide
  testPattern:
    - startAt: 1
      scenarioName: scenario1
  override:
    mock:
      - endpointName: routeguide-svc-RouteGuide
        methodName: RouteChat
        javascript: |-
          function handler(req) {
            return {
              value: {
                message: req.value.message + "temp",
                location: {
                  latitude: req.value.latitude,
                  longitude: req.value.longitude
                }
              }
            }
          }
```

An example scenario configuration follows.

```
version: v1
scenarios:
  - name: scenario1
    steps:
      - requestName: SRouteguideERouteGuideMRouteChat
      - asserts: requests.SRouteguideERouteGuideMRouteChat.res.message ==
"message1temp"
      - requestName: SRouteguideERouteGuideMRouteChat
        override:
          message: requests.SRouteguideERouteGuideMRouteChat.res.message
      - asserts: requests.SRouteguideERouteGuideMRouteChat.res.message ==
"message1temp1temp"
      - requestName: SRouteguideERouteGuideMRouteChat
        override:
          message: requests.SRouteguideERouteGuideMRouteChat.res.message
      - asserts: requests.SRouteguideERouteGuideMRouteChat.res.message ==
"message1temp1temp1temp"
requests:
  - name: SRouteguideERouteGuideMRouteChat
    endpointName: s-routeguide-e-RouteGuide
    methodName: RouteChat
    vars:
      message: "message"
    javascript: |
      i = 0
      function handler( ) {
        i++
        return {
          value: {
            message: vars.message + i,
            location: {
              latitude: req.value.latitude,
              longitude: req.value.longitude
            }
          }
        }
      }
```

In this example, the "override" attribute in the "test" section allows for customization of the behavior of an "endpoint" defined elsewhere in the project folder by specifying a "mock".

Within the "scenarios" section, multiple steps are defined. Each step calls the "SRouteguideERouteGuideMRouteChat" request and includes an "assert". What sets them apart is that in subsequent "requestName" calls, the "message" variable is overridden. The "message" variable takes on the value of the response returned by the request. This chaining is done multiple times to create a sequence of messages.

The "requests" attribute shows how the "vars" keyword is used to define a new variable called "message" in the "SRouteguideERouteGuideMRouteChat" request. This variable is utilized in the JavaScript snippet using "vars.message". By overriding this variable in "scenario1", the message content can be modified in the subsequent requests.

Request Parameters and Headers

When making REST calls, requests often require headers, such as Basic Authentication information, and variables in the path. This is achieved using the request object. An example scenario configuration is as follows.

```
version: v1
requests:
  - name: addCartRequest
    endpointName: cart-service
    methodName: cart-service-post
    blob: |
      {
```

-continued

```
        "product_id": "OLJCESPC7Z",
        "quantity": 1
      }
    headers:
      Authorization: "Basic YWxhZGRpbjpvcGVuc2VzYW11"
    params:
      - name: user_id
        in: path
        value: abcde
```

In the "cart-service" endpoint of this example, if the path includes a path parameter (/cart/user_id/{user_id}), developers can define a "params" attribute and set "user_id" to "abcde" Importantly, because "in" is set to "path", it is treated as a path parameter. Further, "in" can also be set to "query" to make it a REST query parameter.

The "headers" attribute adds a header with the key "Authorization" and the value "Basic YWxhZGRpbjpvcGVuc2VzYW11". This allows for inclusion of headers in the requests, which can be used for authentication and other purposes.

Endpoint Configuration

The endpoint configuration file defines networking-level service details for an endpoint. An example endpoint configuration follows.

```
version: v1
services:
  - name: routeguide
    port: 50051
    alias: routeguide
    protocol: grpc
endpoints:
  - name: routeguide-svc-RouteGuide
    methods:
      - name: GetFeature
      - name: ListFeatures
      - name: RecordRoute
      - name: RouteChat
    defined:
      path: ./pb/route_guide.proto
      name: RouteGuide
    serviceName: routeguide
```

Numerous attributes are included for use in configuring the endpoint file. The "services" attribute lists the services available in the project. In this example, there is one service named "routeguide". Under the "endpoints" section, individual endpoints are defined, specifying the available methods, the service definition path, and the service name. This example includes an endpoint named "routeguide-svc-RouteGuide" for the RouteGuide service. Within each endpoint, available methods are listed using the "methods" attribute. This example includes methods like "GetFeature", "ListFeatures". "RecordRoute", and "RouteChat". This helps specify the details of each method and how it should behave. The "defined" attribute is configured to specify the service definition file path and the service name. The service definition file ("route_guide.proto") outlines the structure of the service and its methods.

By configuring endpoints, developers define the available services and methods within their project, facilitating the testing of their distributed application. It is recommended that users dynamically generate a test by providing service-level information but embodiments are not so limited.

Dashboard

Skyramp embodiments include a Dashboard configured for in managing the testing environment including test results and mocks. Execution of the command "skyramp dashboard up" is configured to deploy the Skyramp Dashboard. This command automates the deployment process, creating essential Kubernetes assets (client, server, and MongoDB Kubernetes Operator) within the "skyramp" namespace of the cluster, and also initiates port forwarding for local access. Once the dashboard is live, the Terminal Client is configured to provide the forwarding address and the browser automatically opens.

Running the command "skyramp dashboard up" opens the dashboard in a new browser tab. Once the dashboard is running, tester is used to execute tests in-cluster and view the results automatically in the Test Results section of the dashboard as described in detail herein. For example, if two tests referred to as "Checkout system testcase" and "Checkout system load test testcase" are run, then their respective results are displayed in the Test Results section of the dashboard. From the Test Results page of the dashboard, a developer can click through to the "Checkout system testcase" to see the functional test results, including output, errors, duration, and status.

The Dashboard is configured so a developer can navigate to the "Checkout system load test testcase" to view the load test results including various load-related outputs and graphs related to latency, error rate, requests per second (RPS), and pod-specific utilization. Dashboard test results are valuable for retaining test run history and sharing among development team members on a shared cluster.

With the dashboard running, mocker can be used to apply mocks in-cluster and track active mocks as described in detail herein. For example, if the "payment-service" is mocked using "skyramp mocker apply", then active mocks and responses can be viewed in the Mocked Services section of the Dashboard. This is particularly useful when managing multiple mocks across teams on a shared cluster and keeping track of the payloads for each endpoint.

Skyramp Operational Examples

Following are descriptions of operational examples involving use of Skyramp.

Skyramp & Github Codespaces for Kubernetes Development

Figure 3A:
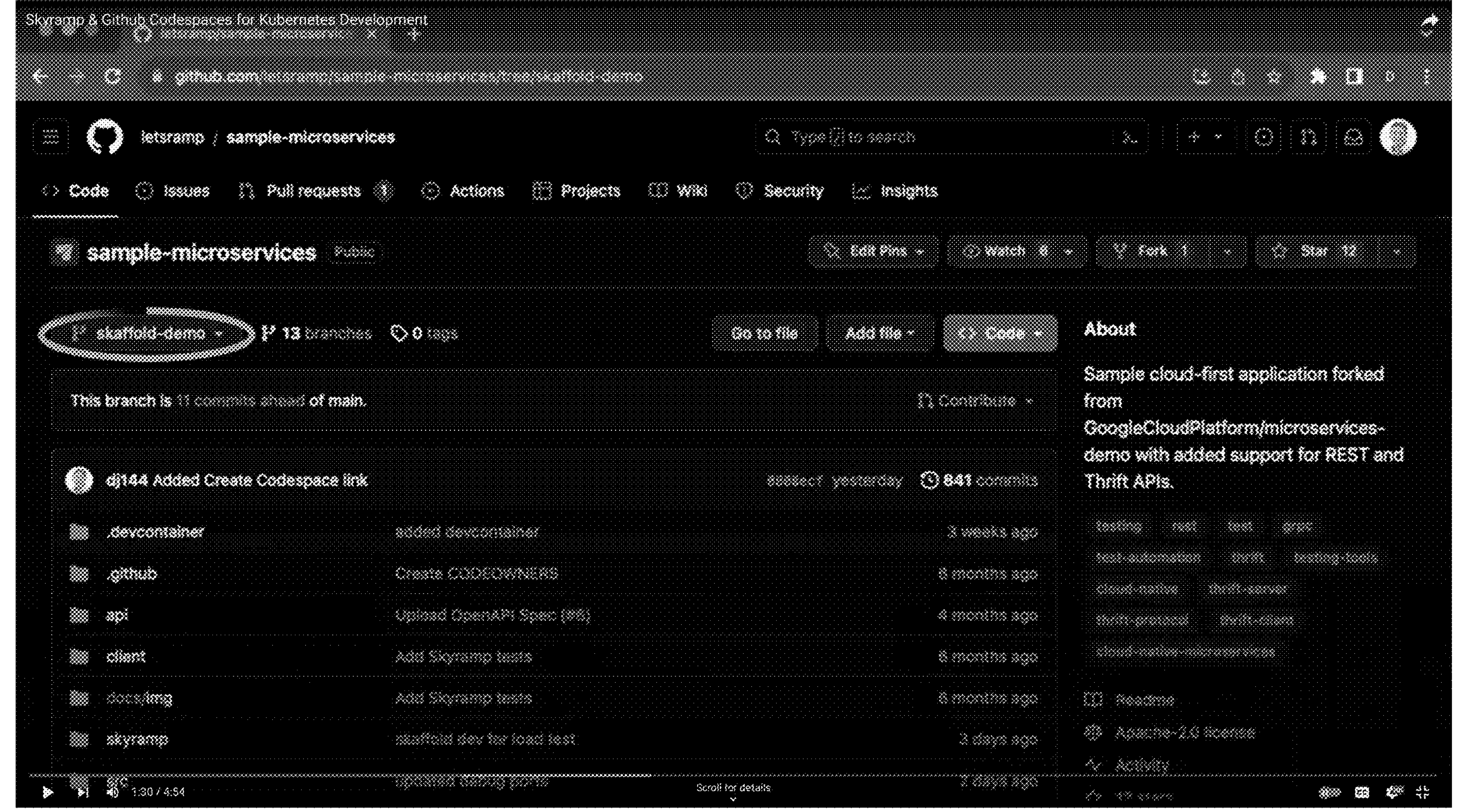
FIGS. 3A-3P show a screenshot sequence for Skyramp when testing and mocking microservices in a Kubernetes cluster, under an embodiment.
Figure 3B:
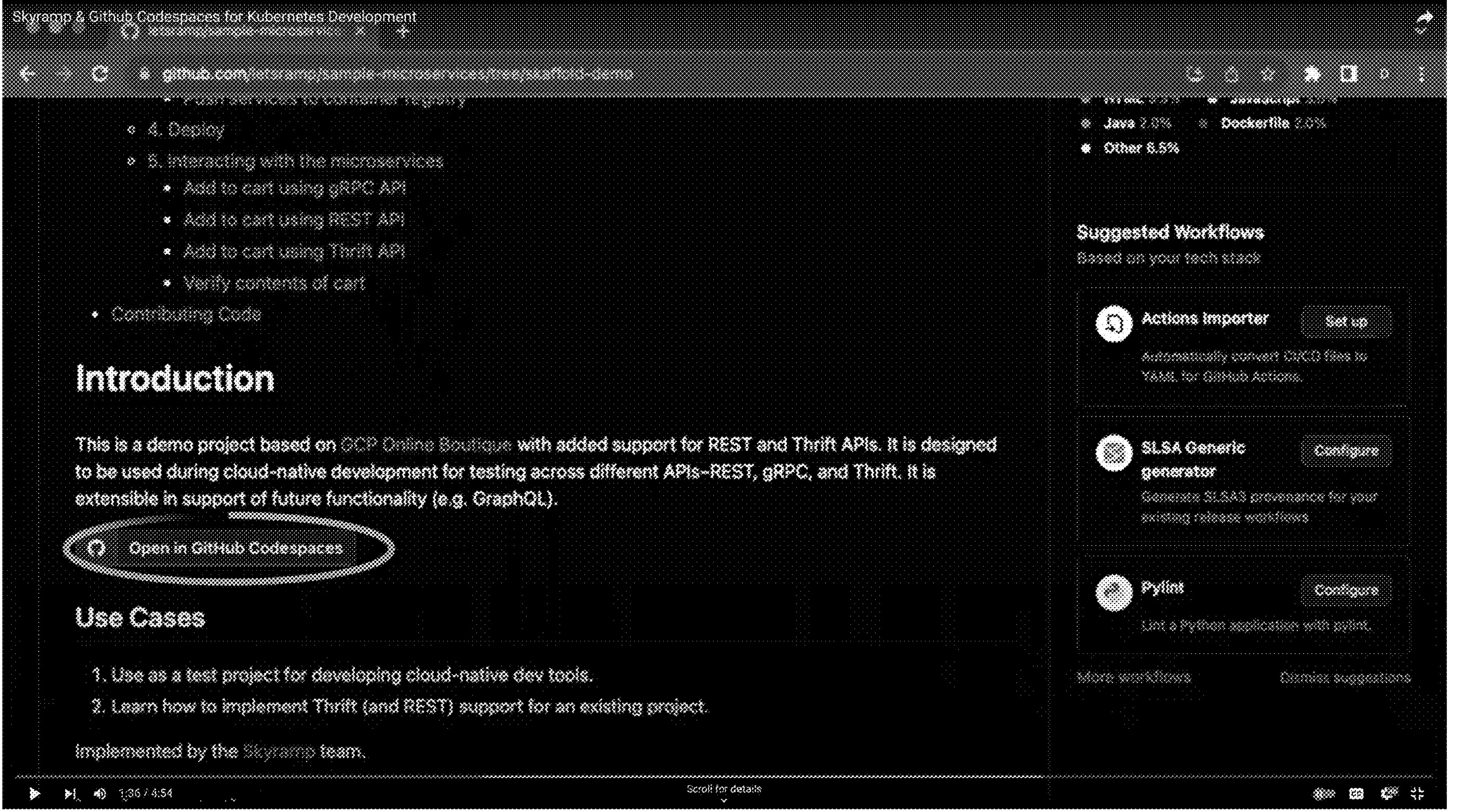

Skyramp makes integration and performance testing for distributed applications easier by automating manual tasks to save you time. FIGS. 3A-3P show a screenshot sequence for Skyramp when testing and mocking microservices in a Kubernetes cluster, under an embodiment. This example demonstrates how Skyramp can be used in any development (dev) environment to test and mock microservices by leveraging GitHub code spaces.

This example includes the Cloud native microservices demo application Online Boutique, a web-based e-commerce app with sample functionality including product catalog, shopping cart, recommendations and payment that uses GRPC APIs. Skyramp also includes support for REST and Thrift APIs in the fork of the repository.

More specifically, this example demonstrates testing whether the checkout subsystem of Online Boutique is functioning correctly. Typically, the API endpoints of the services under test can only be accessed from within the Kubernetes cluster so you either have to set up a very permissive Gateway or proxy, or manually package tests into a container that can run in the cluster. Use of the Skyramp tester avoids this manual work, thereby saving time and enabling focus on the test payload.

Figure 3C:
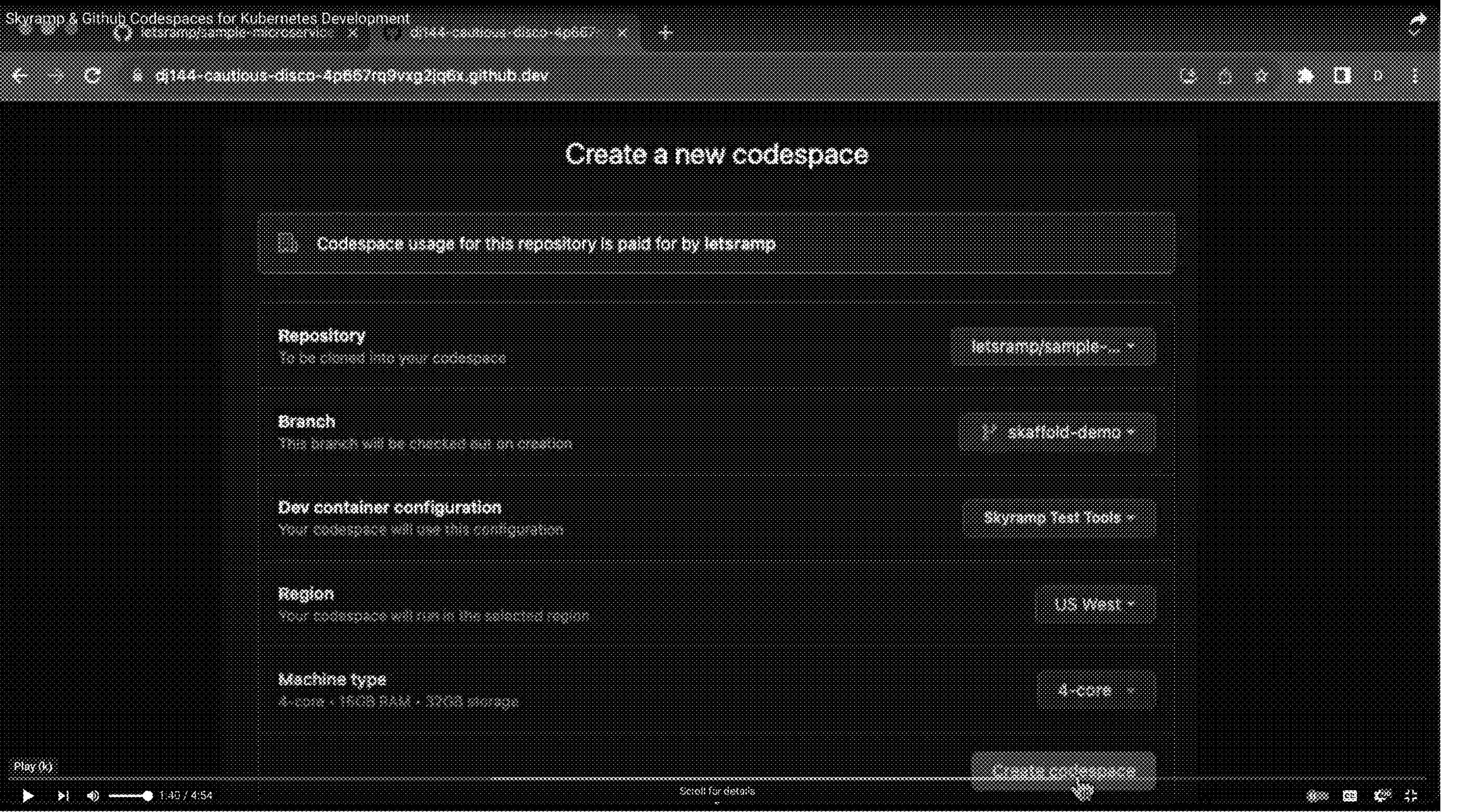
Figure 3D:
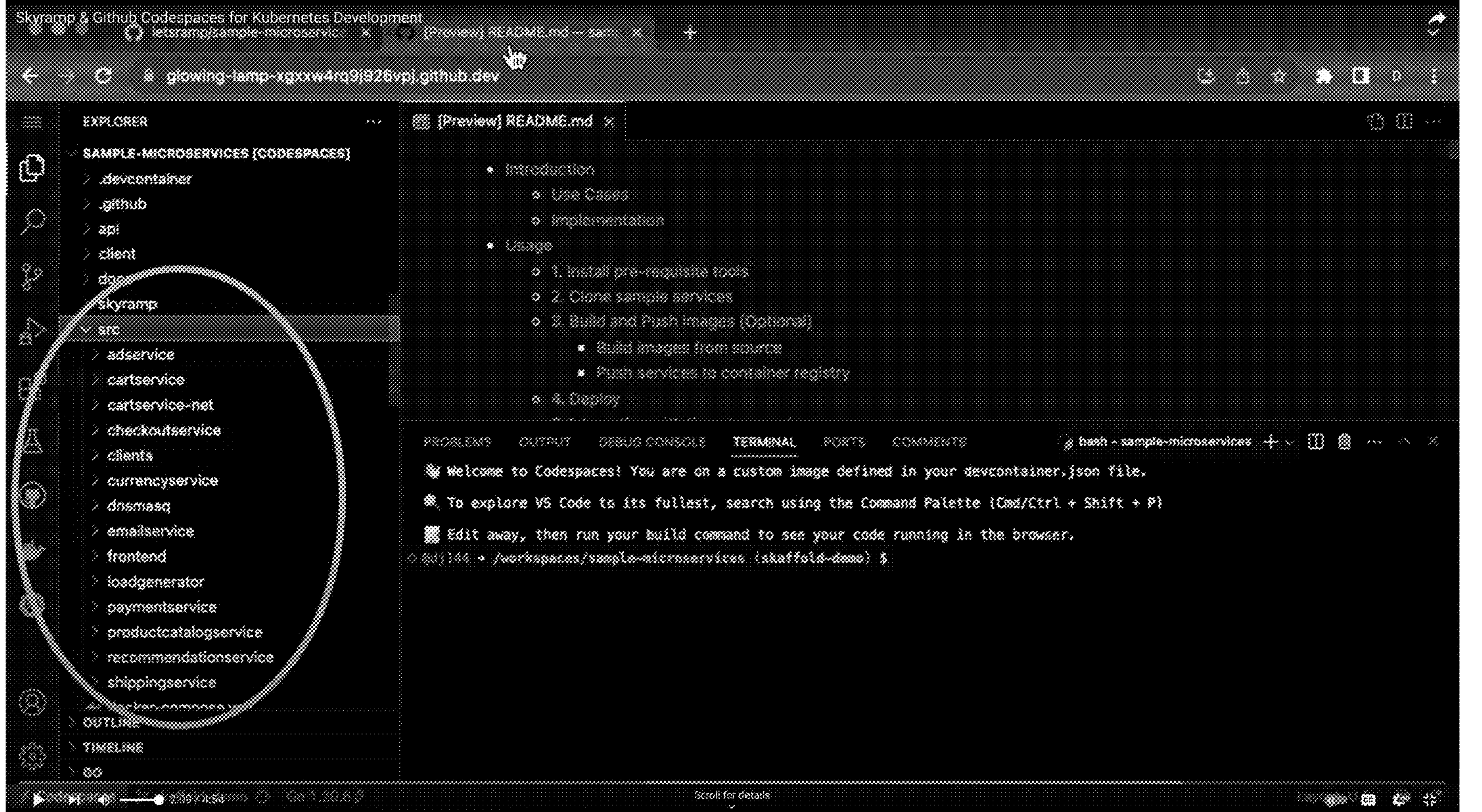

From the skaffold demo branch (FIG. 3A) in the sample-microservices repository, click "Open in GitHub Codespaces" from the readme (FIG. 3B), then click "create code space" (FIG. 3C). The codespace virtual machine (VM) is running a Visual Studio (VS) code server and a Dev container with the Skyramp client pre-installed from the configuration defined in the devcontainer.json file. Upon creation of the code space, a VS code workspace is present in the browser tab with the source code pre-loaded (FIG. 3D).

Figure 3E:
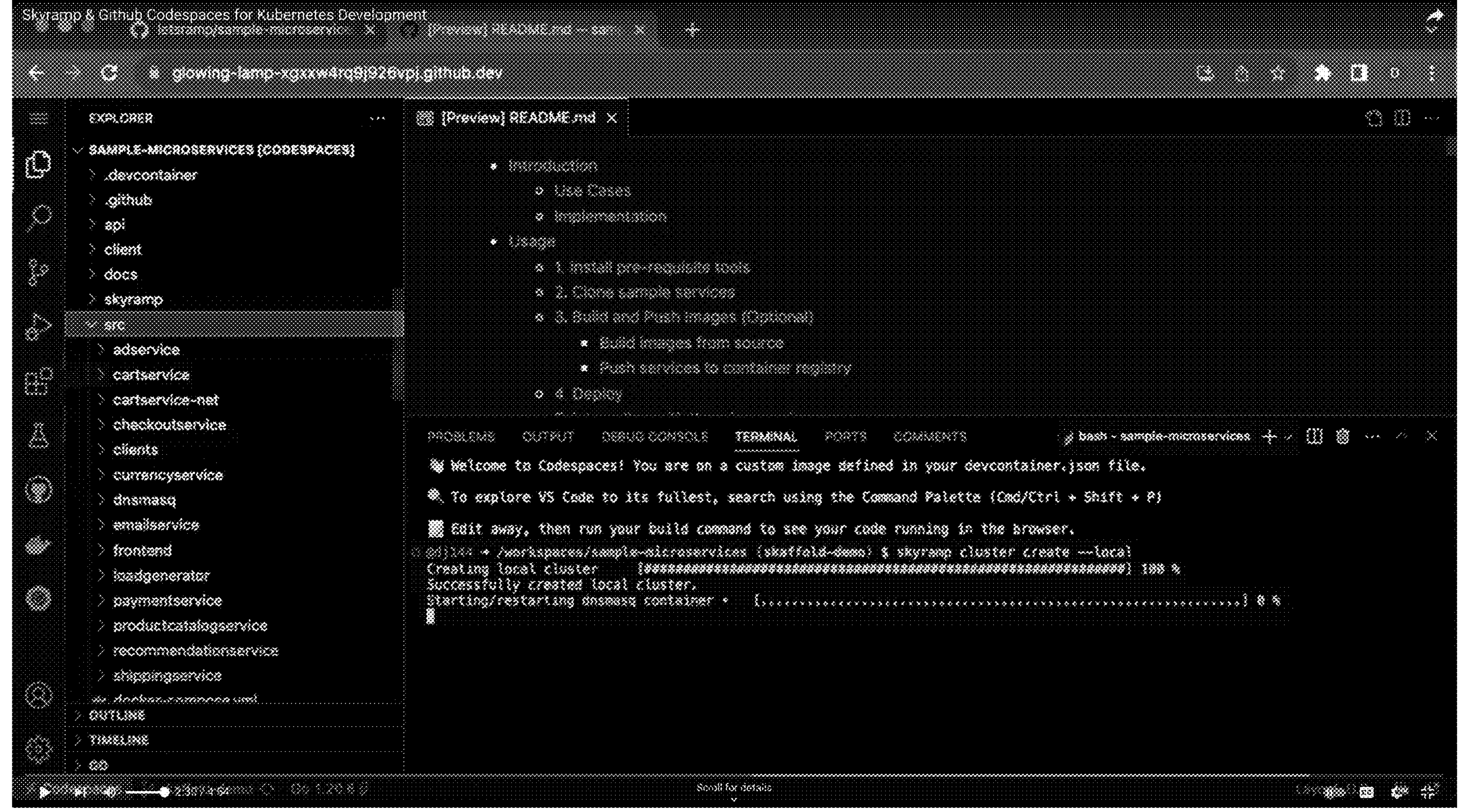

In this example a local cluster is spun up using the command "skyramp cluster create—local" (FIG. 3E). This cluster is used to host testing of the microservices and mocking of their dependencies. Optionally, Skyramp provides the option for the user to register their own cluster.

Figure 3F:
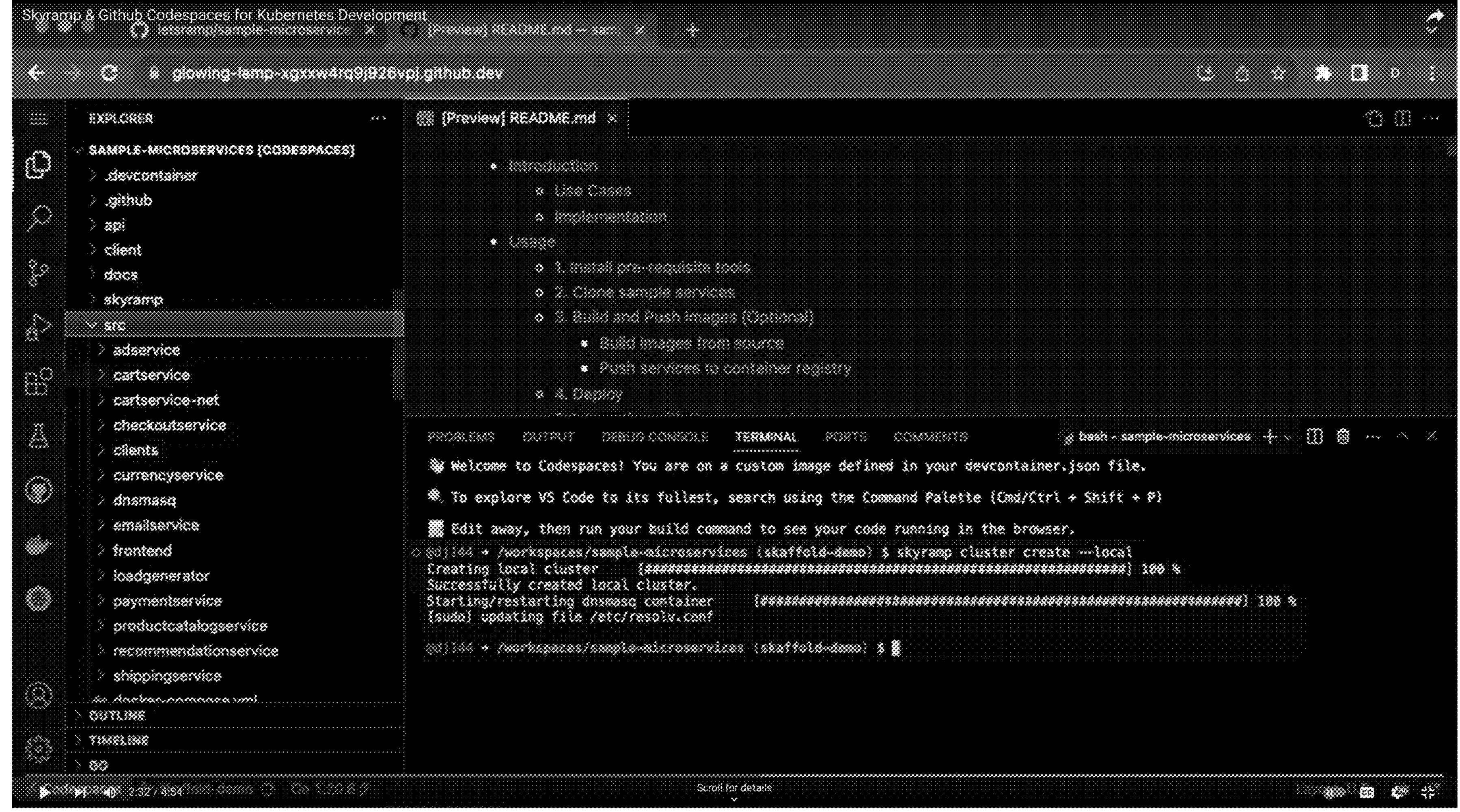
Figure 3G:
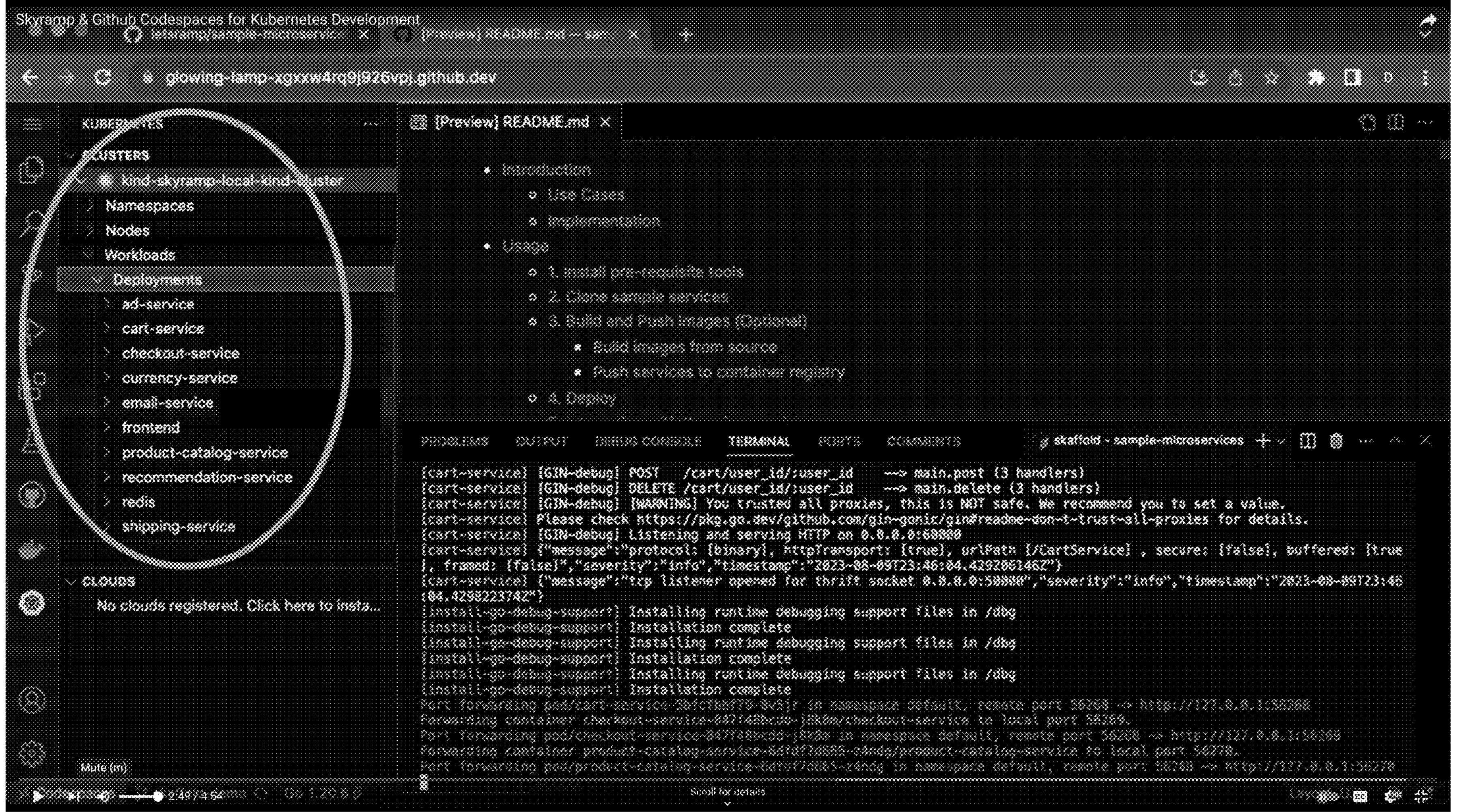

The services of the checkout subsystem are then deployed using scaffold (FIG. 3F). With the microservice under test now deployed in the code space the Kubernetes VS code extension is used to see the cluster and deployments (FIG. 3G). In order to avoid needing a gateway or a proxy or manually packaging the tests to run in the cluster, Helm is used to install the Skyramp worker for use in conducting the test. With the checkout subsystem and the worker in place the functional integration testing can proceed.

Figure 3H:
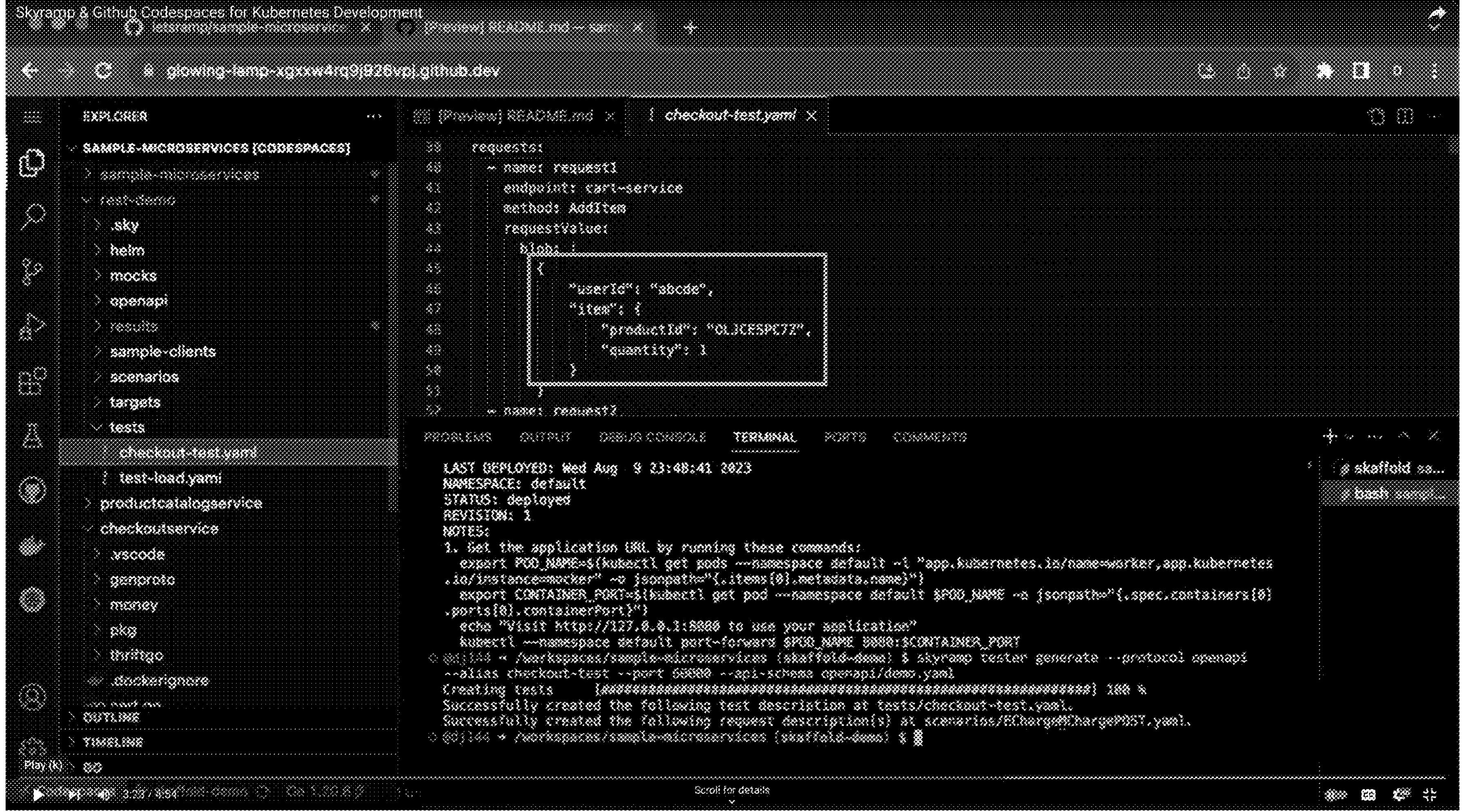
Figure 3I:
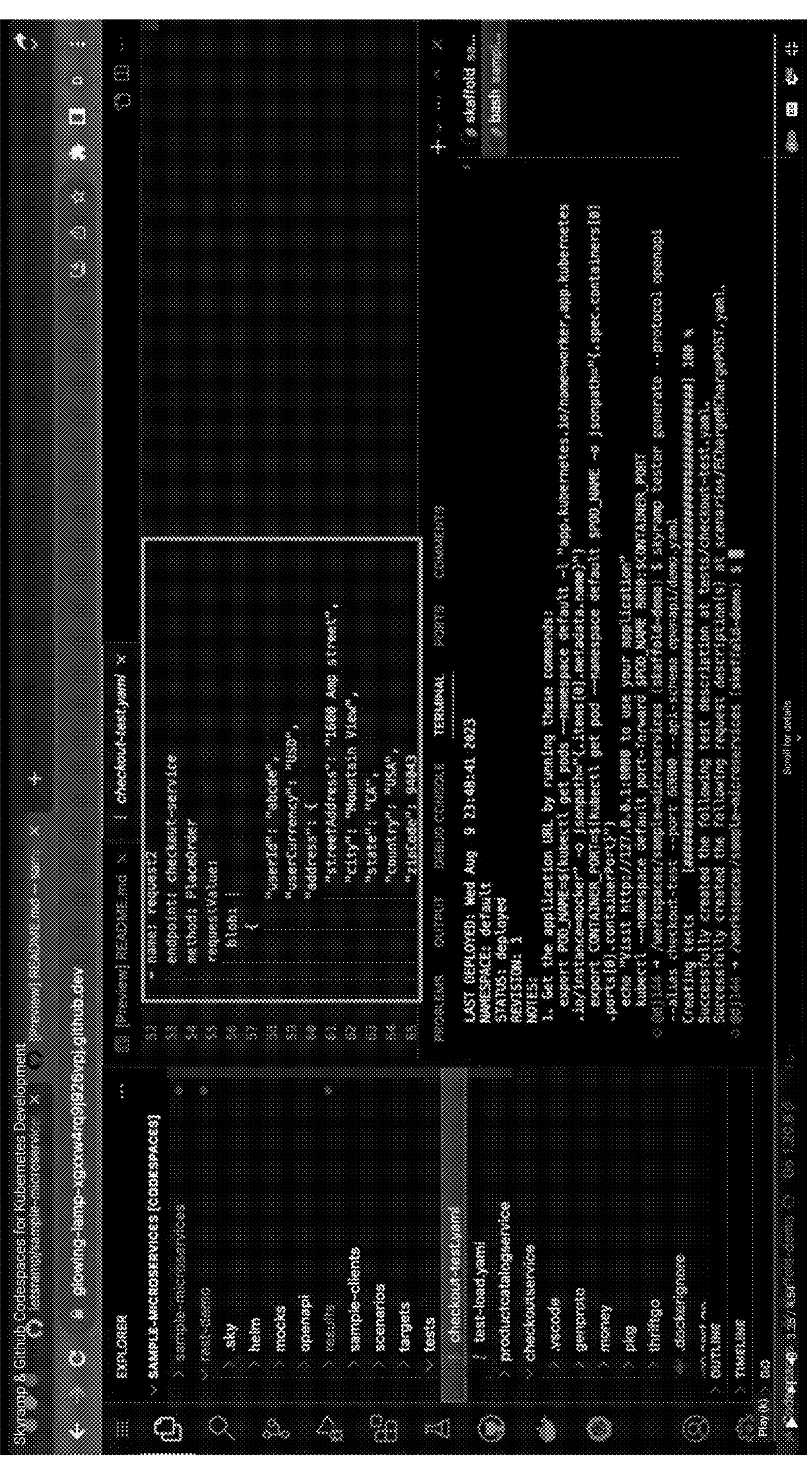
Figure 3J:
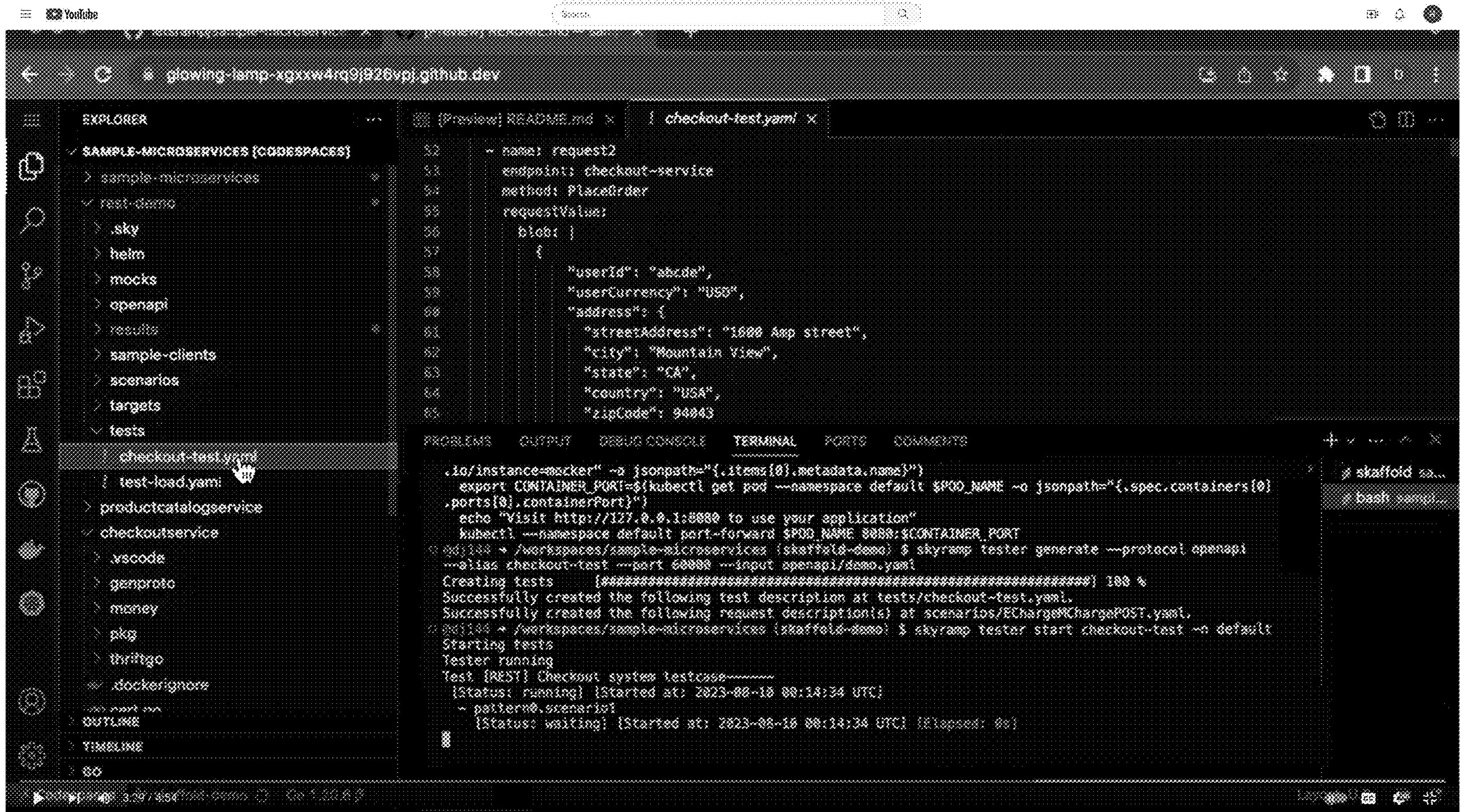
Figure 3K:
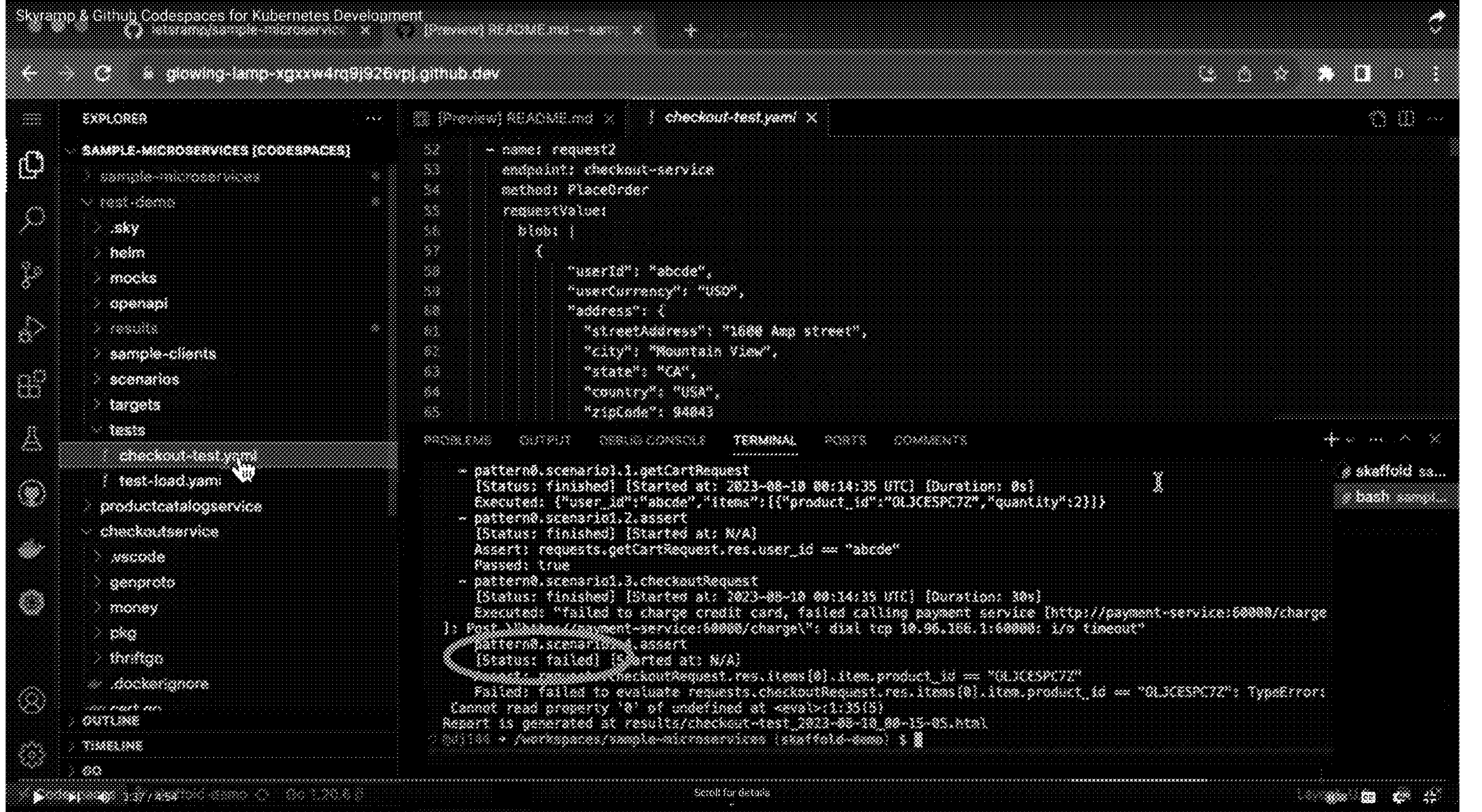
Figure 3L:
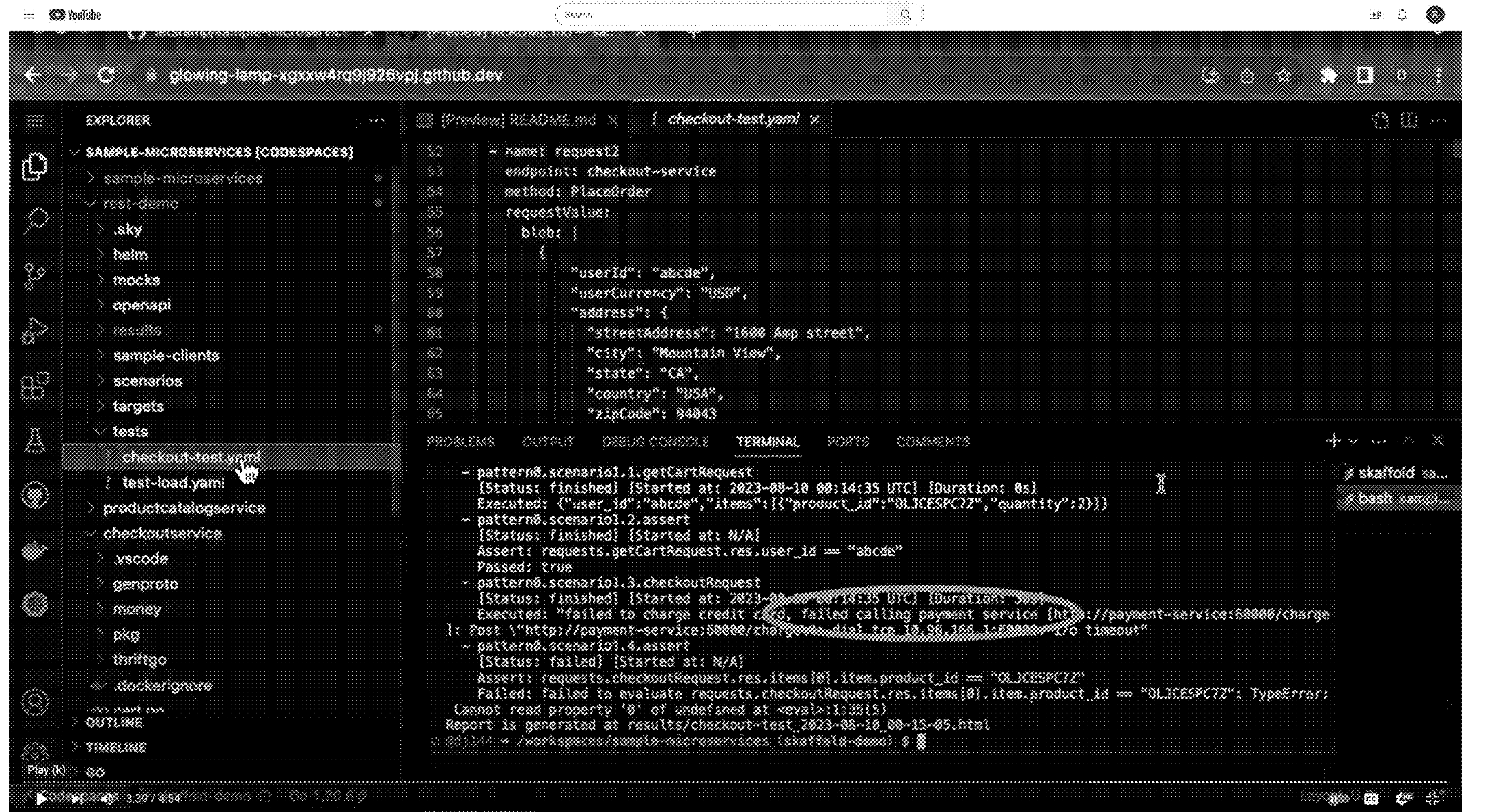

With a few simple user inputs, a natural test description is created that attempts to add an item to the cart (FIG. 3H) and then to check out (FIG. 3I). Skyramp tester is then run to send the generated test description to the worker to test the checkout subsystem (FIG. 3J). In this example the test fails (FIG. 3K) because the payment service is missing (FIG. 3L).

Figure 3M:
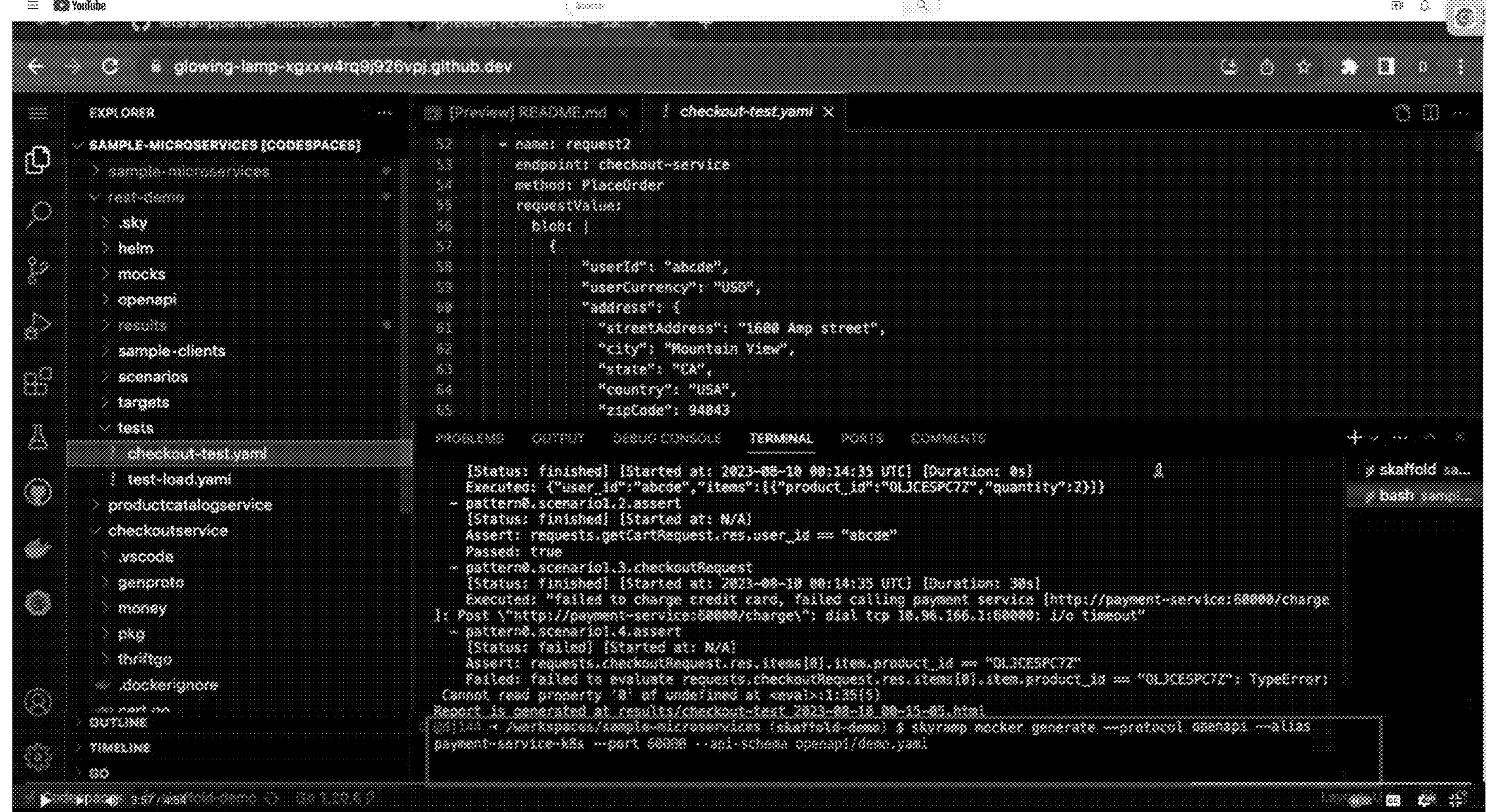
Figure 3N:
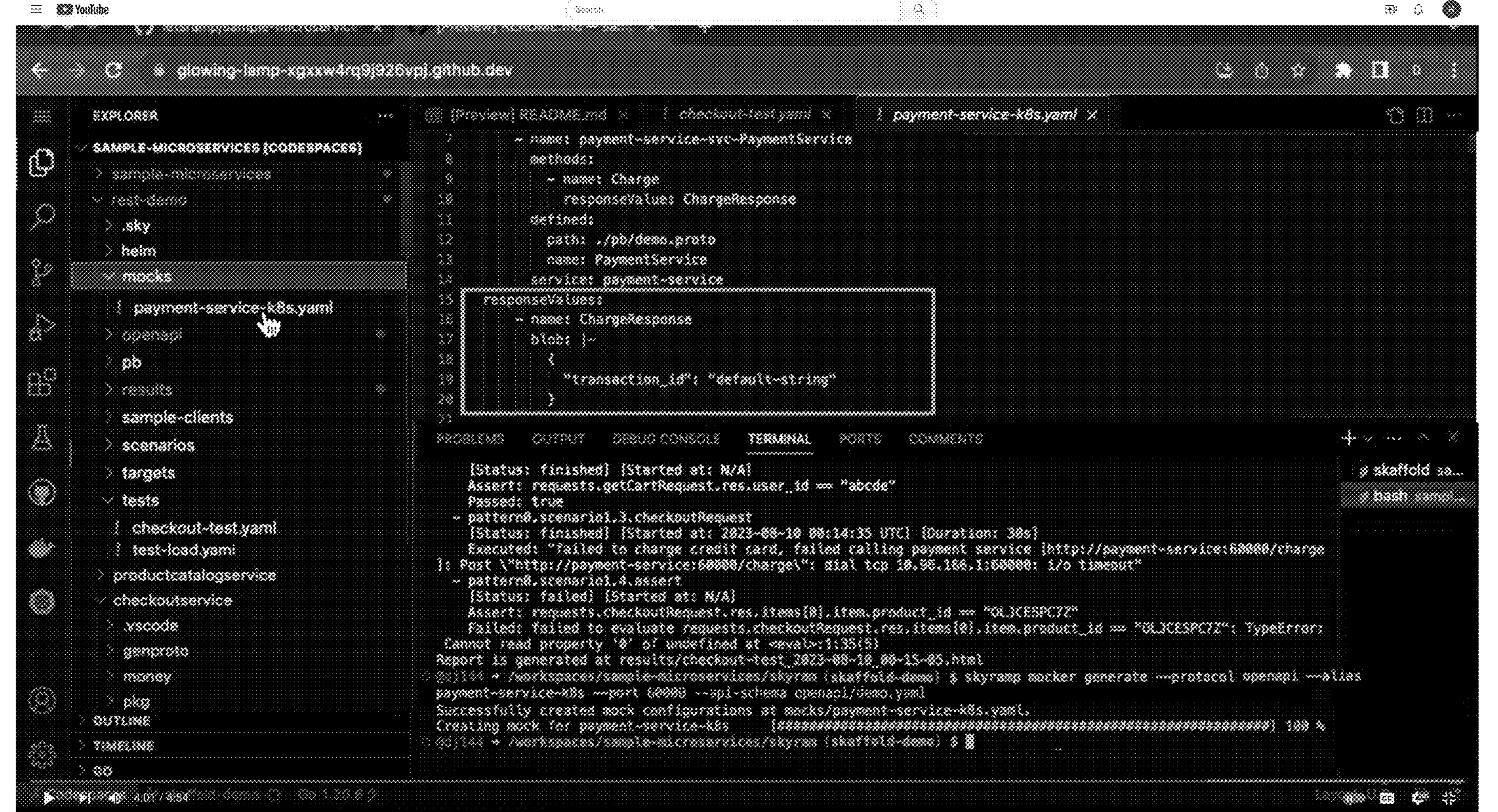
Figure 3O:
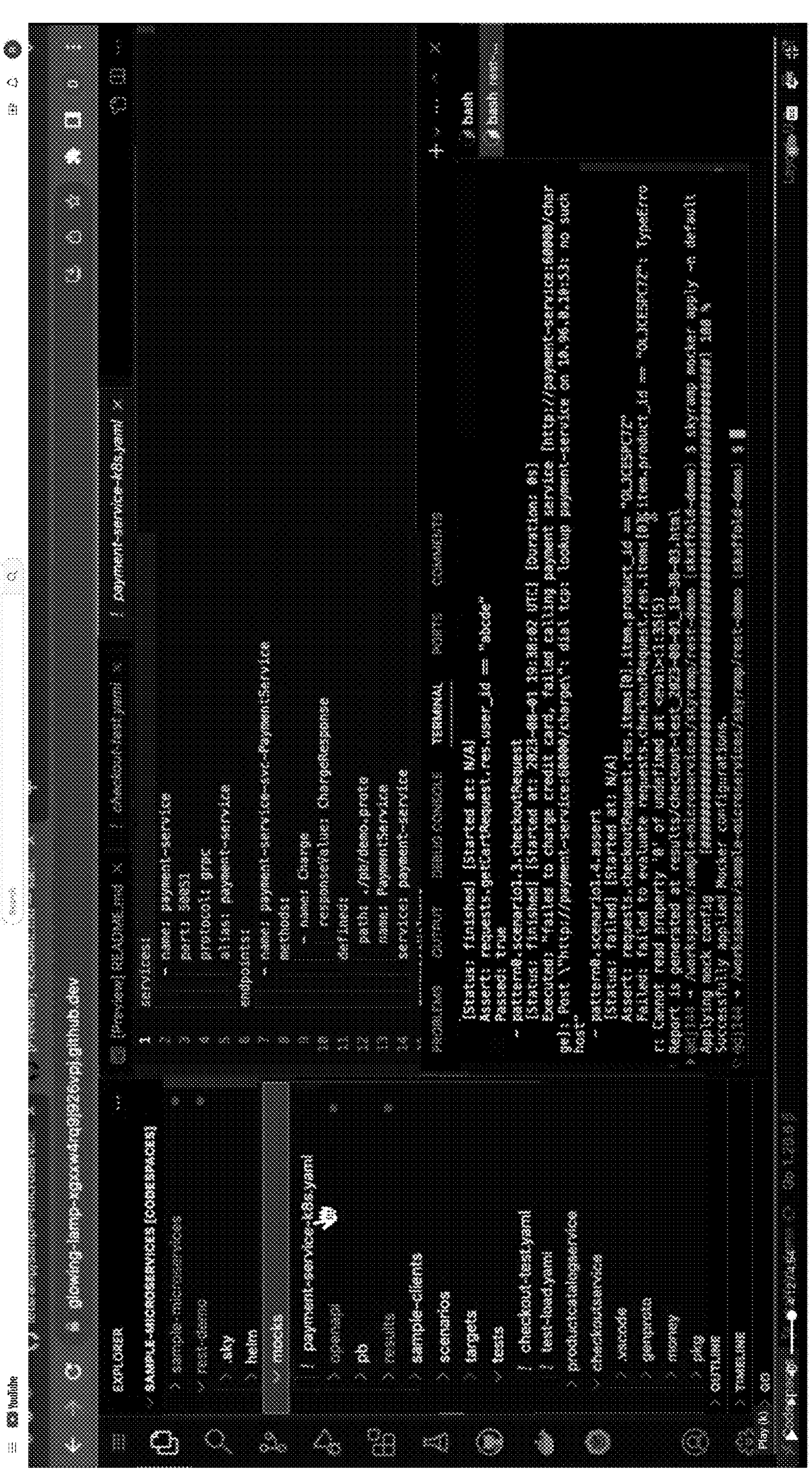
Figure 3P:
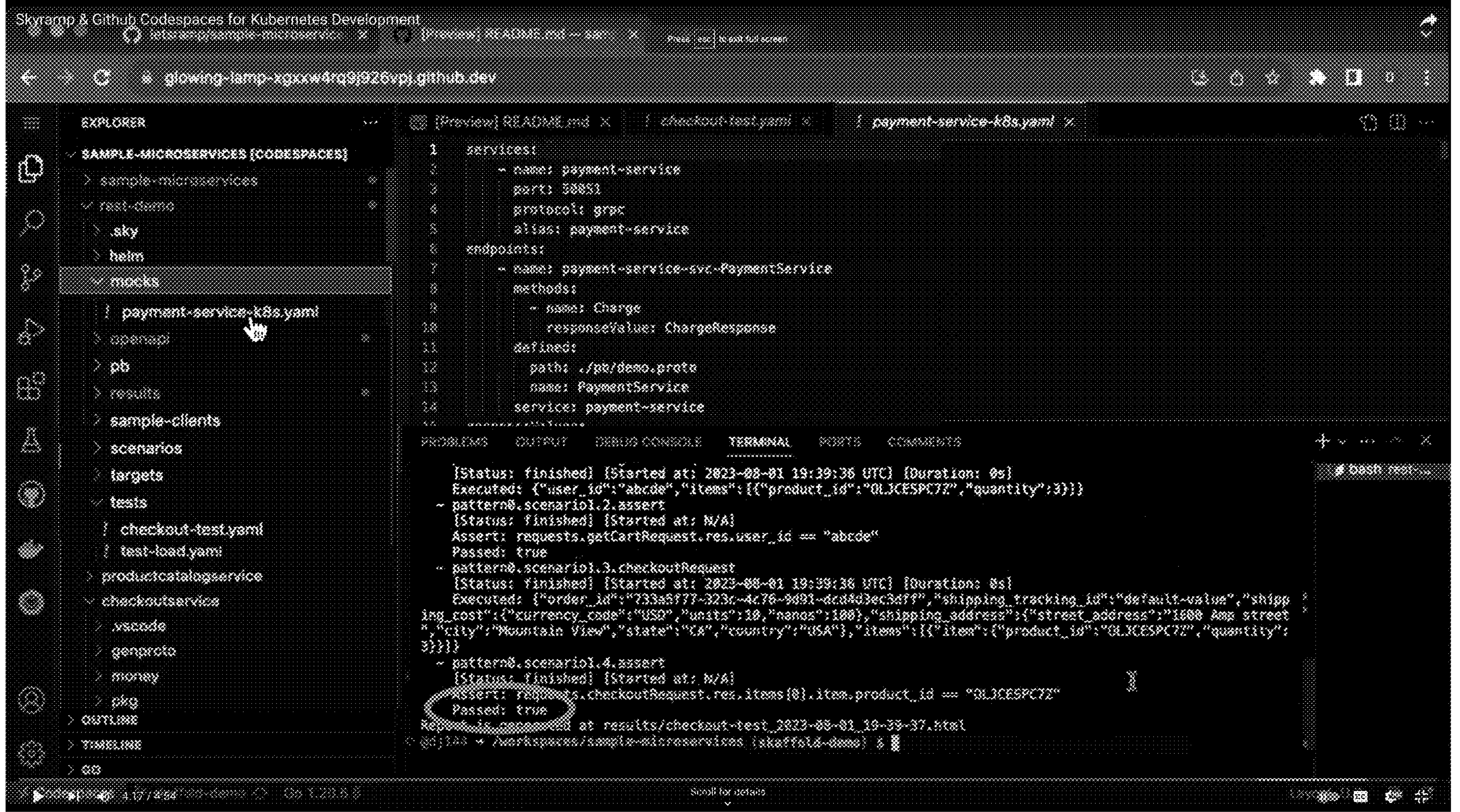

Skyramp is used to mock internal or external dependencies like the payment service (FIG. 3M) and avoid the complexity of deploying the missing dependency. Just like tests, mocks are also generated by Skyramp. Mock responses can either be static as in this generated description (FIG. 3N) or dynamically generated by a script. Following generation, the mock description is sent to the worker to mimic or stand in for the payment service (FIG. 3O). The test is repeated again with the mock in place and it now passes (FIG. 3P).

Missing dependencies will no longer derail the microservice testing process when using Skyramp. In this manner Skyramp makes functional integration testing for distributed applications easier by saving valuable time through automation and avoiding complicated dependency management. In combination with the flexibility of GitHub code spaces, Skyramp lets you confidently go beyond unit testing and deliver rock solid applications.

Hot Code Reload: Testing and Debugging Microservices in Real Time

FIGS. 4A-4M show a screenshot sequence when using the hot code reload feature of Skyramp to enable real-time iterative testing and debugging of code, under an embodiment. This example also includes use of the Cloud native microservices demo application Online Boutique as described herein.

This example assumes there was an issue reported with checkout for Online Boutique. The relevant services are deployed using Skyramp deployer configured with hot code reload to debug the issue. Once the relevant services are up, the tester is used to verify that there is indeed an issue with the checkout subsystem. Finally, the code is debugged, and the bug is fixed and then validated, all of which are performed in real-time in a Kubernetes cluster without any redeployments.

Figure 4A:
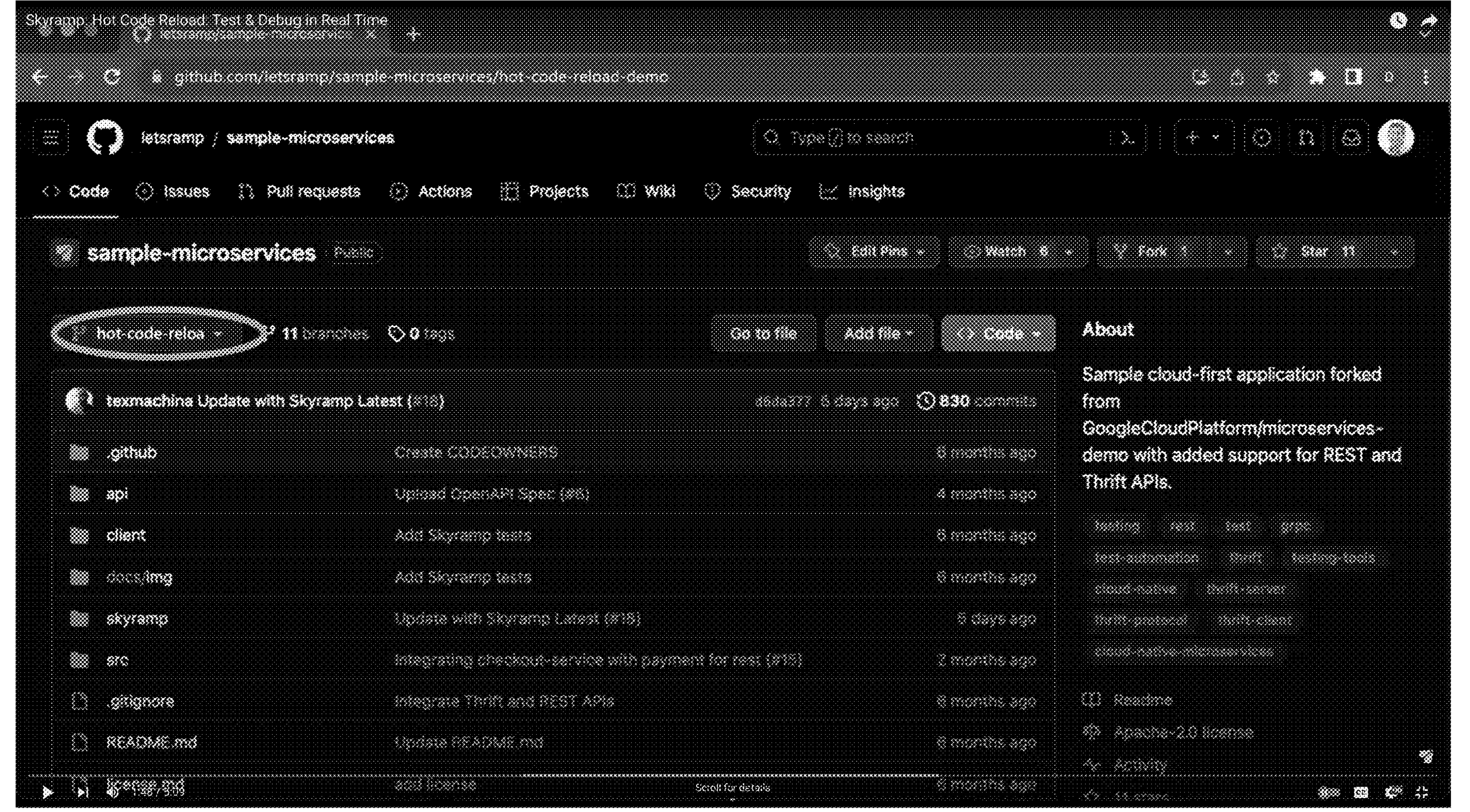

This example begins with a user cloning the hot code reload demo branch from the Skyramp sample microservices repository on GitHub (FIG. 4A). This will be used as the code base. The VS code is then used to load the project. Note, this same flow works with any other IDE.

Figure 4B:
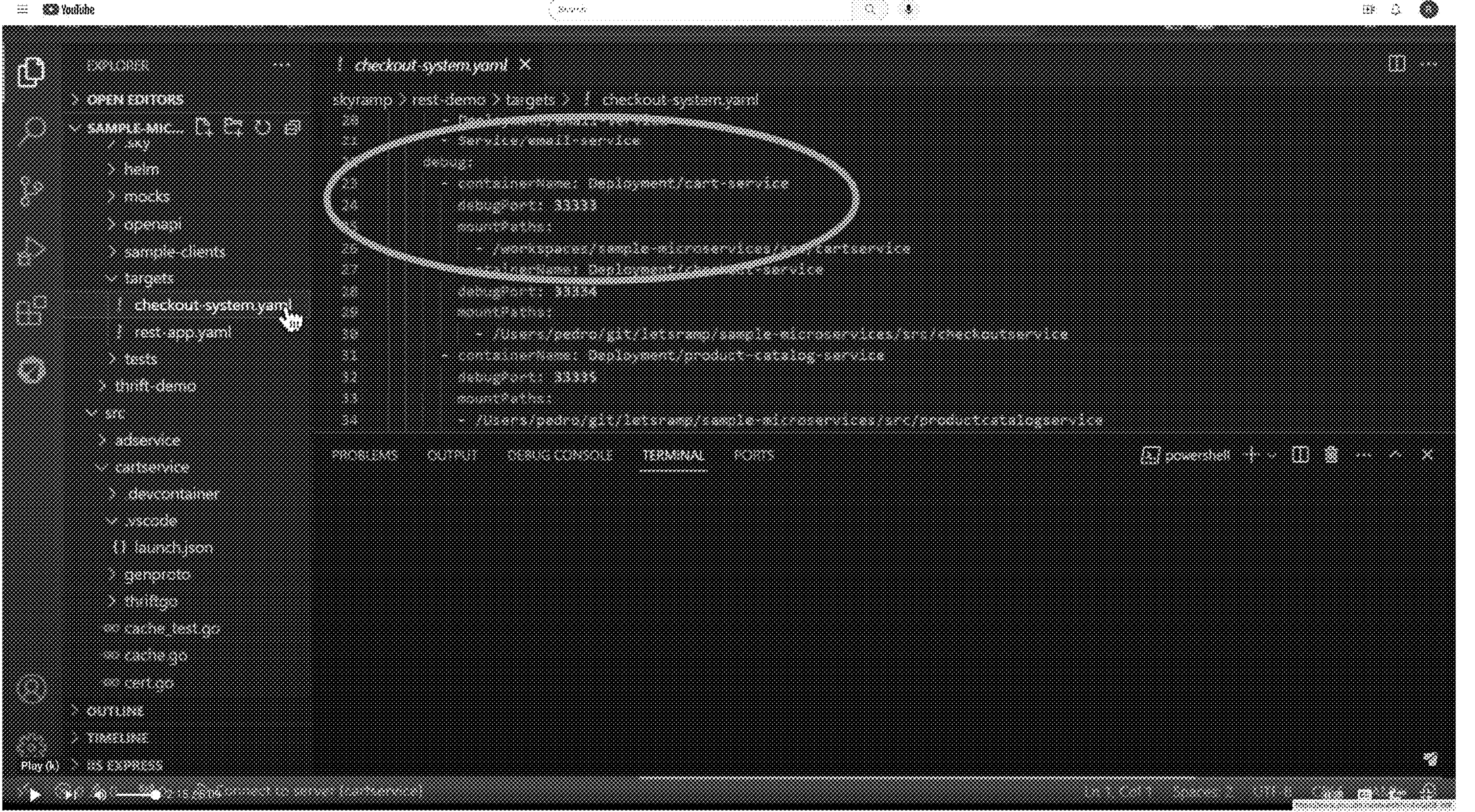
Figure 4C:
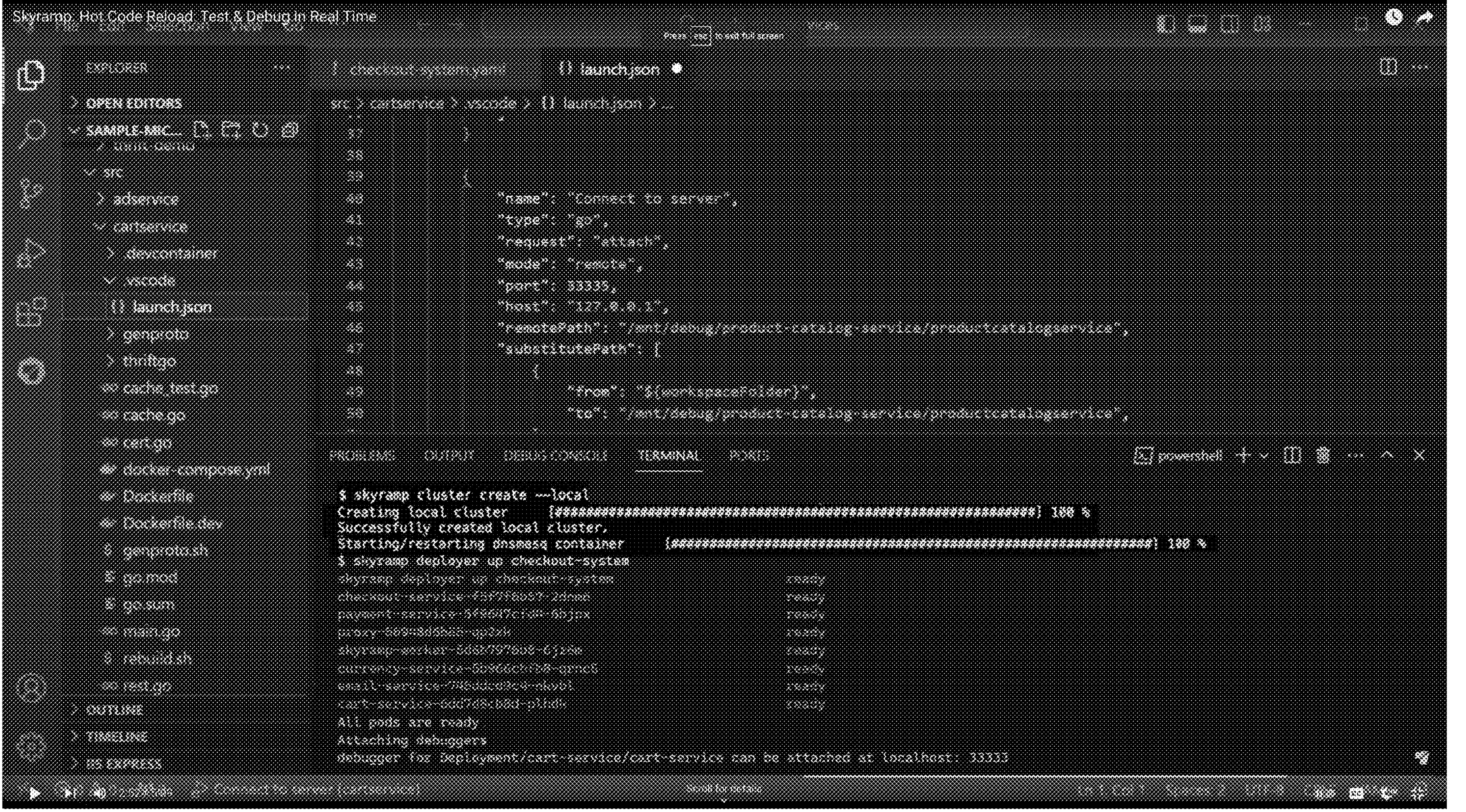

Referring to the target description file, a debug section is used to deploy the services that need hot code reload (FIG. 4B). This enables making code changes without tearing down and redeploying services. The debugger is configured for VS code by matching the ports and source code paths in the launch.json file. From here a local Kubernetes cluster is deployed for the system under test. Following creation of the cluster the services are deployed.

Figure 4D:
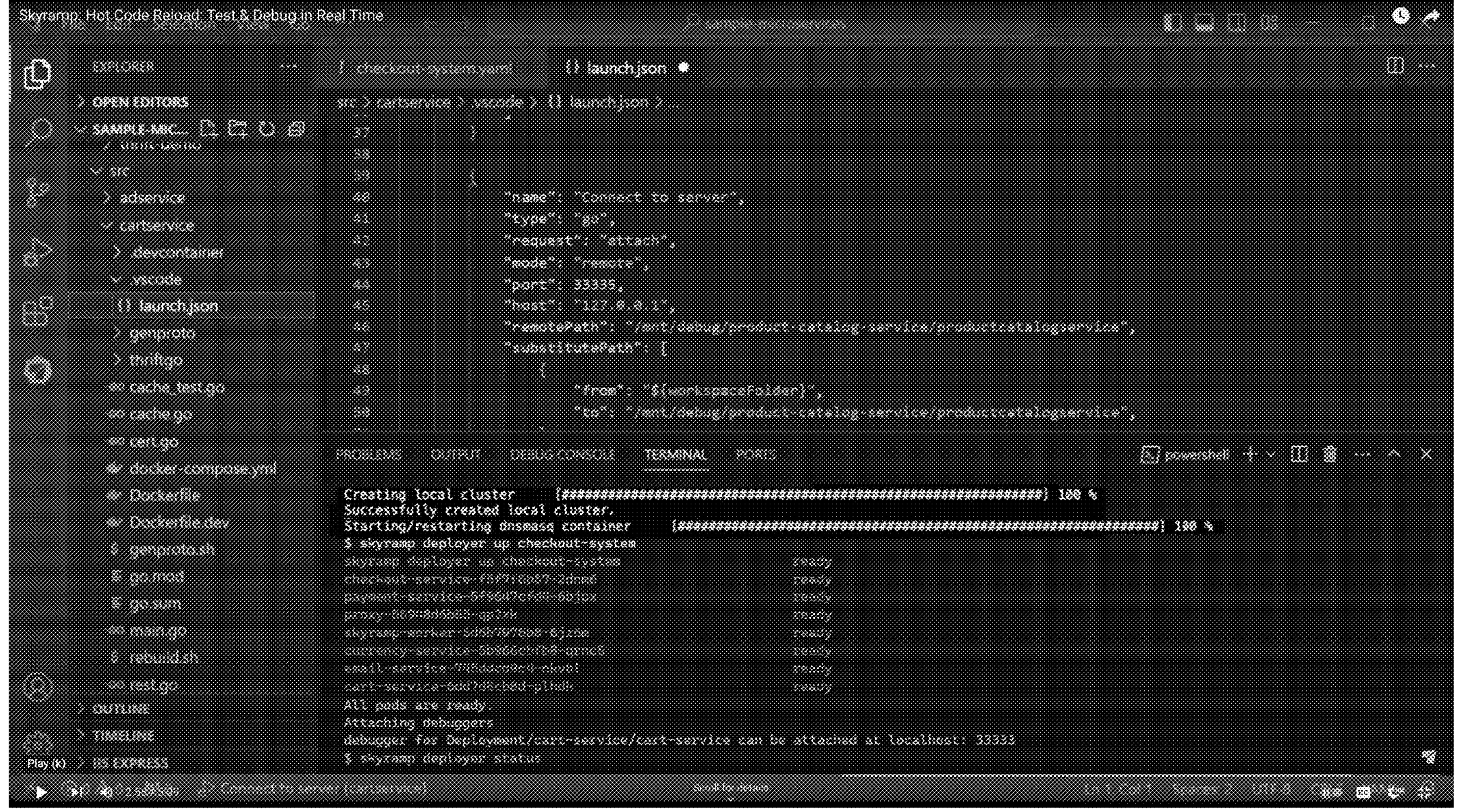
Figure 4E:
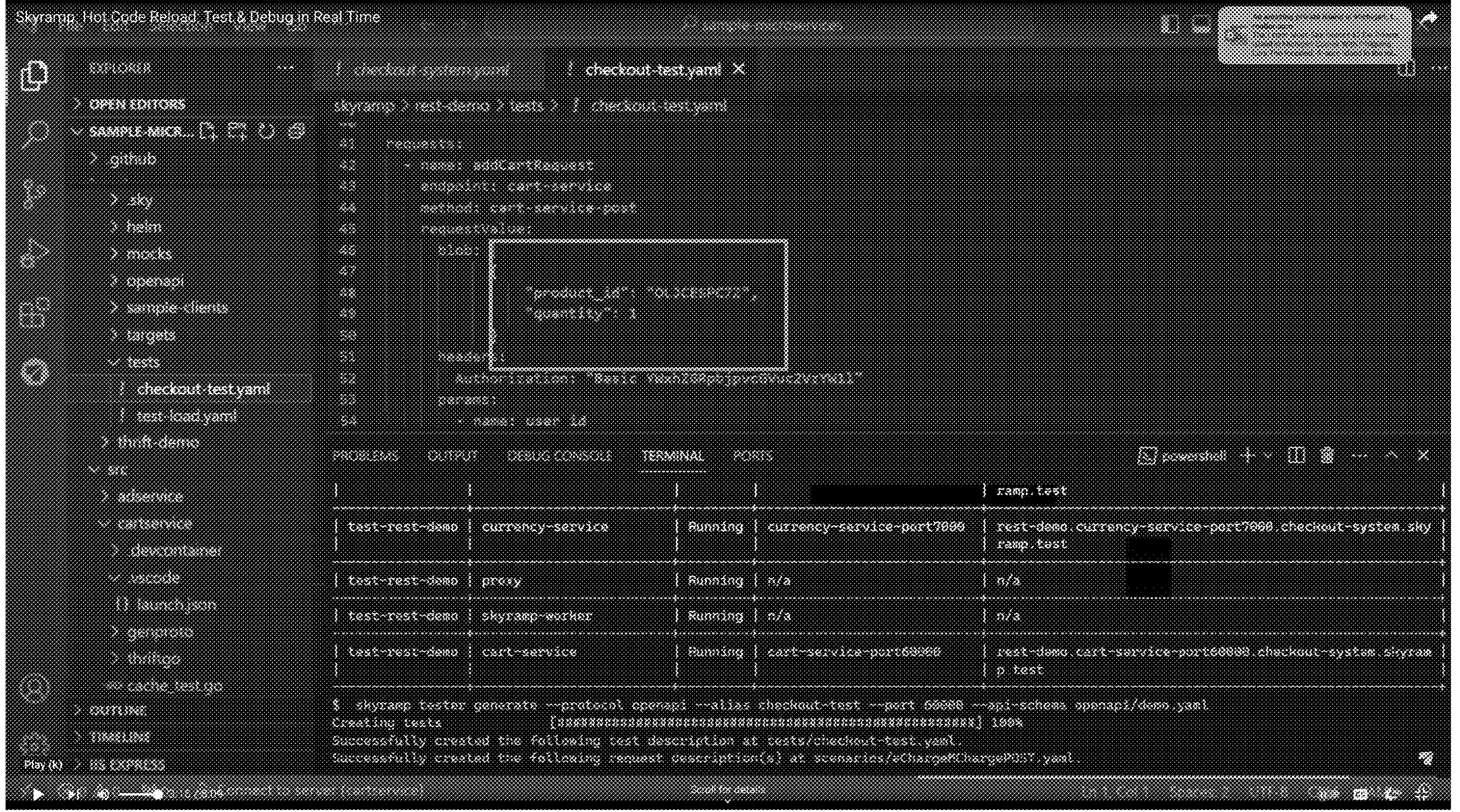

The command “skyramp cluster creat -local” is used to create the cluster (FIG. 4C), and the deployer is then used to deploy the services in the cluster. Upon completion of the deployment, the status of the services is checked using the deployer status (FIG. 4D). With the system under test now deployed to the local cluster, the checkout subsystem can be tested.

Figure 4F:
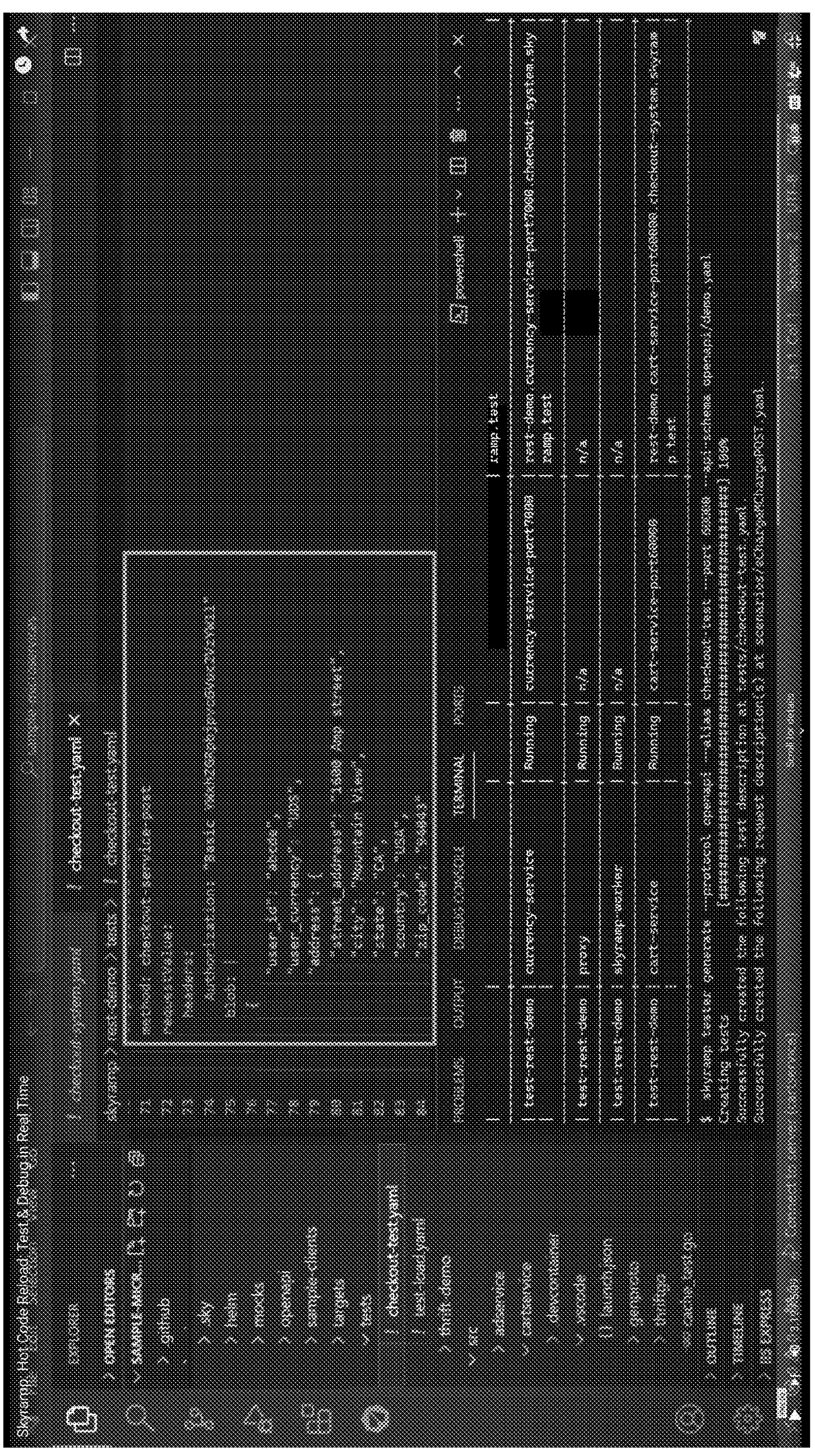
Figure 4H:
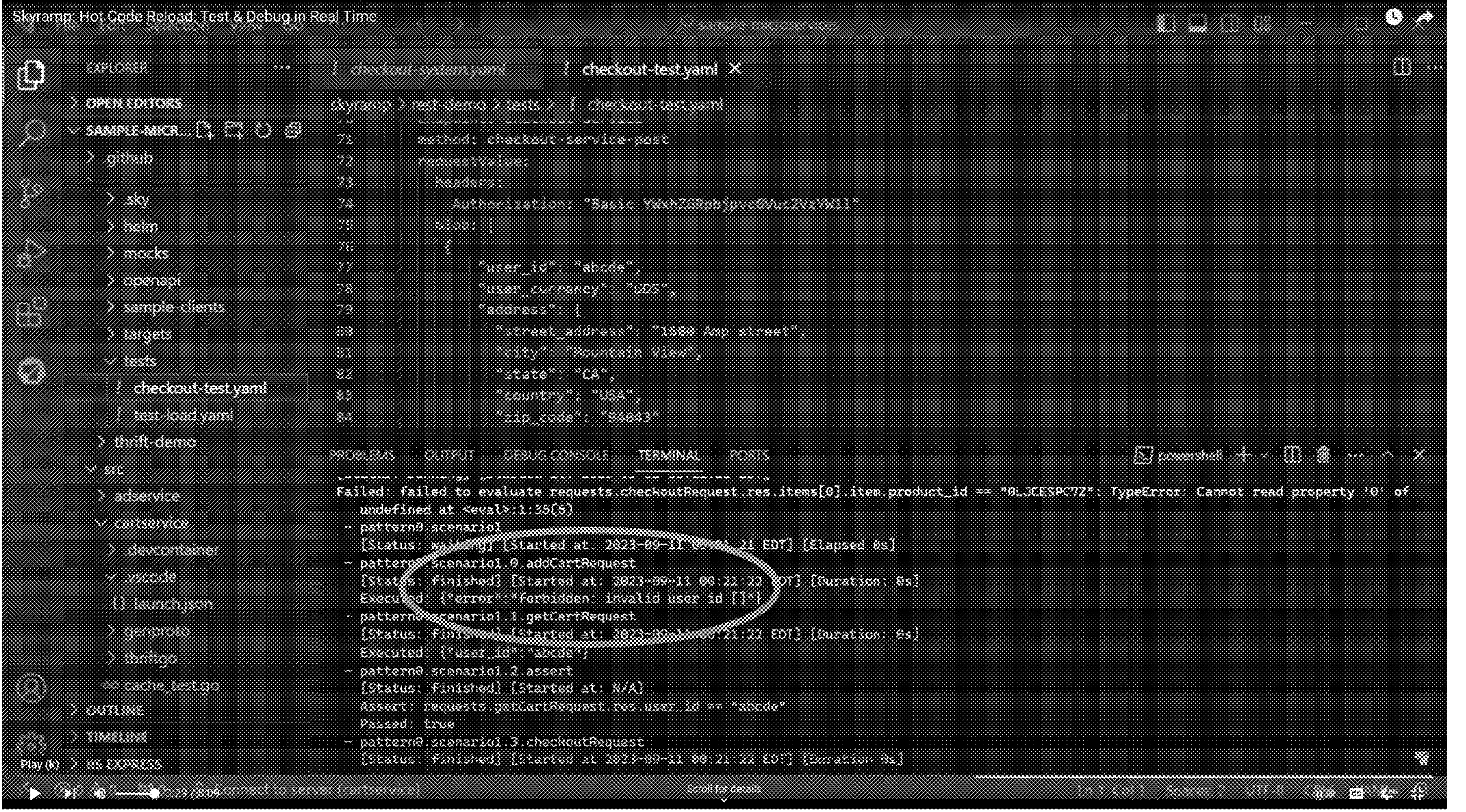
Figure 4I:
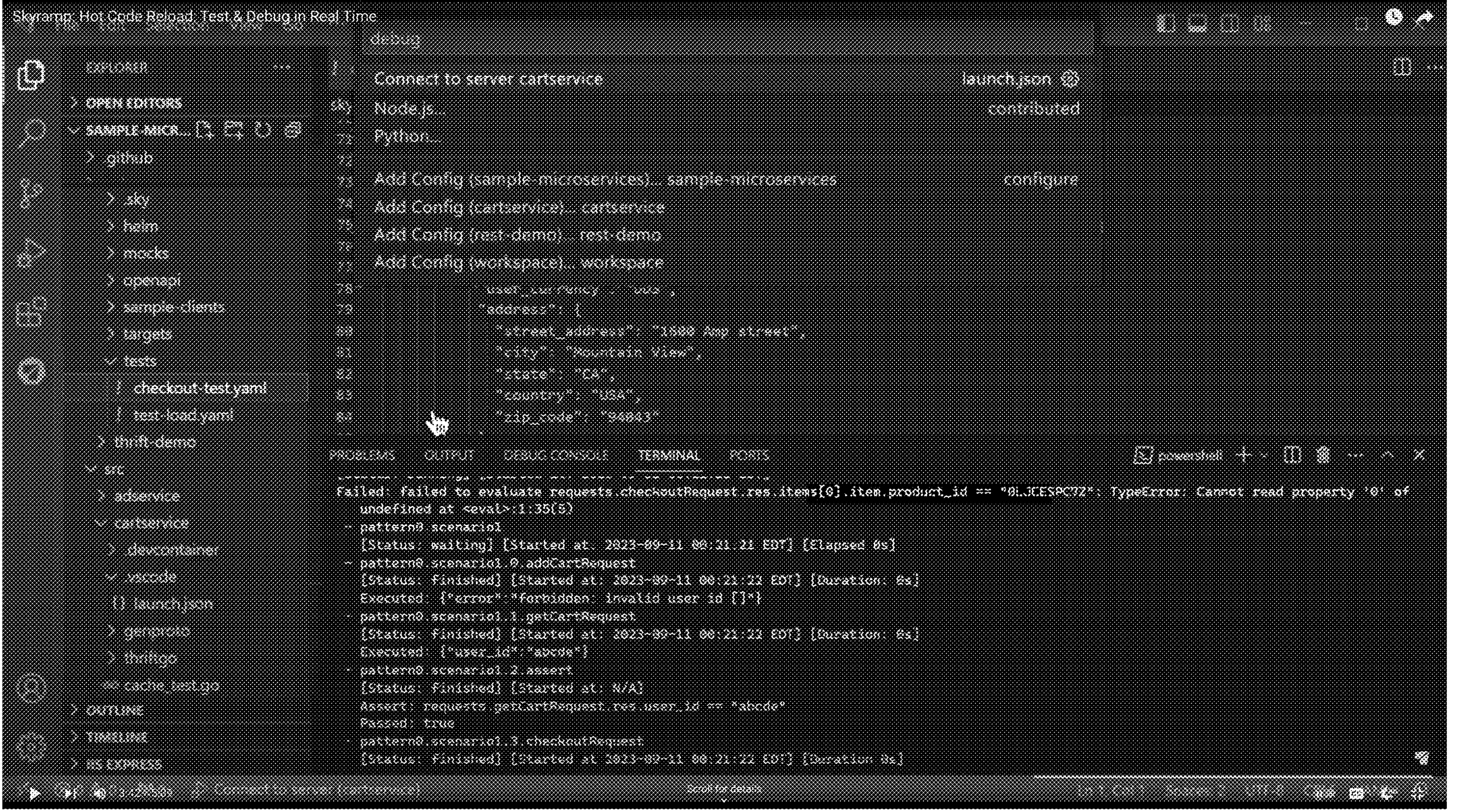
Figure 4J:
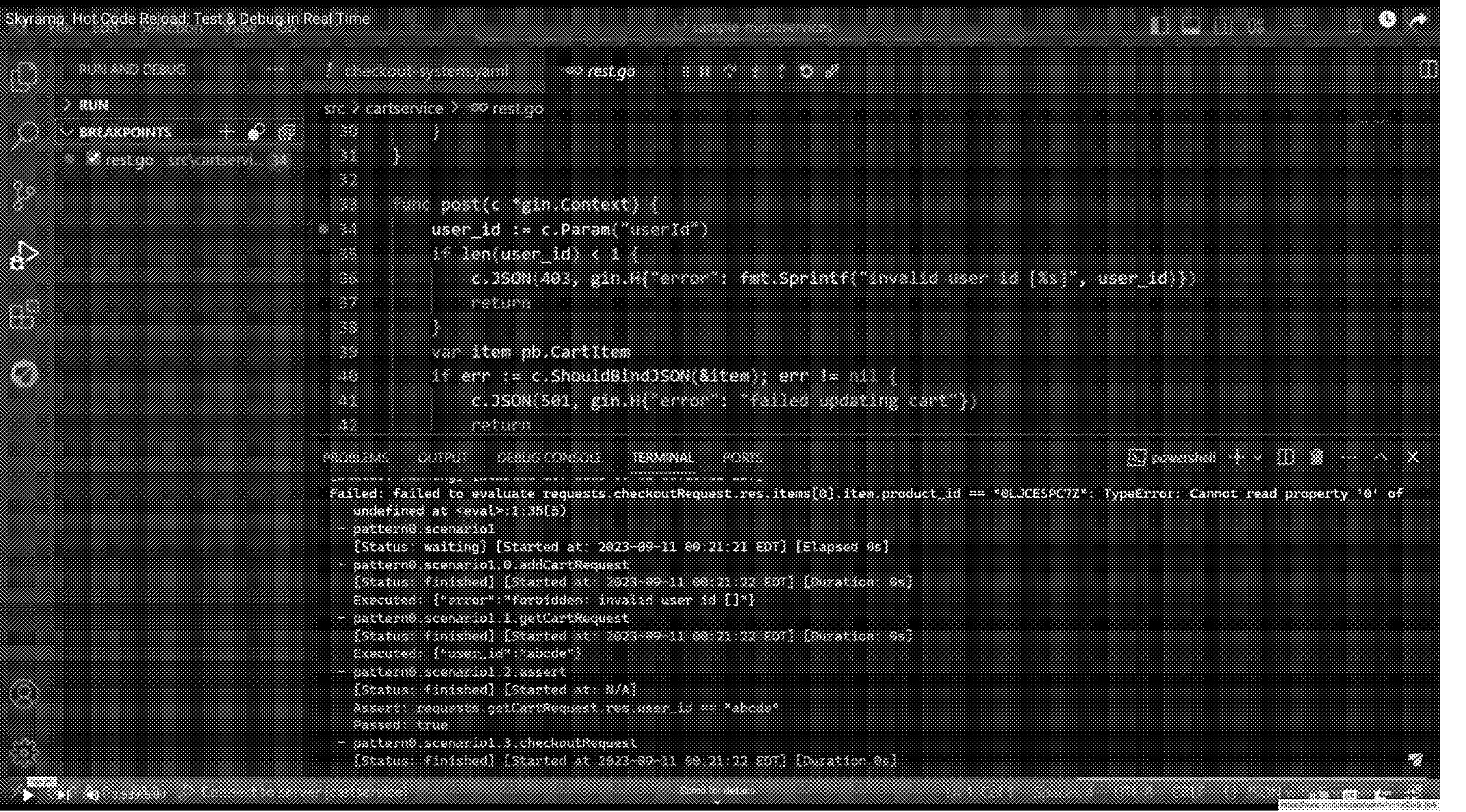
Figure 4K:
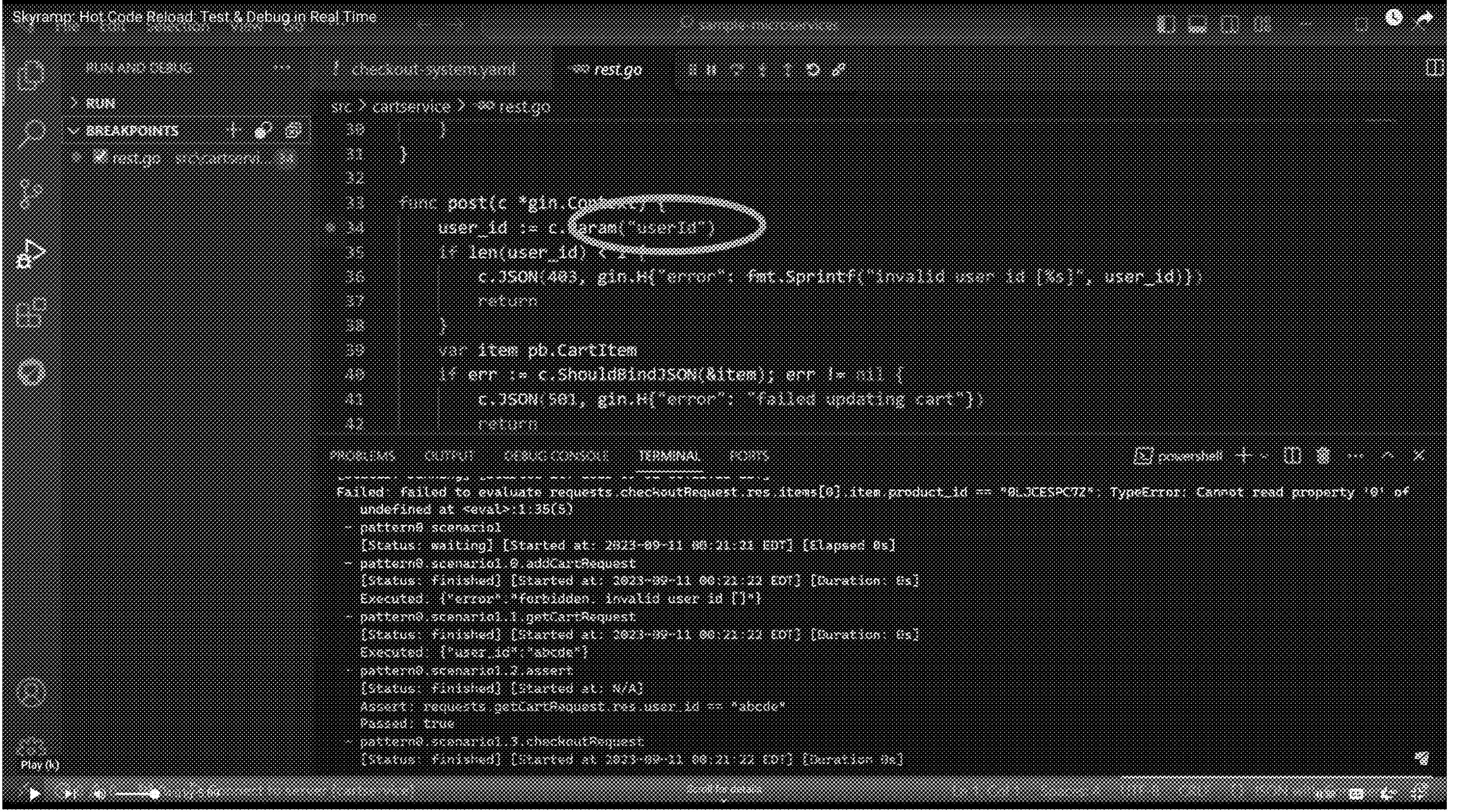

This example demonstrates the use of Skyramp to create with a few simple inputs a natural test description that attempts to add an item to the cart (FIG. 4E) and then to check out (FIG. 4F). The test is executed and for purposes of this example the results show the test failed (FIG. 4G) as a result of a problem adding an item to the cart (FIG. 4H). With the hot code reload feature enabled, the debugger is immediately started in the IDE and debugging is commenced (FIG. 4I). Breakpoints are set in the code and the checkout process is stepped through (FIG. 4J). Examination of the variables indicates that when a product is added to the cart one of the parameters is not recognized (FIG. 4K).

Figure 4L:
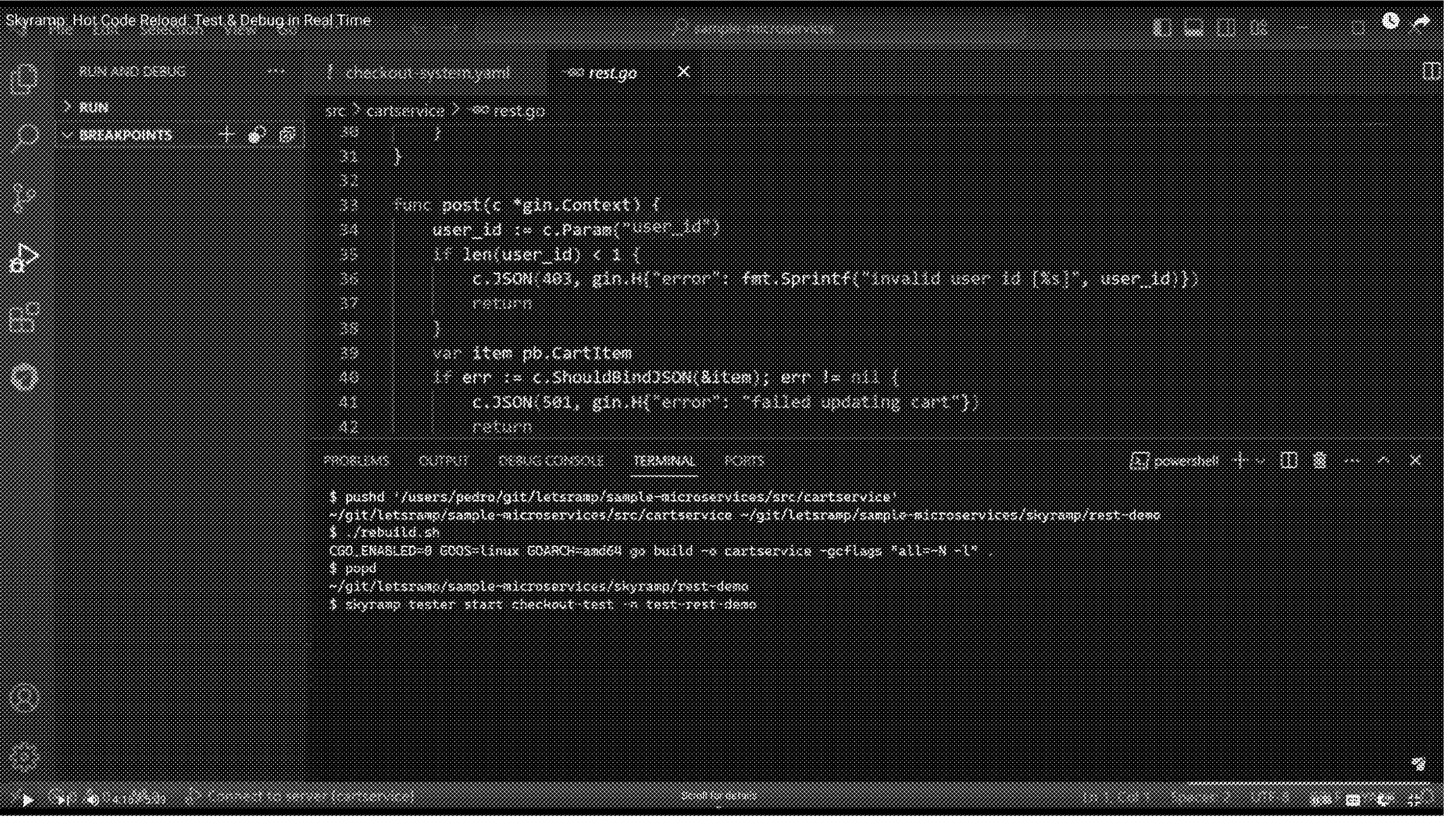
Figure 4M:
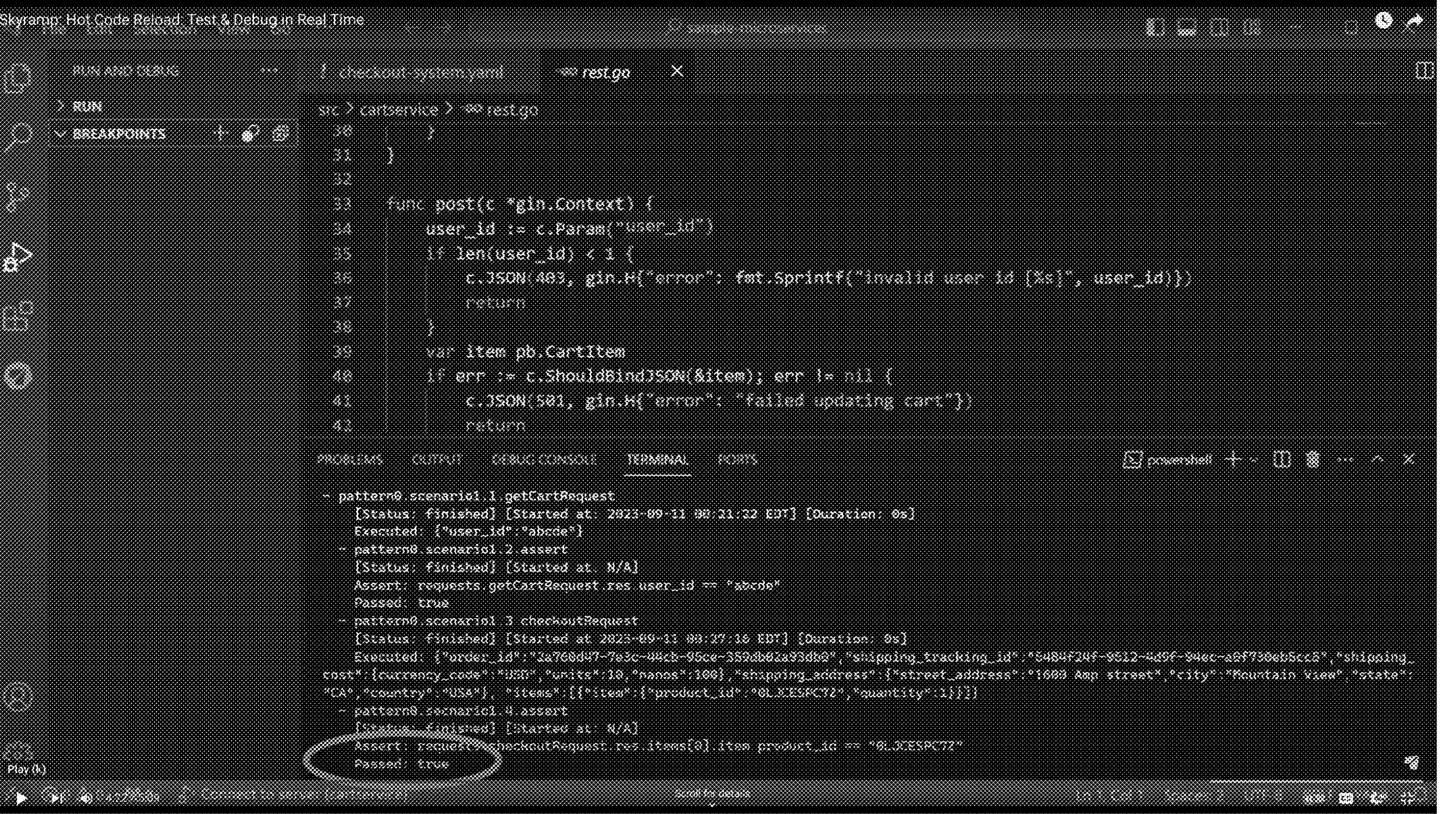

To verify this is the problem a change is made to the code and the change is saved, and the service is rebuilt. Hot code reload makes it possible to rerun the test with the Skyramp tester without taking any other actions (FIG. 4L). With the code change in place the test now passes (FIG. 4M). The hot code reload feature therefore seamlessly enables real-time debugging while simultaneously testing microservices.

Skyramp and GitHub Codespaces with Docker

FIGS. 5A-5K show a screenshot sequence for Skyramp when testing and mocking microservices in a Docker cluster in any dev environment using GitHub code spaces, under an embodiment. This example includes use of the Cloud native microservices demo application Online Boutique to demonstrate testing whether the checkout subsystem of the app is functioning correctly. Typically, while iterating on code, tests tend to be one-offs and manual leading to repeated effort. The Skyramp tester however enables developers to focus on the payload and results and automate one-off tests for reuse and sharing.

To begin the example, and as described herein, from the docker compose demo branch in the sample microservices repository, “open in GitHub code spaces” is selected from the readme and then “create code space” is selected. The codespace VM is running a VS code server in a Dev container with the Skyramp client pre-installed from the configuration defined in the devcontainer.json file. Upon creation of the code space, a VS code “workspace” is present in the browser tab with the source code pre-loaded.

Figure 5A:
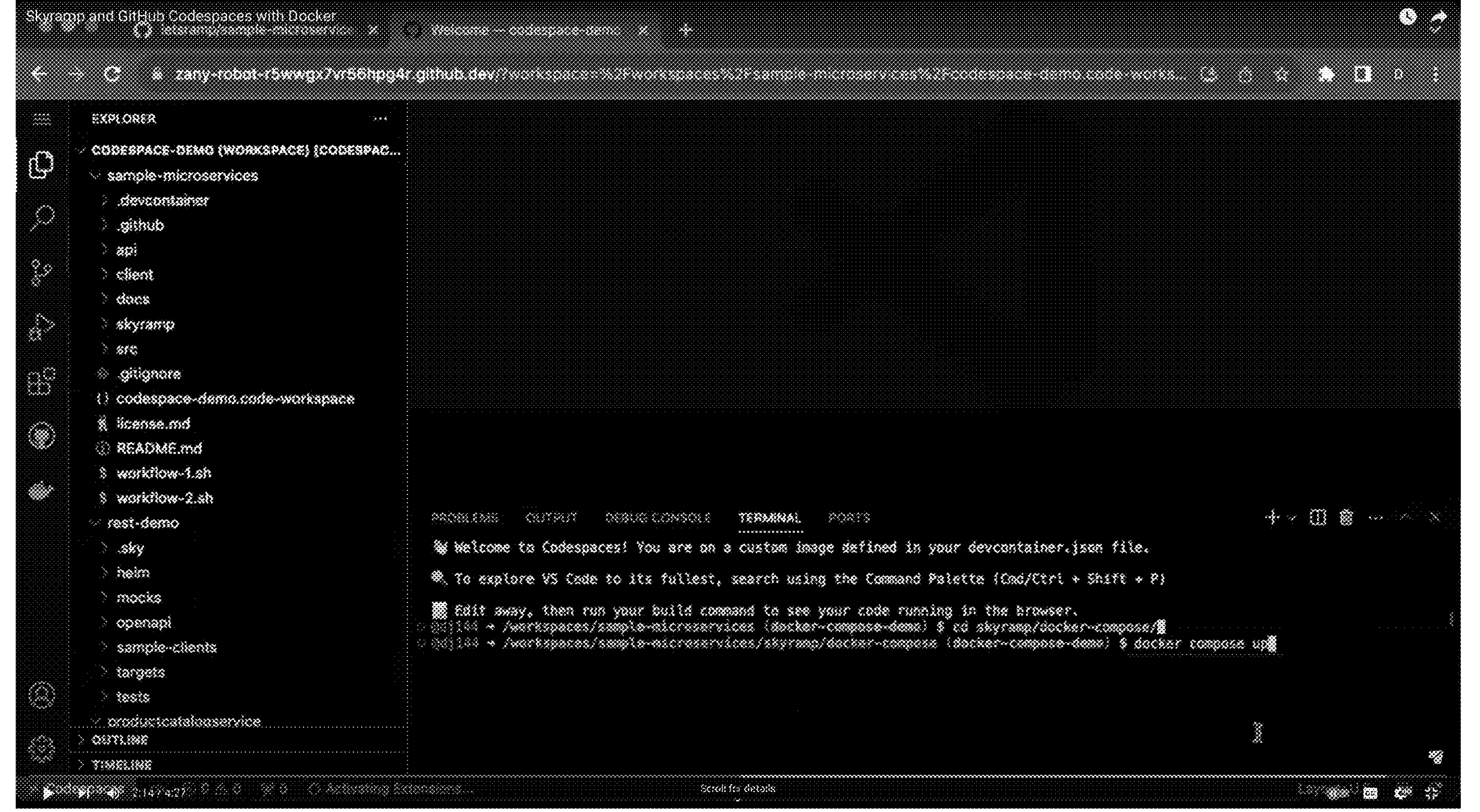
Figure 5B:
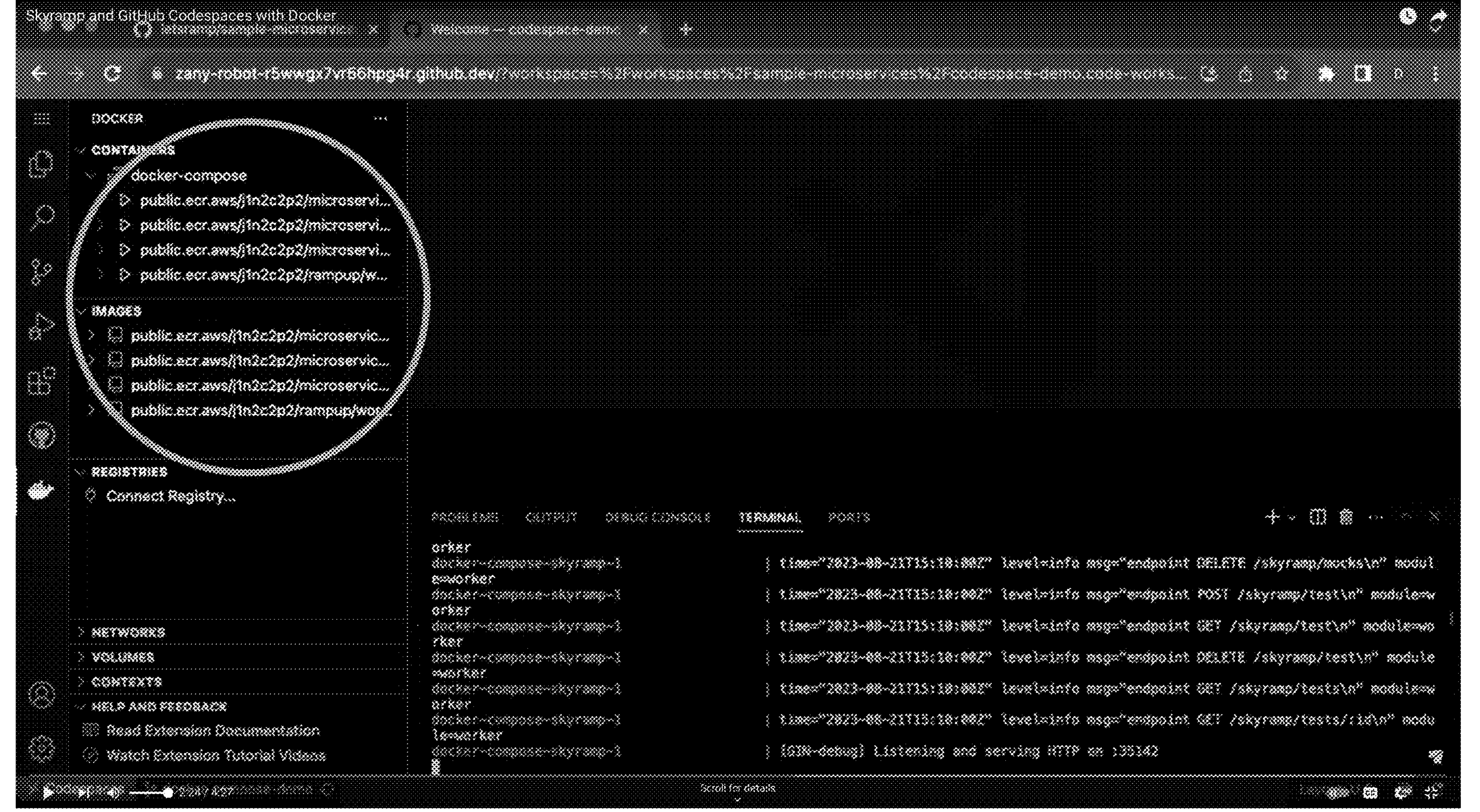
Figure 5C:
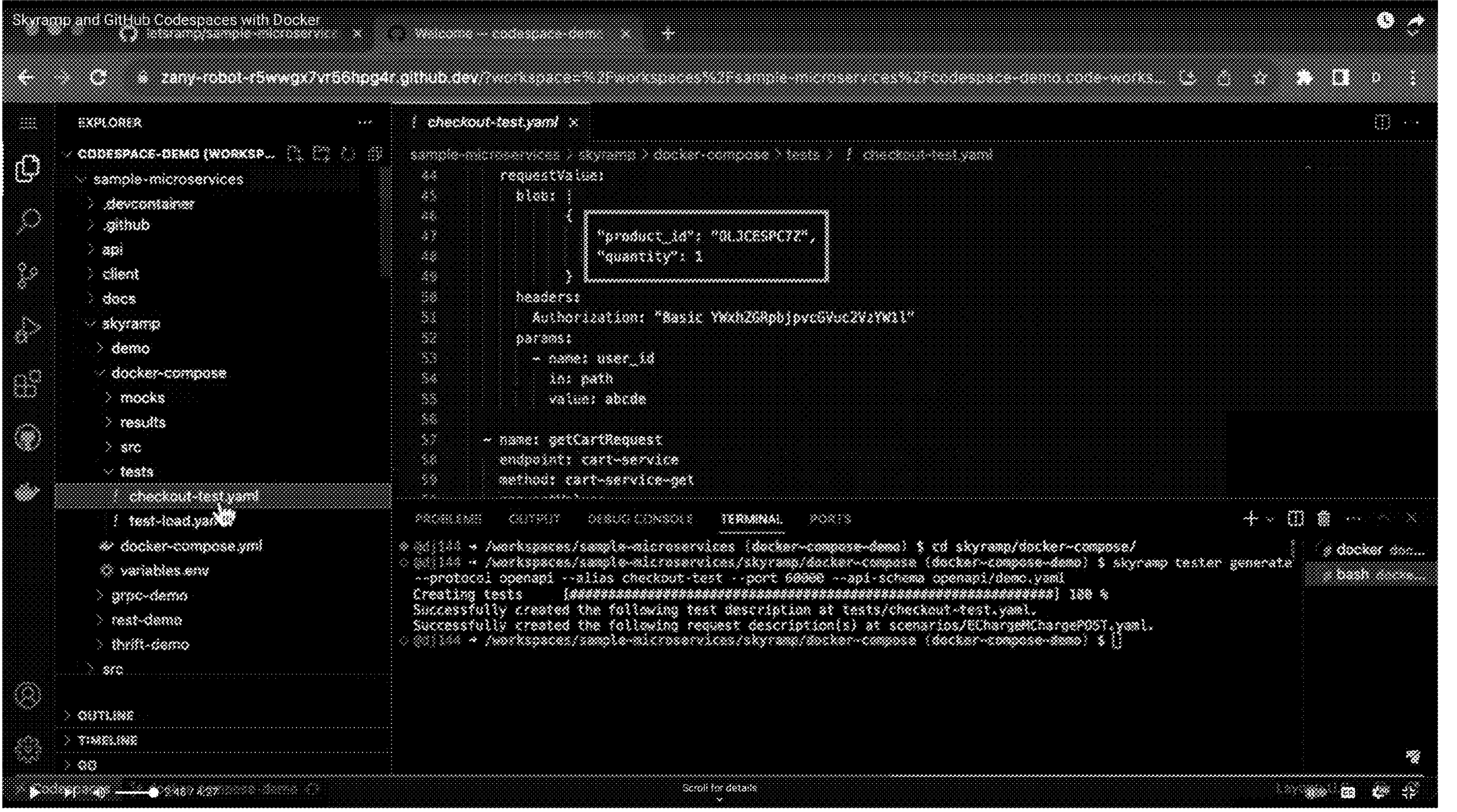

To test the checkout system of the application, the component services are brought up using Docker compose (FIG. 5A). With the system under test now deployed in the code space the Docker VS code extension is used to see the services to test (FIG. 5B). With the checkout subsystem and the worker in place, Skyramp is ready for use in functional integration testing.

Figure 5D:
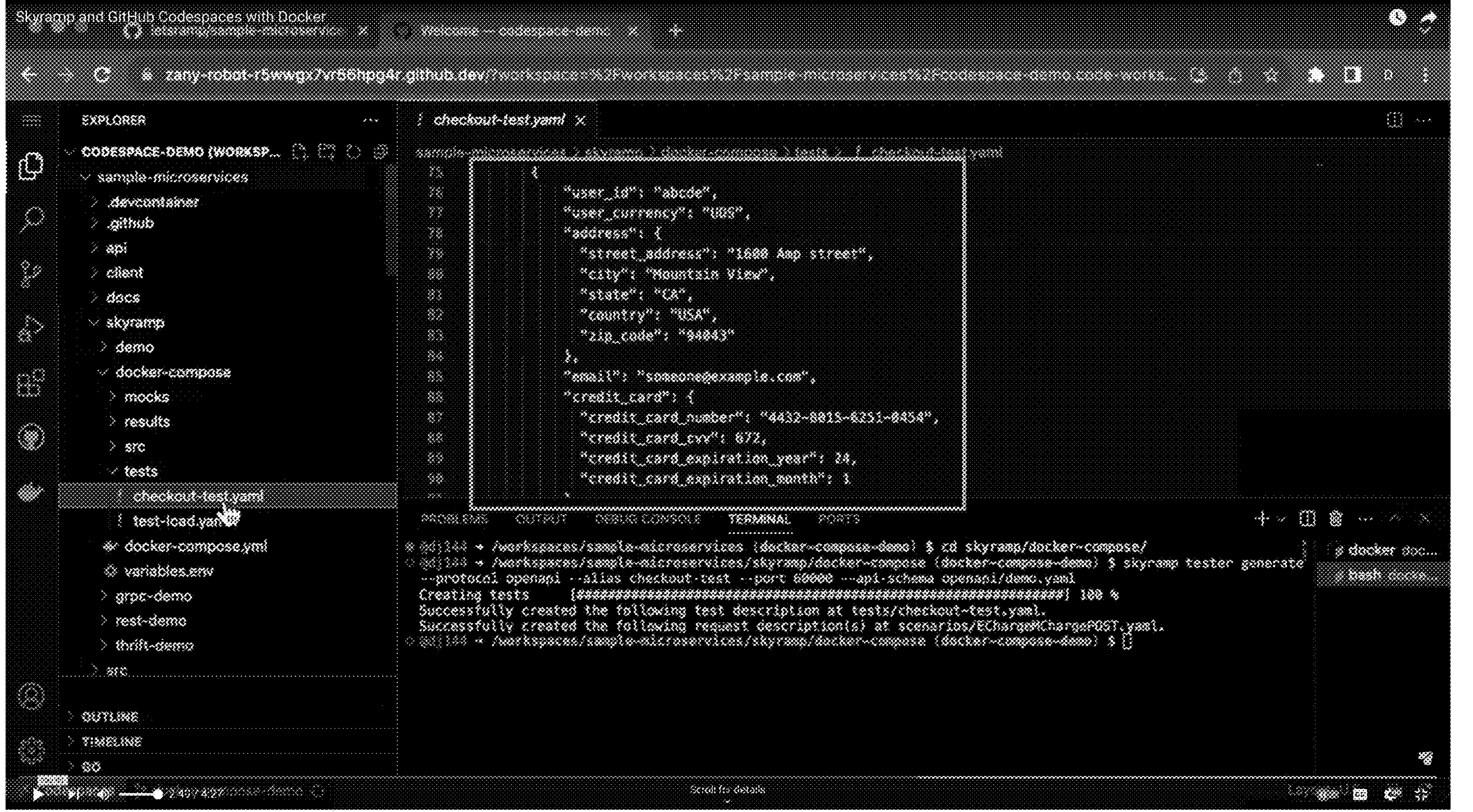
Figure 5E:
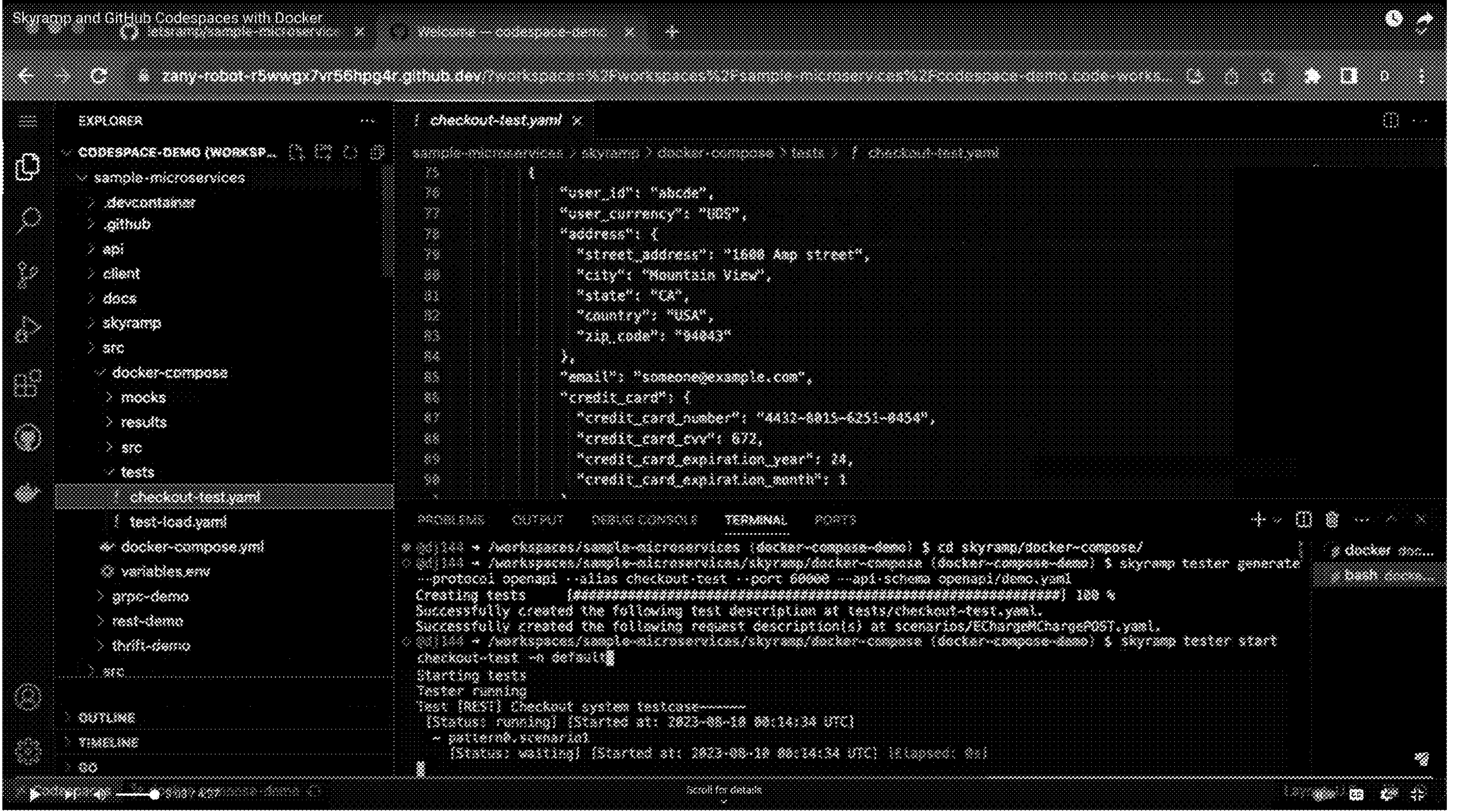
Figure 5F:
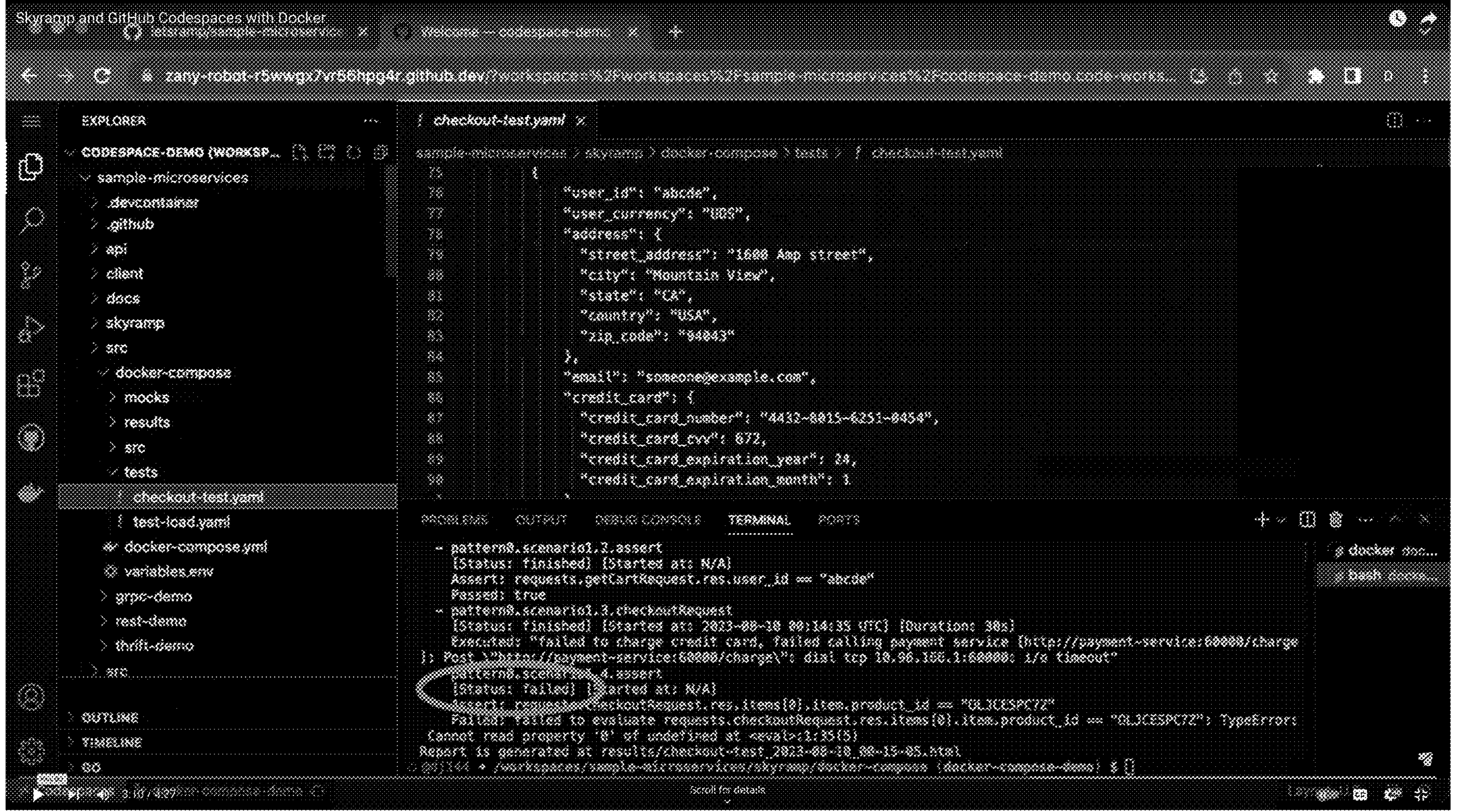
Figure 5G:
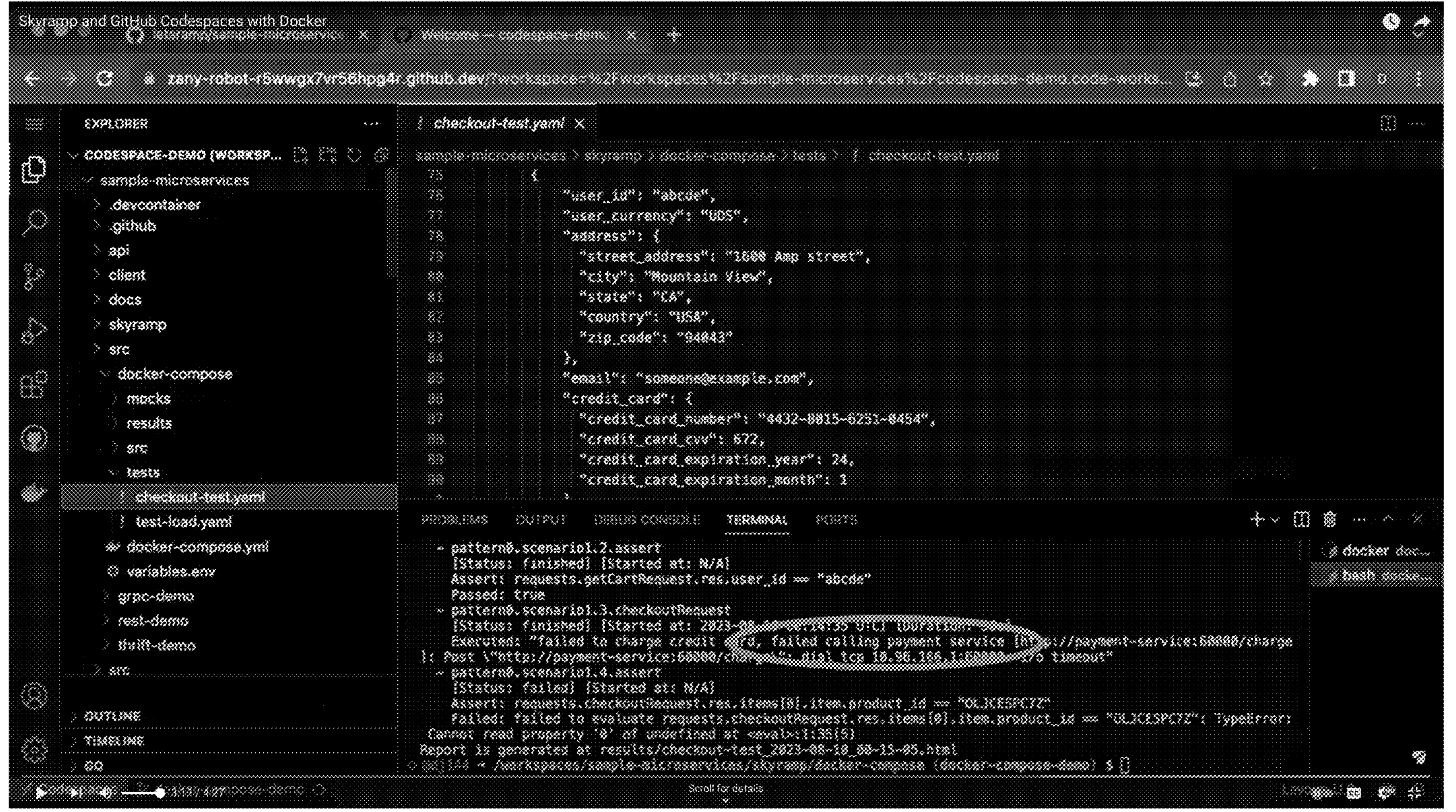
Figure 5H:
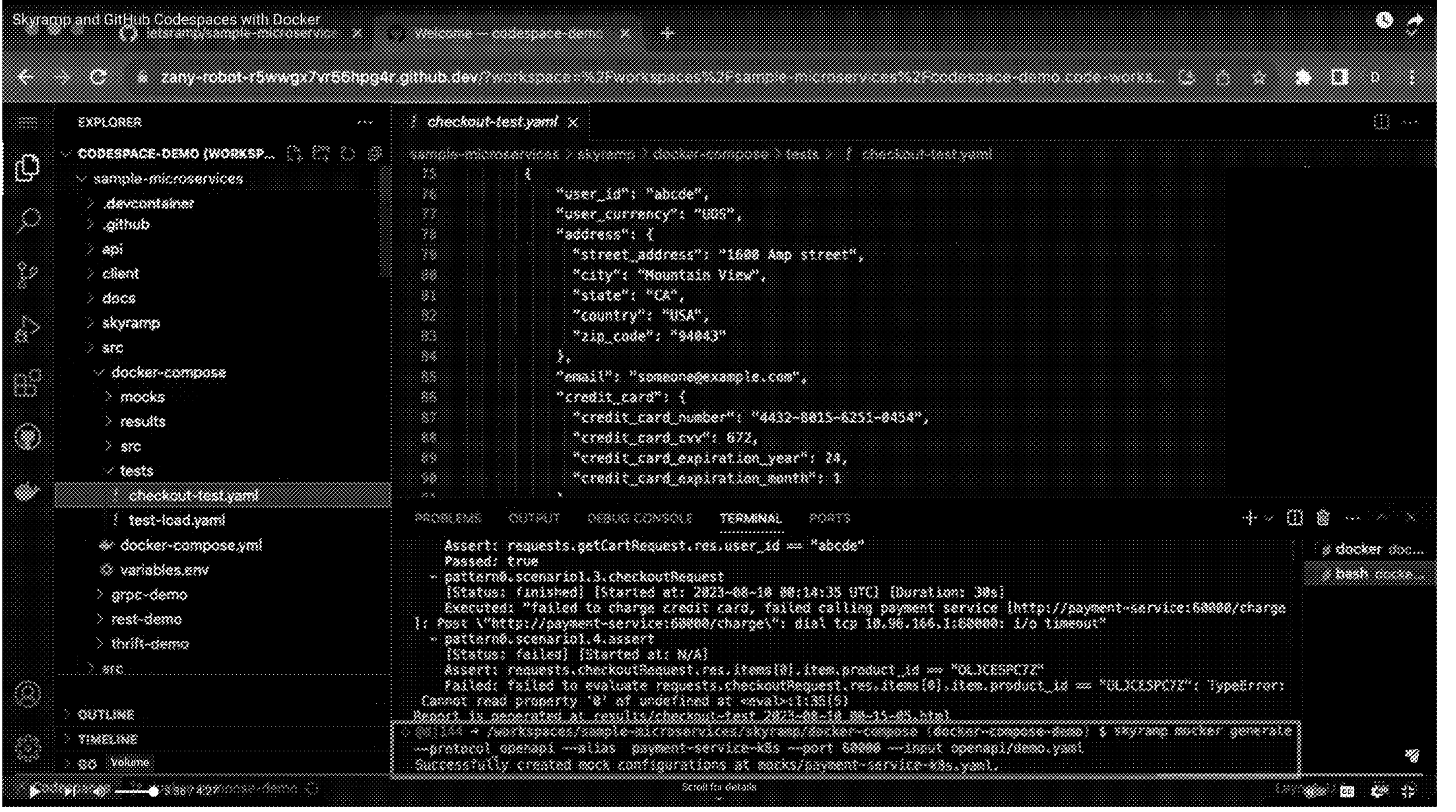

This example demonstrates the use of Skyramp to create with a few simple inputs a natural test description that attempts to add an item to the cart (FIG. 5C) and then to check out (FIG. 5D). Skyramp tester is run to send the generated test description to the worker to test the checkout subsystem of the app (FIG. 5E). For purposes of this example the test fails (FIG. 5F) because the payment service is missing (FIG. 5G).

Figure 5J:
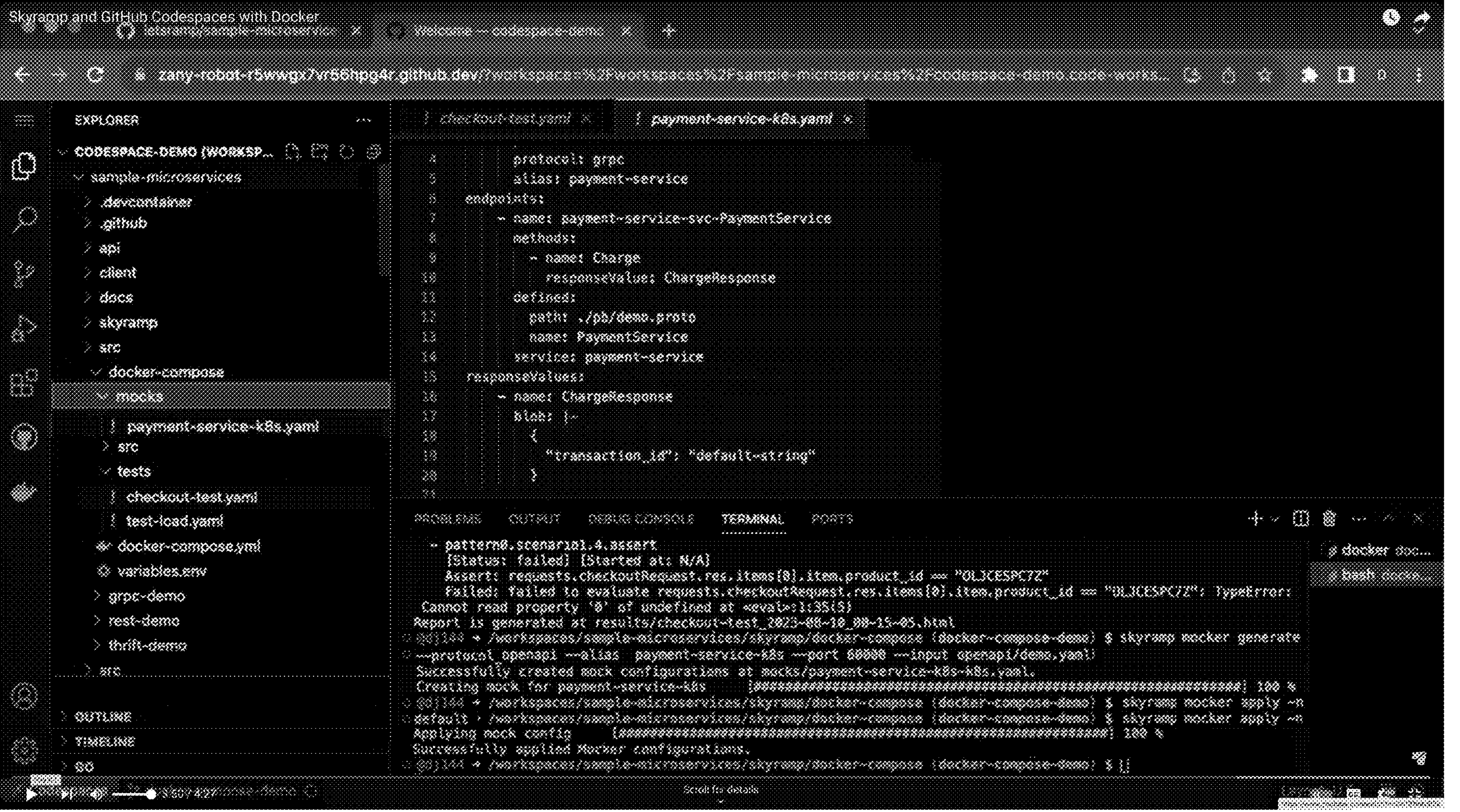
Figure 5K:
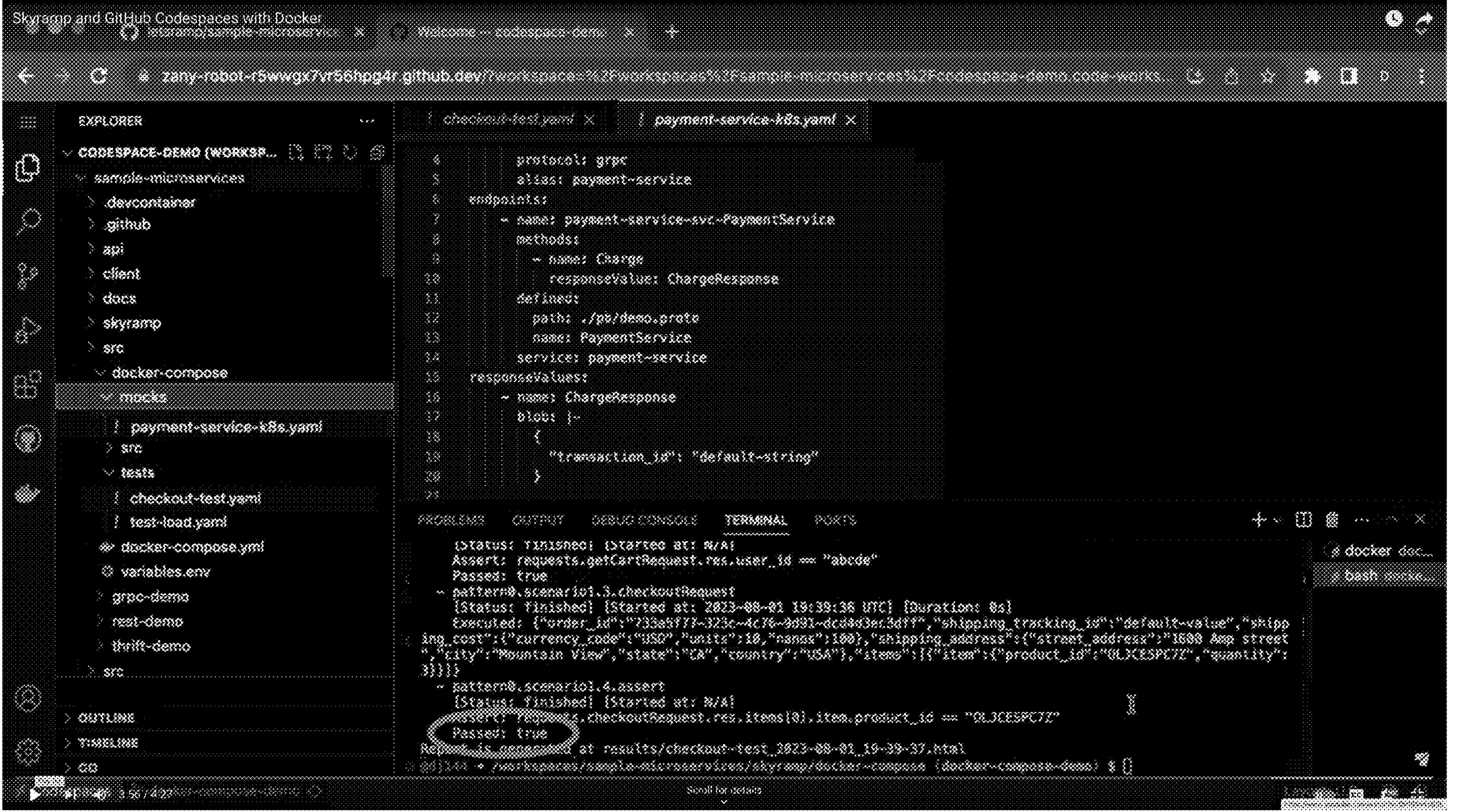

Skyramp is used to mock internal or external dependencies like the payment service (FIG. 5H) and avoid the complexity of deploying the missing dependency. Just like tests, mocks are also generated by Skyramp. Mock responses can either be static as in this generated description (FIG. 5I) or dynamically generated by a script. Following generation, the mock description is sent to the worker to mimic or stand in for the payment service (FIG. 5J). The test is repeated again with the mock in place and it now passes (FIG. 5K).

Missing dependencies will no longer derail the microservice testing process when using Skyramp. In this manner Skyramp makes functional integration testing for distributed applications easier by saving valuable time through automation and avoiding complicated dependency management.

A description follows of an alternative embodiment of Skyramp.

Figure 6:
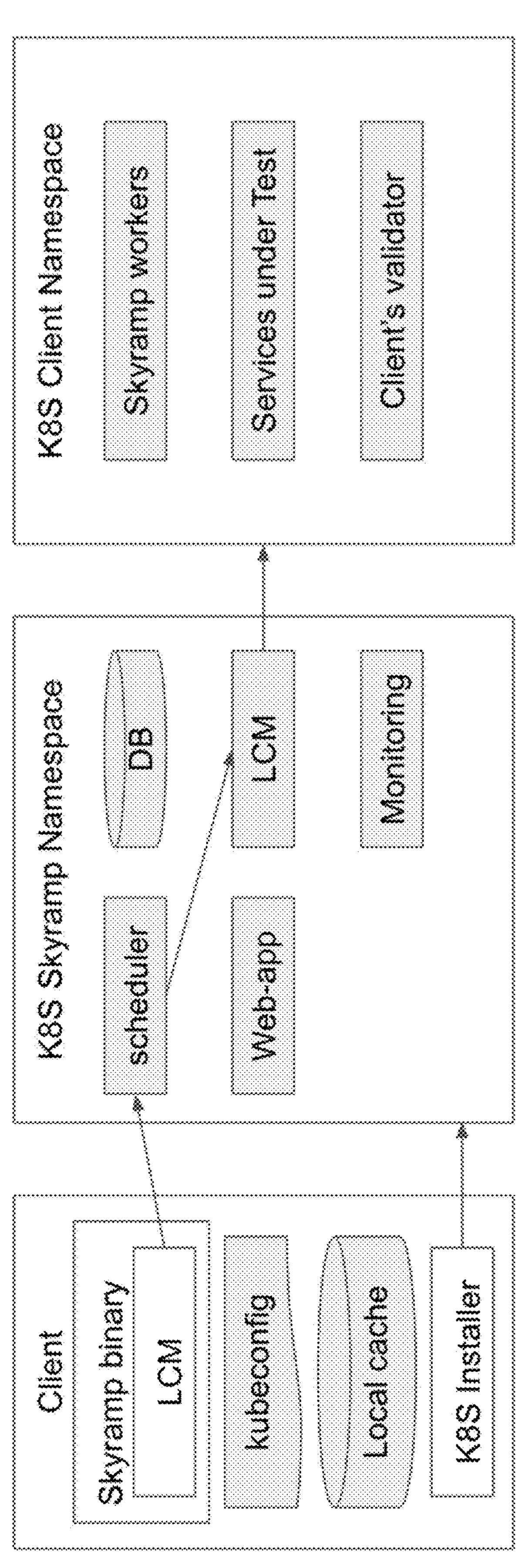
FIG. 6 is a block diagram of Skyramp components, under an alternative embodiment.
Figure 7:
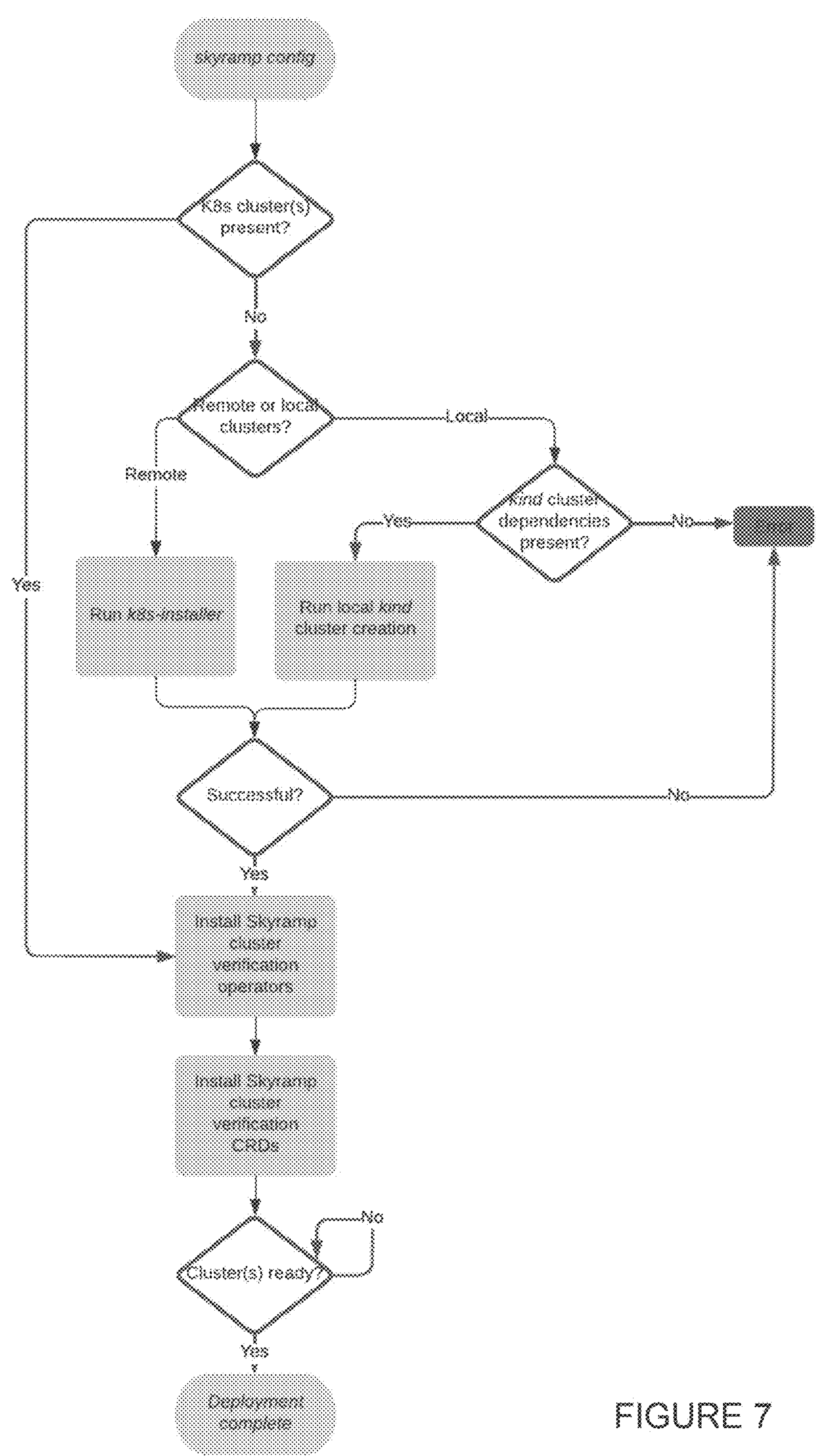
FIG. 7 is a flow diagram of deployment of Skyramp components, under an alternative embodiment.

FIG. 6 is a block diagram of Skyramp components, under an alternative embodiment. FIG. 7 is a flow diagram of deployment of Skyramp components, under an alternative embodiment. Skyramp is configured to support multiple different modes of deployment, including deployment on a local machine and on a remote cluster. Deployment on a local machine is made possible because Skyramp is configured to mock dependencies which allows its targets to run with far fewer resources on a local machine (versus the more ample resources of a typical remote dev machine). Skyramp is configured to mock dependencies by enabling users to specify which service dependencies they want to mock in the target description file (YAML file that describes services needing to be deployed). Skyramp then automatically suggests default values for the mocks and creates the mock services for you.

If a user wishes to deploy Skyramp to a remote cluster however they need only to provide their existing kubeconfig files, or alternatively give Skyramp access to the remote machine. Skyramp clusters of an embodiment run in configurations including but not limited to running on a local machine (where the Skyramp binary is run), running on a set of remote machine(s) that are accessible via SSH, and running in an environment where at least two sets of Kubernetes clusters already exist, given via a set of kubeconfig files. There are many cases by which the clusters will exist or be provided. For example, a customer may provide Kubernetes clusters that are already deployed, rather than requiring Skyramp to create and initialize the clusters. A customer may also have many clusters that are created in different contexts. The Skyramp deployment methodology is flexible enough to handle all of these cases.

The example embodiment of FIG. 6 includes Skyramp components on a local client machine and in a Kubernetes cluster but is not so limited. More particularly, the local client machine includes the Skyramp binary including Configuration data (e.g., Kubernetes kubeconfig, cloud-related credentials, local cache including status information of Skyramp), Command Line Parser (e.g., takes commands from users, with Golang/cobra), Description Parser/Validator (e.g., container description parser/validator, target description Parser/Validator, builds objects internally), Builder (e.g., Kubernetes backend (translates objects to Kubernetes resources), Docker backend (translates objects to docker-compose), and LCM (e.g., deploys Kubernetes/docker resources, check status of resources until they are ready or fail). The local client machine also comprises the Skyramp Installer, which includes a container image running on the client's local machine, and has cloud-related packages installed (e.g., AWS, Azure, GCP, etc.). Given resources registered from users, the Installer is configured to create the K8S cluster, optimizes virtual machines (VMs) (possibly with daemonset), and deploy Mgmt Stack.

Skyramp components residing in the Kubernetes cluster can be in the Skyramp namespace and the client namespace but are not so limited. The components in the Skyramp namespace include a Scheduler, LCM, Skyramp web-app, monitoring, and management database. The Scheduler is configured to, given resources being used, schedule and send jobs to the LCM. The client binary communicates with the Skyramp scheduler. The LCM is configured to deploy/delete/maintain the K8S resources per target. The Skyramp Monitoring component monitors/collects status/results from Skyramp workers. The components in the client namespace of the K8S cluster include the Skyramp Worker configured to generate/respond traffic-per-traffic templates installed by the Skyramp binary.

Once Skyramp is installed via deployment of its components, a user can either initialize a new project folder, or clone an existing Skyramp project from a prespecified repository. The user then enters a command to initialize a new project. Optionally, Git can be enabled on Skyramp project folders in order to easily share container, target, and test descriptions across their team and organization.

A "target" is created when a user identifies a target they want to test and creates a target description file. A target is a subset of the application selected for testing as described herein and includes a list of services (including services that need to be mocked to isolate the services under test). When identifying a target all the services are to be included that are required for the test, and their dependencies. User can also specify which dependent services need to be mocked in order to isolate the target.

Figure 8:
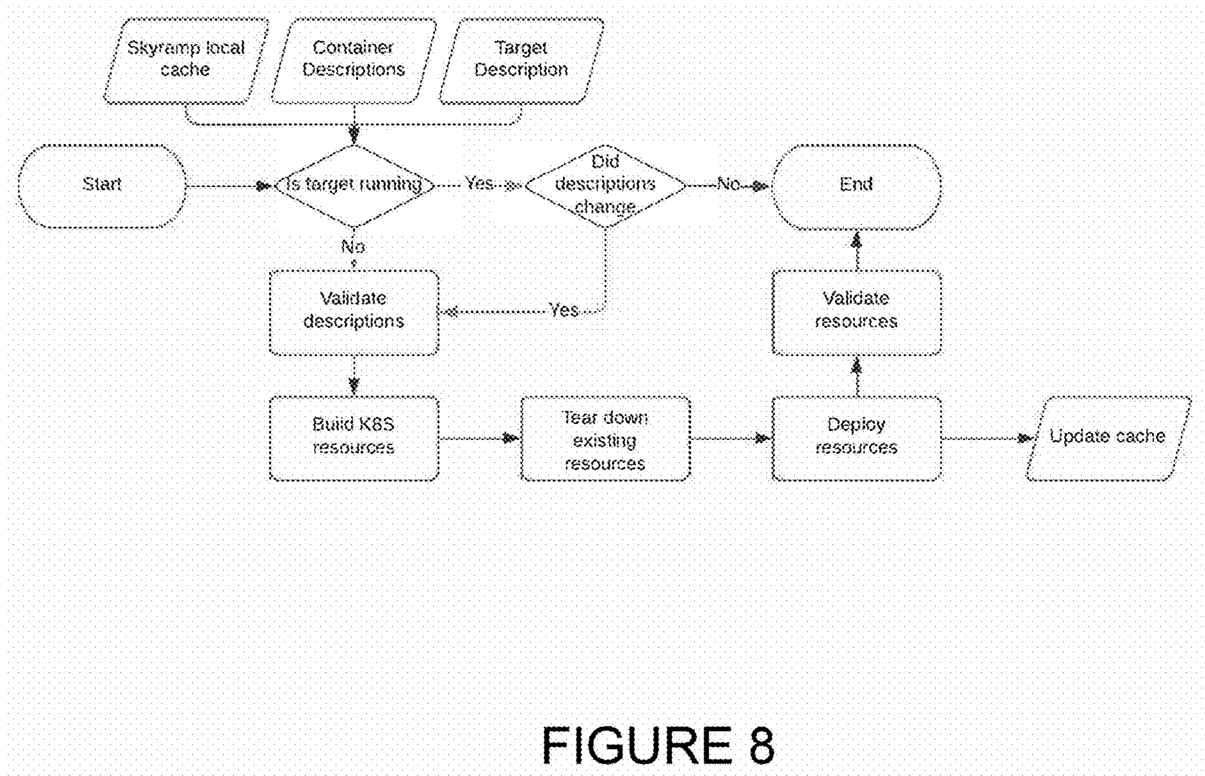
FIG. 8 is a flow diagram of Skyramp deployment of a target (e.g., "up" command), under an alternative embodiment.

For each service specified in the target, the corresponding container description files are created or updated. The container description file includes a YAML file that captures all the information required to deploy a container but is not so limited. The targets are then deployed using a specified Skyramp command. FIG. 8 is a flow diagram of Skyramp deployment of a target (e.g., "up" command), under an alternative embodiment. Skyramp can run the target either remotely or locally if the local machine has sufficient processing power and memory to support the target. In either case, Kubernetes are used for orchestration.

For local deployment, Skyramp uses Docker. If running on a local machine, a local Kubernetes cluster is needed. Skyramp can automatically install the necessary software and set up a local Kubernetes cluster if needed. Alternatively, if the user is familiar with Kind or Minikube, they can bring up a cluster on the local machine and add the kubeconfig to Skyramp by running a specified command. The resources (yaml) file should also be updated to specify that the cluster is local.

If a target requires more resources than can be provided by a local machine, Skyramp can be pointed to VMs in the cloud by specifying credentials, hostname, IP, and role (master or worker) in the resources file. Optionally, if a cluster is already running on the VMs, the kubeconfig can be added to Skyramp. Regardless of whether a kubeconfig file is provided or not, the resources should be configured after any update to the resources file or kubeconfig.

The target is then deployed from the project folder. Following target deployment, the Skyramp-provided namespace information can be used by the target to interact with the API endpoints to be tested. Microservice testing is then performed on the deployed target.

Skyramp is configured to support users running three different types of tests including but not limited to functional, load, and stress tests. The functional tests verify how the system under test behaves with specific inputs and whether it functions as expected under normal conditions. Load tests allow developers to answer whether their system can handle a specific load scenario when operating under defined resource constraints. Given a set of resources, stress tests allow users to understand the behavior of their systems on increasing load conditions, and the results enable users to provision their systems with more confidence to handle different load scenarios.

Skyramp is configured to write once, run multiple test types in order to support ad-hoc, load, and stress testing using the same test scenarios. Instead of writing throwaway local tests, users can re-use Skyramp scenarios to run different types of tests. Skyramp is configured to take care of any additional work, for example setting up the load per the specification, or running validations from a script provided by the user.

Figure 9:
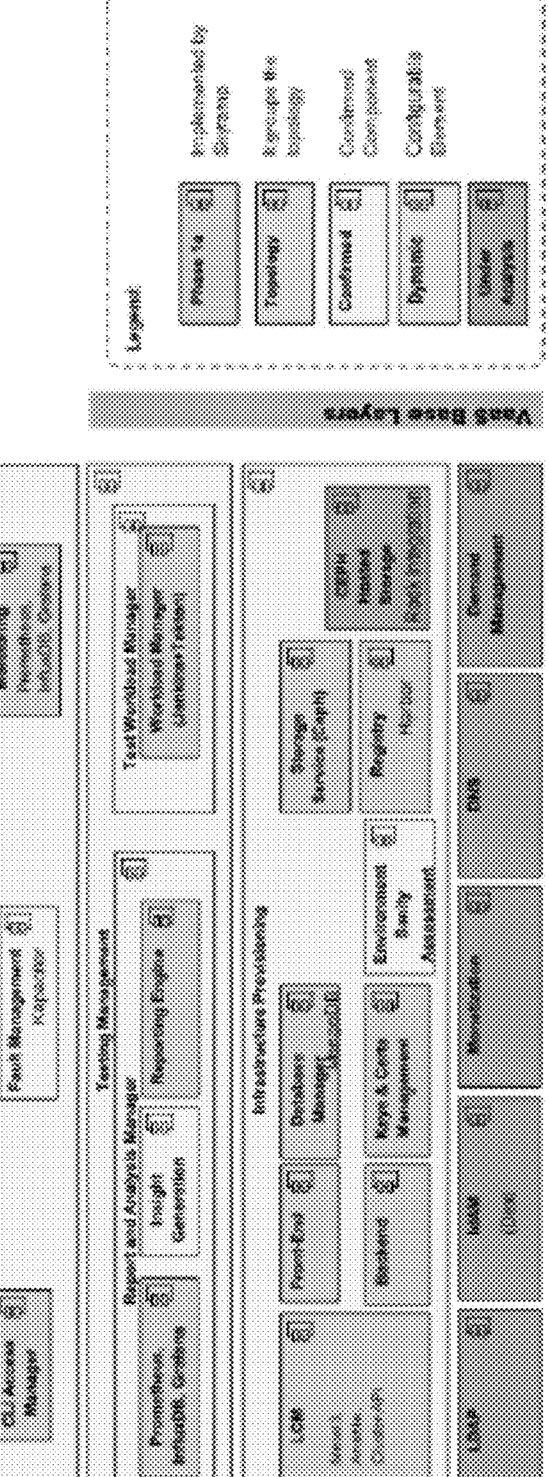
FIG. 9 is a block diagram of Skyramp components in an example deployment, under an alternative embodiment.

FIG. 9 is a block diagram of Skyramp components in an example deployment, under an alternative embodiment. In this example architecture, Skyramp provides a test automation platform and a repeatable process to allow customer onboarding on a Validation-as-a-Service (VaaS) product. The use of Skyramp enables the VaaS product developer to hide the complexity of deploying the VaaS product and launching tests of the VaaS product from their customers and improve their customers testing velocity. The Skyramp test automation platform will automatically deploy the VaaS product onto the product developer's customers platform and automate the process of running either a subset of tests or an entire suite of tests without the massive (hundreds of pages of documentation and information on thousands of tests) onboarding cost.

In this example embodiment, Skyramp deployment includes but is not limited to the following.

LCM: Skyramp LCM stack is configured to provision Kubernetes clusters using ansible, kind and cluster-api. The LCM stack is configured to provision/tear down on either local machines (knid) or remote clusters (cluster-api).

Front-End/Backend: Skyramp is configured to include a GUI, and current UX is through the terminal.

Database Manager: Skyramp is configured to use a combination of Kubernetes features and etc. to store/monitor status of clusters, pods and any other resources. The status of pods/services can be fetched on demand using a Skyramp command.

Keys and Certs Management: Users to provide Skyramp with an ssh key for access to their Kubernetes nodes.

Storage Service: Skyramp is configured to treat this as part of customer infrastructure and supports two cases: 1) Container description: specifies host file path to be used by Skyramp to mount; 2) Specified as part of Helm chart: Skyramp is configured to deploy helm-charts as-is.

Registry: Docker local registry is configured to host container images and helm-charts. Accessibility from worker nodes to be checked.

CLI Access Manager: Skyramp binary supports CLI access with a set of commands including but not limited to commands to deploy and clean up services, validate input files, manage running tests, check cluster status, and fetch logs among others.

Test Workload Manager:

1. 'Declarative' Test creation:
   a. Configuration (yaml), not code; focus on the "what" of the test, Skyramp takes care of the "how".
   b. Easy templates to create new tests, test suites.
2. Test setup:
   a. Deploy system under test into provisioned infrastructure; support automated creation of systems under test.
   b. Manage test environment, load any necessary files.
   c. Parse, validate and interpret test inputs.
3. Test execution:
   a. Parse and interpret test scenario (chain of commands); xequential, parallel, any combination of sequential/parallel.
   b. Run tests; supports parallel systems under tests and tests.
4. Test management:
   a. View currently active tests.
   b. Terminate running tests if needed.
   c. Support test scheduling.
5. Test logging:
   a. Fetch app logs.
   b. Fetch usage logs.
   c. Fetch test logs.
6. Test output validation:
   a. Collect test output.
   b. Compare against desired results.
7. Test clean up: restore provisioned infrastructure to original state.

Reporting Engine (Test Management): Skyramp is configured to generate visualizations of the test suite output.

Monitoring (Ephemeral Management): Skyramp is configured to monitor resource usage (CPU/memory) in the context of a running test.

Embodiments include a system comprising a library component executing on a client computer and comprising a deployer configured to deploy in a cluster at least one microservice of an application. The system includes a worker component executing in the cluster and coupled to the library component. The worker component comprises a tester and a mocker. The tester is configured to execute a test to test operation of the microservice and the mocker is configured to execute a mock to mimic endpoints of the microservice in the cluster during the test. The endpoints include endpoints of a dependent microservice.

Embodiments include a system comprising: a library component executing on a client computer and comprising a deployer configured to deploy in a cluster at least one microservice of an application; and a worker component executing in the cluster and coupled to the library component, wherein the worker component comprises a tester and a mocker, wherein the tester is configured to execute a test to test operation of the microservice and the mocker is configured to execute a mock to mimic endpoints of the microservice in the cluster during the test, wherein the endpoints include endpoints of a dependent microservice.

The at least one microservice includes a plurality of microservices.

The at least one microservice includes sets of microservices.

The dependent microservice includes at least one of an internal dependent microservice and an external dependent microservice.

The deployer is configured to generate a target description file comprising configuration parameters for defining and controlling deployment and configuration of the at least one microservice.

The deployer is configured to receive data of the target description file from a user.

The target description file includes customized parameters customized in accordance with deployment requirements.

The target description file includes a namespace parameter defining a target cluster namespace.

The target description file includes a containers section comprising deployment settings.

The containers section includes a debug section comprising parameters configured to debug while executing the at least one microservice by immediately implementing in real-time any code changes to overcome a test failure, wherein redeployments are precluded.

The target description file includes at least one of an includes parameter and an excludes parameter, wherein the includes parameter specifies endpoint services to include in the deployment, and the excludes parameter specifies endpoint services of the application to exclude in the deployment.

The endpoint services comprise application programming interface (API) services.

The deployer is configured to use data of the target description file to automatically at least one of create, update and manage resources to deploy the microservice to a target cluster namespace.

The mock is configured to execute in-cluster during the test to create mock endpoint services of endpoints of the at least one microservice, wherein external dependencies are precluded during the test The mock is configured to mimic at least one of external dependencies and internal dependencies.

The mock is configured to mock a plurality of endpoint types.

The mock is configured to automatically create mock configurations from API files corresponding to the endpoints.

The mock is configured to include gRPC mocking.

The mock includes a mock description dynamically generated using API service-level information.

The library component includes a mocker client, wherein the mocker is configured to receive the mock description from the mocker client.

The mocker client is configured to receive inputs corresponding to the mock description.

The mocker is configured via inputs from a programming language via the library component.

The mock description comprises a mock configuration file configured to control mock behavior.

The mock configuration file is configured to capture signatures for the endpoints to be mocked and corresponding static mock responses.

The mock configuration file is generated automatically from at least one of an OpenAPI specification, a protocol buffer API specification, and a JSON-RPC response file.

The mock configuration file includes data to configure proxying.

The mock configuration file includes data to configure at least one of delays and errors.

The mock description comprises a response configuration file for the endpoints to be mocked, wherein the response configuration file defines response behavior of the endpoint.

The response configuration file includes payload configuration data and dynamic response data.

The mock description comprises an endpoint configuration file comprising networking-level API service details for the endpoints to be mocked.

The endpoint configuration file comprises data defining individual ones of the endpoints.

The endpoint configuration file comprises data specifying available methods of the endpoints, details of the methods, and behavior of the methods.

The endpoint configuration file comprises data specifying API service definition file path and API service name, wherein the API service definition file includes data of the structure and methods of the API service.

The test includes a test description.

The library component includes a tester client, wherein the tester is configured to receive the test description from the tester client.

The tester client is configured to receive inputs corresponding to the test description.

The tester is configured via inputs from a programming language via the library component.

The test comprises a default test, wherein the default test is automatically generated.

The test description comprises a test configuration file.

The test configuration file is configured to define behavior of the test and includes test pattern configuration data and load testing configuration data.

The test configuration file includes a definition of at least one test scenario.

The test configuration file includes an override attribute configured to customize endpoints by specifying a mock to modify an endpoint defined in the mock configuration file.

The test configuration file includes a mock section comprising identification of an overridden endpoint, specification of a method of the overridden endpoint to be modified, and at least one of customized data and a customized response to replace an original response from the overridden endpoint.

The test configuration file includes load profile parameters to simulate heavy user traffic on the at least one microservice.

The load profile parameters include at least one parameter to at least one of specify target requests per second for the at least one microservice, indicate total duration of a load test, and gradually increase a load on an endpoint of the microservice.

The test description comprises a scenario configuration file for each method defined in the at least one microservice.

The scenario configuration file defines request behavior for methods and specifies endpoint and method name.

The scenario configuration file includes configuration data of at least one of scenarios, requests, payloads, overrides and parameters.

The scenario configuration file includes a scenario attribute configured to define test scenarios including end-user use cases to be tested.

The scenario attribute includes a steps parameter including a list of actions to be executed at least one of sequentially and concurrently, wherein the scenario is configured to simulate usage patterns including load tests.

The scenario attribute includes an assert parameter configured to verify that a response to a request from an endpoint matches an expected value.

The scenario configuration file includes a requests attribute configured to define configurations for a request.

The scenario configuration file includes attributes to define dynamic request behavior including custom request handling logic.

The scenario configuration file includes configuration data for dynamic test scenarios in which a value returned from a request is used in a subsequent request.

The test description comprises an endpoint configuration file.

The endpoint configuration files define networking-level service details for an endpoint including at least one of name, port, alias, protocol, metadata related to endpoints of the service, and methods supported.

The endpoint configuration files include a services attribute configured to list services available.

The endpoint configuration files include an endpoints attribute configured to define individual endpoints by specifying available methods, service definition paths, and service names.

The endpoint configuration files include a methods attribute configured to list methods available within each endpoint to specify details and expected behavior of each method.

The endpoint configuration files include a defined attribute configured to specify a service definition file including path and name, wherein the service definition file defines a structure and methods of the service.

The test is configured to specify API requests of the endpoints, wherein the API requests are at least one of statically and dynamically generated via a script.

The test includes at least one of a functional integration test, a performance test, and a load test.

The test is configured to override mock configurations.

The test is configured to validate responses received from the at least one microservice.

The test is configured to chain request and response values throughout a life of the test.

The test is configured to collect results and generate a report based on the results of the test.

The system comprises a dashboard configured for use in managing and controlling the library component and the worker component, and to receive status and results of the test.

Embodiments include a system comprising a library component configured to execute on a client computer and comprising a deployer, a tester client, and a mocker client. The deployer is configured to deploy at least one microservice of an application in a cluster. The tester client is configured to create a test including a test description. The mocker client is configured to create a mock including a mock description. A worker component is configured to execute in a cluster and coupled to the library component. The worker component comprises a tester and a mocker. The tester is configured to execute the test to test operation of the at least one microservice and the mocker is configured to execute the mock to mimic endpoints of the at least one microservice during the test. The endpoints include endpoints of a dependent microservice.

Embodiments include a system comprising: a library component executing on a client computer and comprising a deployer, a tester client, and a mocker client; the deployer configured to deploy at least one microservice of an application in a cluster; the tester client configured to create a test including a test description; the mocker client configured to create a mock including a mock description; and a worker component executing in a cluster and coupled to the library component, wherein the worker component comprises a tester and a mocker, wherein the tester is configured to execute the test to test operation of the at least one microservice and the mocker is configured to execute the mock to mimic endpoints of the at least one microservice during the test, wherein the endpoints include endpoints of a dependent microservice.

Embodiments include a method for testing an application, comprising deploying within a cluster at least one microservice of the application. The method includes generating a test configured to test operation of the at least one microservice. The method includes generating a mock configured to mimic in the cluster endpoints of the at least one microservice when the test is executing. The endpoints include endpoints of a dependent microservice. The method includes providing status and results of the test when executed on the at least one microservice.

Embodiments include a method for testing an application, comprising: deploying within a cluster at least one microservice of the application; generating a test configured to test operation of the at least one microservice; generating a mock configured to mimic in the cluster endpoints of the at least one microservice when the test is executing, wherein the endpoints include endpoints of a dependent microservice; and providing status and results of the test when executed on the at least one microservice.

The at least one microservice includes a plurality of microservices.

The at least one microservice includes sets of microservices.

The dependent microservice includes at least one of an internal dependent microservice and an external dependent microservice.

The deploying includes generating a target description file comprising configuration parameters for defining and controlling deployment and configuration of the at least one microservice.

Data of the target description file is received from a user.

The deploying comprises using data of the target description file to automatically at least one of create, update and manage resources to deploy the at least one microservice to a target cluster namespace.

The method comprises customizing parameters in the target description file in accordance with deployment requirements.

The method comprises configuring the target description file to include a namespace parameter defining a target cluster namespace.

The method comprises configuring the target description file to include a containers section comprising deployment settings.

The method comprises configuring the containers section to include a debug section comprising parameters configured to control debugging of the executing at least one microservice in real-time.

The debug section is configured to immediately implement in real-time code changes made to the executing at least one microservice to overcome a test failure, wherein redeployments are precluded.

The method comprises configuring the target description file to include at least one of an includes parameter and an excludes parameter, wherein the includes parameter specifies endpoint services to include in the deployment, and the excludes parameter specifies endpoint services of the application to exclude in the deployment.

The endpoint services comprise application programming interface (API) services.

The mock is configured to mimic at least one of external dependencies and internal dependencies.

The generating the mock includes configuring the mock to execute in-cluster during the test to create mock endpoint services of endpoints of the at least one microservice, wherein external dependencies are precluded during the test.

The generating the mock includes configuring the mock to mimic a plurality of endpoint types.

The generating the mock includes configuring the mock to automatically create mock configurations from corresponding API files of the at least one microservice.

The generating the mock includes configuring the mock to include gRPC mocking.

The generating the mock includes configuring the mock via inputs from a programming language.

The generating the mock comprises dynamically generating a mock description using API service-level information.

The mock description comprises a mock configuration file configured to control mock behavior.

The method comprises configuring the mock configuration file to capture signatures for the endpoints to be mocked and corresponding static mock responses.

The method comprises automatically generating the mock configuration file from at least one of an OpenAPI specification, a protocol buffer API specification, and a JSON-RPC response file.

The mock configuration file includes data to configure proxying.

The mock configuration file includes data to configure at least one of delays and errors.

The mock description comprises a response configuration file for the endpoints to be mocked, wherein the response configuration file defines response behavior of the endpoint.

The response configuration file includes payload configuration data and dynamic response data.

The mock description comprises an endpoint configuration file comprising networking-level API service details for the endpoints to be mocked.

The endpoint configuration file comprises data defining individual ones of the endpoints.

The endpoint configuration file comprises data specifying available methods of the endpoints, details of the methods, and behavior of the methods.

The endpoint configuration file comprises data specifying API service definition file path and API service name, wherein the API service definition file includes data of the structure and methods of the API service.

The generating the test comprises generating automatically a default test.

The generating the test includes configuring the test via inputs from a programming language.

The generating the test comprises generating the test to include a test description comprising instructions to test operation of the at least one microservice in the cluster.

The test description comprises a test configuration file.

The test configuration file is configured to define behavior of the test and includes test pattern configuration data and load testing configuration data.

The test configuration file includes a definition of at least one test scenario.

The test configuration file includes an override attribute configured to customize endpoints by specifying a mock to modify an endpoint defined in the mock configuration file.

A mock section in the test configuration file includes identification of an overridden endpoint, specification of a method of the overridden endpoint to be modified, and at least one of customized data and a customized response to replace an original response from the overridden endpoint.

The test configuration file includes load profile parameters to simulate heavy user traffic on the at least one microservice.

The load profile parameters include at least one parameter to at least one of specify target requests per second for the at least one microservice, indicate total duration of a load test, and gradually increase a load on an endpoint of the at least one microservice.

The test description comprises a scenario configuration file for each method of the at least one microservice.

The scenario configuration file defines request behaviors for methods and specifies endpoint and method name.

The scenario configuration file includes configuration data of at least one of scenarios, requests, payloads, overrides and parameters.

The scenario configuration files include a scenario attribute configured to define test scenarios including end-user use cases to be tested.

The scenario attribute includes a steps parameter including a list of actions to be executed at least one of sequentially and concurrently, wherein the scenario is configured to simulate usage patterns including load tests.

The scenario attribute includes an assert parameter configured to verify that a response to a request from an endpoint matches an expected value.

The scenario configuration file includes a requests attribute configured to define configurations for a request.

The scenario configuration file includes attributes to define dynamic request behavior including custom request handling logic.

The scenario configuration file includes configuration data for dynamic test scenarios in which a value returned from a request is used in a subsequent request.

The test description comprises an endpoint configuration file.

The endpoint configuration files define networking-level service details for an endpoint including at least one of name, port, alias, protocol, metadata related to endpoints of the service, and methods supported.

The endpoint configuration files include a services attribute configured to list services available.

The endpoint configuration files include an endpoints attribute configured to define individual endpoints by specifying available methods, service definition paths, and service names.

The endpoint configuration files include a methods attribute configured to list methods available within each endpoint to specify details and expected behavior of each method.

The endpoint configuration files include a defined attribute configured to specify a service definition file including path and name, wherein the service definition file defines a structure and methods of the service.

The test is configured to specify API requests of endpoints, wherein the API requests are at least one of statically and dynamically generated via a script.

The test includes at least one of a functional integration test, a performance test, and a load test.

The test is configured to override mock configurations.

The test is configured to validate responses received from the at least one microservice.

The test is configured to chain request and response values throughout a life of the test.

The test is configured to collect results and generate a report based on the results of the test.

The method includes generating a dashboard configured to receive inputs for controlling the deploying, the test, and the mock, and for outputting information of the status and the results of the test.

Unless the context clearly requires otherwise, throughout the description, the words “comprise,” “comprising,” and the like are to be construed in an inclusive sense as opposed to an exclusive or exhaustive sense; that is to say, in a sense of “including, but not limited to.” Words using the singular or plural number also include the plural or singular number respectively. Additionally, the words “herein,” “hereunder,” “above,” “below,” and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention is preferably implemented using hardware, software or a combination of hardware and software. The software can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The description herein is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown but is to be accorded the widest scope consistent with the claims.

While this invention has been described in terms of several preferred embodiments, there are alterations, permutations, and equivalents, which fall within the scope of this invention. It should also be noted that there are many alternative ways of implementing the methods and apparatuses of the present invention. Further, the various aspects, embodiments, implementations or features of the invention can be used separately or in any combination. It is therefore intended that the following appended claims be interpreted as including all such alterations, permutations, and equivalents as fall within the true spirit and scope of the present invention.

What is claimed is:

1. A computer-implemented method for testing an application, the method comprising:

deploying within a cluster at least one microservice of the application;

generating and executing in response to the deploying a test to test operation of the at least one microservice;

receiving by a device intermediary to the at least one microservice API service-level data from the at least one microservice and dynamically generating from the API service-level data a mock description;

generating at the device a mock is to use the mock description to mimic in the cluster endpoints of the at least one microservice when the test is executing, wherein the endpoints include endpoints of a dependent microservice; and providing status and results of the test when executed on the at least one microservice.

2. The method of claim 1, wherein the at least one microservice includes a plurality of microservices.

3. The method of claim 1, wherein the at least one microservice includes sets of microservices.

4. The method of claim 1, wherein the dependent microservice includes at least one of an internal dependent microservice and an external dependent microservice.

5. The method of claim 1, wherein the deploying includes generating a target description file comprising configuration parameters for defining and controlling deployment and configuration of the at least one microservice.

6. The method of claim 5, wherein data of the target description file is received from a user.

7. The method of claim 5, wherein the deploying comprises using data of the target description file to automatically at least one of create, update and manage resources to deploy the at least one microservice to a target cluster namespace.

8. The method of claim 5, comprising customizing parameters in the target description file in accordance with deployment requirements.

9. The method of claim 8, comprising configuring the target description file to include a namespace parameter defining a target cluster namespace.

10. The method of claim 8, comprising configuring the target description file to include a containers section comprising deployment settings.

11. The method of claim 10, comprising configuring the containers section to include a debug section comprising parameters to control debugging of the executing at least one microservice in real-time.

12. The method of claim 11, wherein the debug section to immediately implement in real-time code changes made to the executing at least one microservice to overcome a test failure, wherein redeployments are precluded.

13. The method of claim 8, comprising configuring the target description file to include at least one of an includes parameter and an excludes parameter, wherein the includes parameter specifies endpoint services to include in the deployment, and the excludes parameter specifies endpoint services of the application to exclude in the deployment.

14. The method of claim 13, wherein the endpoint services comprise application programming interface (API) services.

15. The method of claim 1, wherein the mock is to mimic at least one of external dependencies and internal dependencies.

16. The method of claim 1, wherein the generating the mock includes configuring the mock to execute in-cluster during the test to create mock endpoint services of endpoints of the at least one microservice, wherein external dependencies are precluded during the test.

17. The method of claim 1, wherein the generating the mock includes configuring the mock to mimic a plurality of endpoint types.

18. The method of claim 1, wherein the generating the mock includes configuring the mock to automatically create mock configurations from corresponding API files of the at least one microservice.

19. The method of claim 1, wherein the generating the mock includes configuring the mock to include gRPC Remote Procedure Call (gRPC) mocking.

20. The method of claim 1, wherein the generating the mock includes configuring the mock via inputs from a programming language.

21. The method of claim 1, wherein the mock description comprises a mock configuration file to control mock behavior.

22. The method of claim 21, comprising configuring the mock configuration file to capture signatures for the endpoints to be mocked and corresponding static mock responses.

23. The method of claim 21, comprising automatically generating the mock configuration file from at least one of an OpenAPI specification, a protocol buffer API specification, and a JavaScript Object Notation-Remote Procedure Call (JSON-RPC) response file.

24. The method of claim 21, wherein the mock configuration file includes data to configure proxying.

25. The method of claim 21, wherein the mock configuration file includes data to configure at least one of delays and errors.

26. The method of claim 1, wherein the mock description comprises a response configuration file for the endpoints to be mocked, wherein the response configuration file defines response behavior of the endpoint.

27. The method of claim 26, wherein the response configuration file includes payload configuration data and dynamic response data.

28. The method of claim 1, wherein the mock description comprises an endpoint configuration file comprising networking-level API service details for the endpoints to be mocked.

29. The method of claim 28, wherein the endpoint configuration file comprises data defining individual ones of the endpoints.

30. The method of claim 29, wherein the endpoint configuration file comprises data specifying available methods of the endpoints, details of the methods, and behavior of the methods.

31. The method of claim 29, wherein the endpoint configuration file comprises data specifying API service definition file path and API service name, wherein the API service definition file includes data of the structure and methods of the API service.

32. The method of claim 1, wherein the generating the test comprises generating automatically a default test.

33. The method of claim 1, wherein the generating the test includes configuring the test via inputs from a programming language.

34. The method of claim 1, wherein the generating the test comprises generating the test to include a test description comprising instructions to test operation of the at least one microservice in the cluster.

35. The method of claim 34, wherein the test description comprises a test configuration file.

36. The method of claim 35, wherein the test configuration file is to define behavior of the test and includes test pattern configuration data and load testing configuration data.

37. The method of claim 36, wherein the test configuration file includes a definition of at least one test scenario.

38. The method of claim 37, wherein the test configuration file includes an override attribute to customize endpoints by specifying a mock to modify an endpoint defined in the mock configuration file.

39. The method of claim 38, wherein a mock section in the test configuration file includes identification of an overridden endpoint, specification of a method of the overridden endpoint to be modified, and at least one of customized data and a customized response to replace an original response from the overridden endpoint.

40. The method of claim 37, wherein the test configuration file includes load profile parameters to simulate heavy user traffic on the at least one microservice.

41. The method of claim 40, wherein the load profile parameters include at least one parameter to at least one of specify target requests per second for the at least one microservice, indicate total duration of a load test, and gradually increase a load on an endpoint of the at least one microservice.

42. The method of claim 35, wherein the test description comprises a scenario configuration file for each method of the at least one microservice.

43. The method of claim 42, wherein the scenario configuration file defines request behaviors for methods and specifies endpoint and method name.

44. The method of claim 42, wherein the scenario configuration file includes configuration data of at least one of scenarios, requests, payloads, overrides and parameters.

45. The method of claim 44, wherein the scenario configuration files include a scenario attribute to define test scenarios including end-user use cases to be tested.

46. The method of claim 45, wherein the scenario attribute includes a steps parameter including a list of actions to be executed at least one of sequentially and concurrently, wherein the scenario is to simulate usage patterns including load tests.

47. The method of claim 45, wherein the scenario attribute includes an assert parameter to verify that a response to a request from an endpoint matches an expected value.

48. The method of claim 44, wherein the scenario configuration file includes a requests attribute to define configurations for a request.

49. The method of claim 44, wherein the scenario configuration file includes attributes to define dynamic request behavior including custom request handling logic.

50. The method of claim 44, wherein the scenario configuration file includes configuration data for dynamic test scenarios in which a value returned from a request is used in a subsequent request.

51. The method of claim 35, wherein the test description comprises an endpoint configuration file.

52. The method of claim 51, wherein the endpoint configuration files define networking-level service details for an endpoint including at least one of name, port, alias, protocol, metadata related to endpoints of the service, and methods supported.

53. The method of claim 52, wherein the endpoint configuration files include a services attribute to list services available.

54. The method of claim 52, wherein the endpoint configuration files include an endpoints attribute to define individual endpoints by specifying available methods, service definition paths, and service names.

55. The method of claim 52, wherein the endpoint configuration files include a methods attribute to list methods available within each endpoint to specify details and expected behavior of each method.

56. The method of claim 52, wherein the endpoint configuration files include a defined attribute to specify a service definition file including path and name, wherein the service definition file defines a structure and methods of the service.

57. The method of claim 1, wherein the test is to specify API requests of endpoints, wherein the API requests are at least one of statically and dynamically generated via a script.

58. The method of claim 1, wherein the test includes at least one of a functional integration test, a performance test, and a load test.

59. The method of claim 1, wherein the test is to override mock configurations.

60. The method of claim 1, wherein the test is to validate responses received from the at least one microservice.

61. The method of claim 1, wherein the test is to chain request and response values throughout a life of the test.

62. The method of claim 1, wherein the test is to collect results and generate a report based on the results of the test.

63. The method of claim 1, comprising generating a dashboard to receive inputs for controlling the deploying, the test, and the mock, and for outputting information of the status and the results of the test.

* * * * *